United States Patent
Yagi et al.

(10) Patent No.: US 12,392,953 B2
(45) Date of Patent: Aug. 19, 2025

(54) ILLUMINATION DEVICE INCLUDING A SHEET HAVING LIGHT BLOCKING PORTIONS AND LIGHT TRANSMITTING PORTIONS AND DISPLAY DEVICE INCLUDING THE SAME

(71) Applicant: Sharp Display Technology Corporation, Kameyama (JP)

(72) Inventors: Shugo Yagi, Kameyama (JP); Junichi Masuda, Kameyama (JP); Yuuichi Kanbayashi, Kameyama (JP); Satoshi Tsubooka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/766,705

(22) Filed: Jul. 9, 2024

(65) Prior Publication Data

US 2025/0067922 A1 Feb. 27, 2025

(30) Foreign Application Priority Data

Aug. 23, 2023 (JP) ................ 2023-135294

(51) Int. Cl.
*F21V 8/00* (2006.01)
*G02F 1/13* (2006.01)
*G02F 1/1335* (2006.01)
*G02F 1/13357* (2006.01)

(52) U.S. Cl.
CPC .......... *G02B 6/0053* (2013.01); *G02B 6/002* (2013.01); *G02B 6/0038* (2013.01); *G02B 6/0068* (2013.01); *G02B 6/0076* (2013.01); *G02F 1/1323* (2013.01); *G02F 1/133512* (2013.01); *G02F 1/133524* (2013.01); *G02F 1/133615* (2013.01); *G02F 1/133607* (2021.01)

(58) Field of Classification Search
CPC .... G02B 6/002; G02B 6/0053; G02B 6/0076; G02F 1/1323; G02F 1/133607; G02F 1/133615

See application file for complete search history.

(56) References Cited

U.S. PATENT DOCUMENTS

| | | | |
|---|---|---|---|
| 11,378,831 B2 * | 7/2022 | Heber | G09G 3/32 |
| 2017/0069236 A1 | 3/2017 | Klippstein et al. | |
| 2017/0153383 A1 * | 6/2017 | Lee | G02B 6/0068 |
| 2020/0003946 A1 * | 1/2020 | Klippstein | B60K 35/28 |
| 2020/0005718 A1 * | 1/2020 | Fattal | G02B 6/0036 |
| 2022/0413203 A1 * | 12/2022 | Fattal | H04N 13/32 |

(Continued)

*Primary Examiner* — Keith G. Delahoussaye
(74) *Attorney, Agent, or Firm* — ScienBiziP, P.C.

(57) ABSTRACT

An illumination device is provided with a first light source, a first light guide plate including a second main surface, a second light source, a second light guide plate including a fourth main surface, a third light source, an optical member, and a first sheet. The main surfaces of the first light guide plate and the second light guide plate overlap each other and the first light guide plate and the second light guide plate are disposed on the opposite side of the first sheet from the optical member. The first sheet includes two first light blocking portions and a first light-transmitting portion. The first light reflection portion is selectively provided in a first region in the first opposite main surface, and the second light reflection portion is provided at least in a fourth region in the second opposite main surface.

15 Claims, 32 Drawing Sheets

(56) References Cited

U.S. PATENT DOCUMENTS

| | | | |
|---|---|---|---|
| 2023/0101373 A1* | 3/2023 | Kim | G02B 6/0036 |
| | | | 362/613 |
| 2023/0288753 A1* | 9/2023 | Shiau | G02F 1/133615 |
| 2025/0067923 A1* | 2/2025 | Yagi | G02B 6/0068 |

* cited by examiner

ILLUMINATION DEVICE INCLUDING A SHEET HAVING LIGHT BLOCKING PORTIONS AND LIGHT TRANSMITTING PORTIONS AND DISPLAY DEVICE INCLUDING THE SAME

CROSS-REFERENCE TO RELATED APPLICATIONS

This application claims the benefit of priority to Japanese Patent Application Number 2023-135294 filed on Aug. 23, 2023. The entire contents of the above-identified application are hereby incorporated by reference.

BACKGROUND

Technical Field

The techniques disclosed in the present specification relate to an illumination device and a display device.

An illumination device described in US 2017/0069236 A is known as an example of an illumination device in the related art. The illumination device described in US 2017/0069236 A operates in at least two operation modes, that is, a free viewing mode and a restricted viewing mode. The illumination device includes a backlight system. A light guide plate is disposed at the front of the backlight system, and a light source is disposed along a side surface of the light guide plate. The light guide plate includes diffusion particles formed of a polymer in a dispersed and mixed manner in a resin base material, and has a light transmittance of at least 80%. In the free viewing mode, the backlight system is turned on, and the light source is turned off. In the restricted viewing mode, the light source is turned on, and the backlight system is turned off.

SUMMARY

In the illumination device described in US 2017/0069236 A, an emission angle range of all the emission light is limited in the restricted viewing mode, and the emission angle range of all the emission light is not limited in the free viewing mode. However, in the specification of US 2017/0069236 A, there is a problem that it is not possible to cope with a case in which it is necessary to restrict the emission angle range for some of the emission light and to not restrict the emission angle range of the remaining emission light.

The techniques described in the present specification have been made based on the circumstances described above, and an object of the present specification is to restrict an emission angle range of some of emission light.

(1) An illumination device according to the techniques described in the present specification includes a first light source, and a first light guide plate, at least a part of an outer peripheral end surface of the first light guide plate being a first end surface facing the first light source and on which light is incident, one of main surfaces of the first light guide plate being a first main surface configured to emit light, and the other of the main surfaces being a second main surface. The illumination device includes a second light source, and a second light guide plate, at least a part of an outer peripheral end surface of the second light guide plate being a second end surface facing the second light source and on which light is incident, one of main surfaces of the second light guide plate being a third main surface configured to emit light, and the other of the main surfaces being a fourth main surface. The illumination device includes a third light source, and an optical member including a light incident surface facing the third light source and on which light is incident, and a fifth main surface configured to emit light. The illumination device includes a first sheet, one of main surfaces of the first sheet being a sixth main surface, and the other of the main surfaces being a seventh main surface facing the fifth main surface. The main surfaces of the first light guide plate and the second light guide plate overlap each other and the first light guide plate and the second light guide plate are disposed on the opposite side from the optical member with respect to the first sheet. The first sheet at least includes two first light blocking portions disposed with an interval therebetween in a first direction and configured to block light, the first direction including a direction from the first light source toward the first light guide plate, and a first light-transmitting portion disposed between the two light blocking portions and configured to transmit light. A first light reflection portion is provided at the second main surface, the first light reflection portion reflecting light and promoting light emission from the first main surface. A second light reflection portion is provided at the fourth main surface, the second light reflection portion reflecting light and promoting light emission from the third main surface. When the second main surface is divided into a first region, and a second region adjacent to the first region in the first direction, the first light reflection portion is selectively provided in the first region in the second main surface. When the fourth main surface is divided into a third region overlapping the first region, and a fourth region overlapping the second region, the second light reflection portion is provided at least in the fourth region in the fourth main surface.

(2) Further, in addition to (1) described above, in the illumination device, the second light reflection portion may be is provided over the third region and the fourth region in the fourth main surface.

(3) Further, in addition to (2) described above, in the illumination device, the first light reflection portion may be constituted by a plurality of first lenses arranged side by side in the first direction in the second main surface, the second light reflection portion may be constituted by a plurality of second lenses arranged side by side in the first direction in the fourth main surface, and, of the plurality of second lenses, the second lens disposed at least in the fourth region may include a first inclined surface with an inclination gradually upward from the opposite side to the second light source toward the second light source side in the first direction.

(4) Further, in addition to (3) described above, in the illumination device, of the plurality of second lenses, the second lens disposed in the third region may include a second inclined surface with an inclination gradually upward from the opposite side to the second light source toward the second light source side in the first direction.

(5) Further, in addition to (4) described above, in the illumination device, the first inclined surface and the second inclined surface may have the same inclination angle with respect to the first direction.

(6) Further, in addition to any one of (3) to (5) described above, in the illumination device, a positional relationship of the first light source with respect to the first light guide plate in the first direction may be the same as a positional relationship of the second light source with respect to the second light guide plate in the first direction, and each of the plurality of first lenses may include a third inclined surface with an inclination gradually upward from the side opposite to the first light source toward the first light source side in the first direction.

(7) Further, in addition to any one of (2) to (6) described above, the illumination device may include a light source control unit configured to control driving of the first light source, the second light source, and the third light source. Based on input of a switching signal, the light source control unit switches between control in a first mode and control in a second mode, the first light source and the third light source being turned on and the second light source being turned off in the first mode, and the second light source and the third light source being turned on and the first light source being turned off in the second mode.

(8) Further, in addition to any one of (2) to (7) described above, in the illumination device, the second light guide plate may be disposed with the first light guide plate being interposed between the second light guide plate and the first sheet.

(9) Further, in addition to any one of (2) to (7) described above, in the illumination device, the first light guide plate may be disposed with the second light guide plate being interposed between the first light guide plate and the first sheet.

(10) Further in addition to any one of (1) to (9) described above, in the illumination device, the optical member may be constituted by a third light guide plate, the light incident surface being constituted by at least a part of an outer peripheral end surface of the third light guide plate, and the third light guide plate being disposed with the light incident surface facing the third light source.

(11) Further, in addition to (10) described above, the illumination device may include a light source control unit configured to control driving of the first light source, the second light source, and the third light source. The light incident surface may be constituted by a part of the outer peripheral end surface of the third light guide plate extending in the first direction. A plurality of the third light sources may be arranged side by side in the first direction. The plurality of third light sources may include a fourth light source disposed facing a portion, of the third light guide plate, overlapping the first region and the third region, and a fifth light source disposed facing a portion, of the third light guide plate, overlapping the second region and the fourth region. The light source control unit may cause a light emission amount per unit time of the fourth light source to be larger than a light emission amount per unit time of the fifth light source.

(12) Further, in addition to any one of (1) to (9) described above, the illumination device may include a light source control unit configured to control driving of the first light source, the second light source, and the third light source. A plurality of the third light sources may be disposed in a planar manner overlapping the fifth main surface. The light incident surface of the optical member may be constituted by a main surface on the opposite side to the fifth main surface, and may be disposed facing the plurality of third light sources.

(13) Further, in addition to (12) described above, in the illumination device, the plurality of third light sources may include a fourth light source disposed overlapping the first region and the third region, and a fifth light source disposed overlapping the second region and the fourth region. The light source control unit may cause a light emission amount per unit time of the fourth light source to be larger than a light emission amount per unit time of the fifth light source.

(14) Further, in addition to any one of (1) to (13) described above, the illumination device may include a second sheet, one of main surfaces of the second sheet being an eighth main surface and the other of the main surfaces being a ninth main surface disposed facing the first main surface. The second sheet may at least include two second light blocking portions disposed with an interval therebetween in the first direction and configured to block light, and a second light-transmitting portion disposed between the two second light blocking portions and configured to transmit light.

(15) A display device according to the techniques described in the present specification includes the illumination device according to any of (1) to (14) described above, and a display panel configured to perform display using light from the illumination device.

According to the techniques described in the present specification, an emission angle range of some of emission light can be restricted.

BRIEF DESCRIPTION OF DRAWINGS

The disclosure will be described with reference to the accompanying drawings, wherein like numbers reference like elements.

DESCRIPTION OF EMBODIMENTS

First Embodiment

A first embodiment will be described with reference to FIGS. 1 to 23. In the present embodiment, a liquid crystal display device (display device) 10 is exemplified. Note that some drawings show an X-axis, a Y-axis, and a Z-axis, and directions of these axes are drawn so as to be common in all the drawings. Further, FIGS. 1, 2, 4, 5, 8, 10, and 11 are used as a reference for an up-down direction, an upper side in the same drawings is a front side, and a lower side in the same drawings is a back side.

Figure 1:
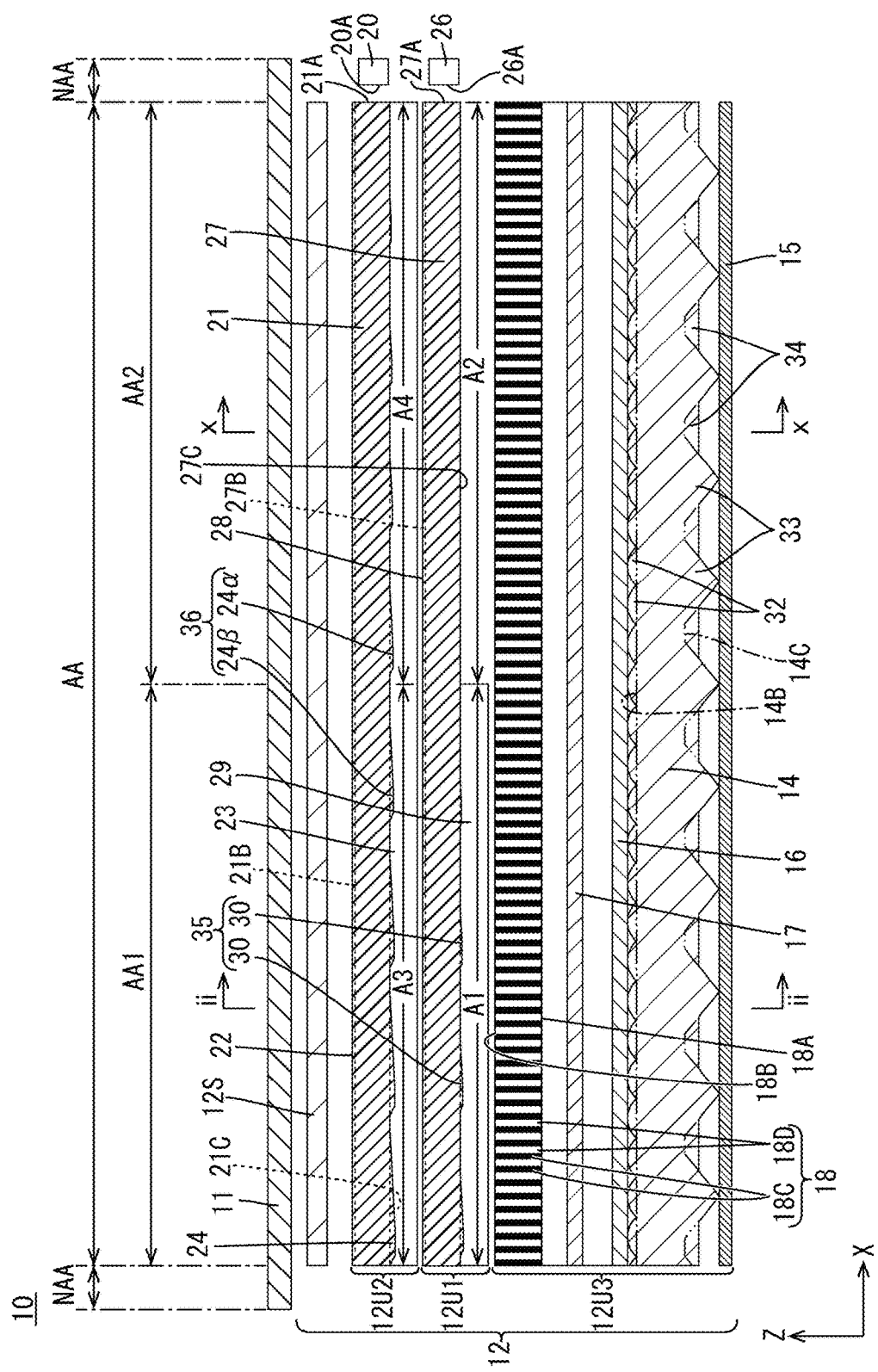
FIG. 1 is a side cross-sectional view of a liquid crystal display device according to a first embodiment.

In the present embodiment, the liquid crystal display device 10 for vehicle use is exemplified, as illustrated in FIG. 1. For example, the liquid crystal display device 10 for vehicle use is mounted in a car navigation system displaying a map and the like as an image, a multi-function display displaying an operation state and the like of equipment, such as an air conditioner, in addition to a map and the like as an image, an instrument panel displaying meters, alerts, and the like as an image, and an infotainment system displaying television images, audio information, and the like in addition to a map and the like as an image. The liquid crystal display device 10 according to the present embodiment has a length similar to the vehicle width in the vehicle cabin, from in front of the front passenger seat to in front of the driver's seat. Note that a passenger vehicle in which the liquid crystal display device 10 according to the present embodiment is mounted has a configuration in which the driver's seat is located on the left side of FIG. 1 and the front passenger seat is located on the right side of FIG. 1, that is, the passenger vehicle is a left-hand drive vehicle. Further, in the present embodiment, the liquid crystal display device 10 is installed in a posture in which the X-axis direction substantially matches the horizontal direction and the Y-axis direction is parallel to a vertical direction.

Figure 2:
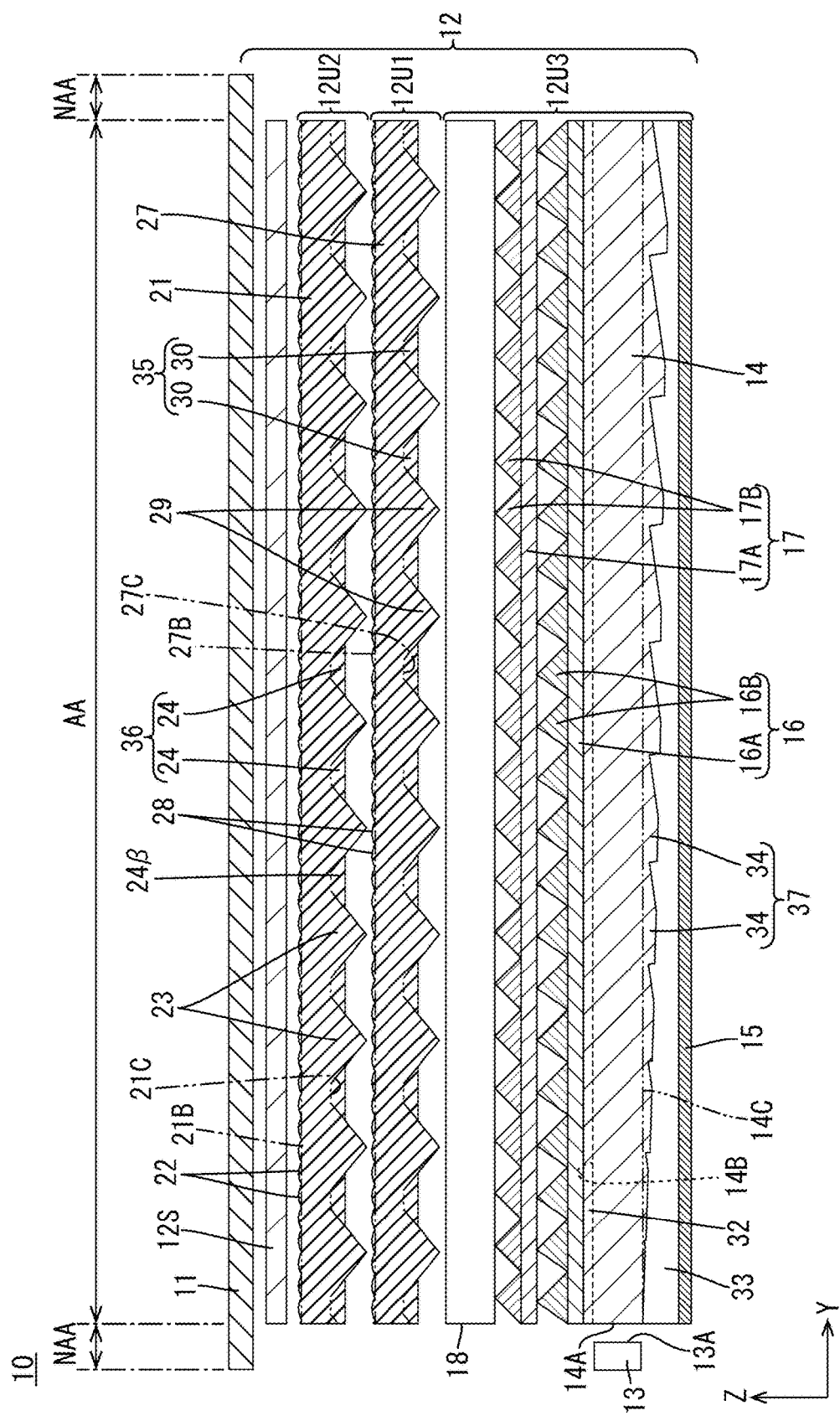
FIG. 2 is a cross-sectional view of the liquid crystal display device according to the first embodiment taken along a line ii-ii in FIG. 1.
Figure 3:
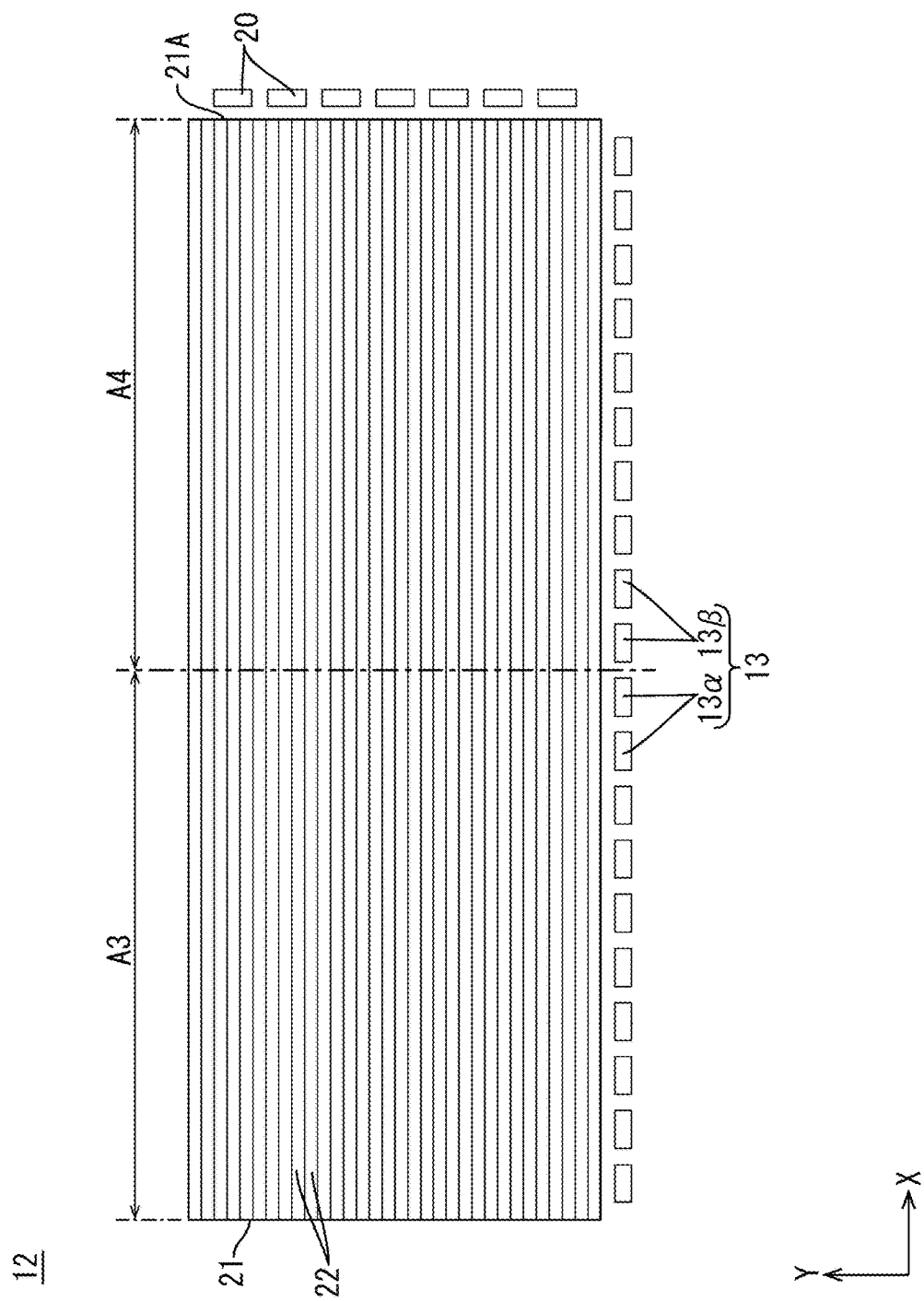
FIG. 3 is a plan view of a backlight device provided in the liquid crystal display device according to the first embodiment.

The liquid crystal display device 10 has a long shape that is laterally long as a whole, and, as illustrated in FIGS. 1 to 3, a short side direction thereof coincides with the Y-axis direction, a long side direction thereof coincides with the X-axis direction, and a plate thickness direction thereof coincides with the Z-axis direction, respectively. As illustrated in FIGS. 1 and 2, the liquid crystal display device 10 includes a liquid crystal panel (display panel) 11 that displays an image, and a backlight device (illumination device) 12 that is disposed on the back side of the liquid crystal panel 11 and irradiates light to be used for display toward the liquid crystal panel 11. First, a configuration of the liquid crystal panel 11 will be described. The liquid crystal panel 11 has a plate shape in which a main surface is parallel to the X-axis direction and the Y-axis direction, and a normal direction (the thickness direction) of the main surface coincides with the Z-axis direction. In the liquid crystal panel 11, a center side section of the main surface is a display region AA that can display an image, and an outer circumferential end side portion surrounding the display region AA and having a frame shape is a non-display region NAA. As illustrated in FIG. 1, the display region AA is divided into a first display portion AA1 located on one side (the left side in FIG. 1) in the X-axis direction (the long side direction of the liquid crystal panel 11) and a second display portion AA2 located on the other side (the right side in FIG. 1) in the X-axis direction. The first display portion AA1 is located in front of the driver's seat in the vehicle cabin. The second display portion AA2 is located in front of the front passenger seat in the vehicle cabin. An area ratio between the first display portion AA1 and the second display portion AA2 is 1:1, for example.

In a similar manner to the liquid crystal display device 10, the liquid crystal panel 11 has a long shape that is laterally long as a whole, and includes a pair of substrates and a liquid crystal layer sealed between the pair of substrates. Of the pair of substrates constituting the liquid crystal panel 11, the substrate arranged on the front side is a CF substrate (counter substrate), and the substrate arranged on the back side is an array substrate (TFT substrate). Color filters that exhibit red (R), green (G), blue (B), and the like, a light blocking portion (black matrix) that partitions the adjacent color filters, and the like are provided on the CF substrate. The array substrate (TFT substrate) is provided with at least a gate wiring line and a source wiring line that are orthogonal to each other, a switching element (for example, a TFT) connected to the gate wiring line and the source wiring line, and a pixel electrode connected to the switching element and constituting a pixel. Note that alignment films are respectively provided on each of inner surfaces of the array substrate and the CF substrate constituting the liquid crystal panel 11. Furthermore, a polarizer is attached to each of outer surfaces of the array substrate and the CF substrate constituting the liquid crystal panel 11.

As described above, the liquid crystal display device 10 for vehicle use according to the present embodiment has the length close to that of the vehicle width, and in line with this, the display region AA of the liquid crystal panel 11 includes the first display portion AA1 located in front of the driver's seat and the second display portion AA2 located in front of the front passenger seat. Thus, for example, while the passenger vehicle is traveling, it may be required to restrict a viewing angle such that, while a display image of the first display portion AA1 and the second display portion AA2 can be viewed from the front passenger seat, from the driver's seat, the display image of the second display portion AA2 cannot be viewed while the display image of the first display portion AA1 can be viewed. On the other hand, for example, when the passenger vehicle is stopped, it may be required to not restrict the viewing angle, such that the display image of the first display portion AA1 and the second display portion AA2 can be viewed from both the front passenger seat and the driver's seat.

In order to meet such a demand, as illustrated in FIGS. 1 and 2, the backlight device 12 according to the present embodiment includes a diffuser sheet 12S, a second backlight unit 12U2 disposed on the back side of the diffuser sheet 12S, a first backlight unit 12U1 disposed on the back side of the second backlight unit 12U2, and a third backlight unit 12U3 disposed on the back side of the first backlight unit 12U1. The diffuser sheet 12S is located on a light emission side (the side closest to the liquid crystal panel 11) in the backlight device 12. The diffuser sheet 12S applies a diffusion action to light incident from the back side and emits the light toward the liquid crystal panel 11. In the present embodiment, each of the first backlight unit 12U1, the second backlight unit 12U2, and the third backlight unit 12U3 is a so-called edge light type backlight unit. Note that, in a similar manner to the liquid crystal display device 10, the backlight device 12 has a long shape that is laterally long as a whole.

First, a configuration of the third backlight unit 12U3 will be described. As illustrated in FIGS. 1 and 2, the third backlight unit 12U3 includes at least a third LED (third light source) 13, a third light guide plate (optical member) 14 that guides light from the third LED 13, a reflection sheet 15 disposed on the back side (opposite to the light emission side) of the third light guide plate 14, a first prism sheet 16 disposed on the front side (light emission side) of the third light guide plate 14, a second prism sheet 17 disposed on the front side of the first prism sheet 16, and a first louver (first sheet) 18 disposed on the front side of the second prism sheet 17.

As illustrated in FIG. 2, the third LED 13 has a substantially block shape, and one surface of a pair of surfaces along the X-axis direction and the Z-axis direction is a third light-emitting surface 13A that emits light. As illustrated in FIG. 3, a plurality of the third LEDs 13 are arranged side by side with intervals therebetween along the X-axis direction (a first direction to be described below). The third LED 13 is mounted on an LED substrate. The third LED 13 has a configuration in which an LED chip is sealed with a sealing material on a substrate portion mounted on the LED substrate. The LED chip provided in the third LED 13 emits light of a single color, such as blue light, for example. A phosphor is dispersed and mixed in the sealing material provided in the third LED 13. The phosphor contained in the sealing material includes a yellow phosphor, a green phosphor, a red phosphor, and the like. The third LED 13 including such an LED chip and sealing material emits white light as a whole.

The third light guide plate 14 is formed of a synthetic resin material (an acrylic resin such as PMMA, or the like, for example) that has a sufficiently higher refractive index than that of air and that is substantially transparent. As illustrated in FIGS. 1 and 2, the third light guide plate 14 has a plate shape, and a main surface of the third light guide plate 14 is parallel to the main surface of the liquid crystal panel 11. Note that the main surface of the third light guide plate 14 is parallel to the X-axis direction and the Y-axis direction, and a normal direction (the thickness direction) of the main surface coincides with the Z-axis direction. The third light guide plate 14 is disposed so as to overlap at least the entire display region AA in a plan view. The third light guide plate 14 is arranged in the Y-axis direction with respect to the third LED 13, and is also arranged side by side in the Z-axis direction with the liquid crystal panel 11 and each of the prism sheets 16 and 17, and the like. As illustrated in FIGS. 2 and 3, the third light guide plate 14 is disposed on one side (the upper side in FIG. 3) of the third LED 13 in the Y-axis direction. Of the third light guide plate 14, one end surface (section), of an outer peripheral end surface, extending in the X-axis direction (the first direction) is a third light incident end surface (light incident surface) 14A facing the third light-emitting surface 13A of the third LED 13. The third light incident end surface 14A is a surface parallel to the third light-emitting surface 13A of the third LED 13, and light emitted from the third light-emitting surface 13A is incident on the third light incident end surface 14A. As described above, the third LED 13 is disposed only on one side in the Y-axis direction of the third light guide plate 14. Thus, the third backlight unit 12U3 is a one-side light incident edge light type.

Of a pair of main surfaces of the third light guide plate 14, as illustrated in FIG. 2, the main surface on the front side facing the first prism sheet 16 is a third light guide plate-light emission main surface (fifth main surface) 14B that emits internally guided light. Of the pair of main surfaces of the third light guide plate 14, the main surface on the back side facing the reflection sheet 15 is a third opposite main surface (second main surface) 14C located on the side opposite to the third light guide plate-light emission main surface 14B. Then, the third light guide plate 14 has a function of guiding, from the third light incident end surface 14A, light emitted from the third LED 13 toward the third light guide plate 14, propagating the light internally and then emitting the light while raising the light along the Z-axis direction such that the light is directed toward the front side (the light emission side). A detailed structure of the third light guide plate 14 will be described later. Note that the normal direction of the third light incident end surface 14A coincides with the Y-axis direction (the direction in which the third LED 13 and the third light guide plate 14 are arranged).

As illustrated in FIGS. 1 and 2, the main surface of the reflection sheet 15 is parallel to each of the main surfaces of the liquid crystal panel 11 and the third light guide plate 14, and the reflection sheet 15 is also disposed so as to cover the third opposite main surface 14C of the third light guide plate 14. The reflection sheet 15 has excellent light reflectivity, and can efficiently cause light that has leaked from the third opposite main surface 14C of the third light guide plate 14 to rise toward the front side, that is, toward the third light guide plate-light emission main surface 14B. The reflection sheet 15 has an outer shape slightly larger than that of the third light guide plate 14, and is disposed so as to overlap substantially the whole region of the third opposite main surface 14C.

As illustrated in FIGS. 1 and 2, the first prism sheet 16 and the second prism sheet 17 have a sheet shape, and each of the main surfaces thereof is parallel to and overlaps each of the main surfaces of the liquid crystal panel 11, the third light guide plate 14, and the like. Note that the main surfaces of the first prism sheet 16 and the second prism sheet 17 are parallel to the X-axis direction and the Y-axis direction, and a normal direction (the thickness direction) of the main surfaces coincides with the Z-axis direction. The first prism sheet 16 and the second prism sheet 17 are layered on the front side of the third light guide plate 14, and have a function of imparting a predetermined optical action to light emitted from the third light guide plate-light emission main surface 14B of the third light guide plate 14 to emit the light, and the like. The first prism sheet 16 and the second prism sheet 17 are disposed so as to overlap at least the entire display region AA in a plan view.

As illustrated in FIG. 2, the first prism sheet 16 includes a first base material 16A having a sheet shape, and a first prism 16B provided on a main surface (light emission main surface) on the front side (light emission side) of the first base material 16A. The first base material 16A is formed of a substantially transparent synthetic resin, and specifically, is formed of, for example, a crystalline transparent resin material such as polyethylene terephthalate (PET). The first base material 16A is formed into a sheet shape by stretching the crystalline transparent resin material serving as a raw material in a biaxial stretching process in manufacturing, which is suitable for reducing manufacturing costs. The first prism 16B is formed of an ultraviolet-curing resin material that is substantially transparent and is a type of photo-curable resin material. In manufacturing the first prism sheet 16, for example, an uncured ultraviolet-curing resin material is filled into a mold for molding, and the first base material 16A is also applied to an opening end of the mold to dispose the uncured ultraviolet-curing resin material so as to contact the main surface on the front side In this state, when the ultraviolet-curing resin material is irradiated with ultraviolet rays through the first base material 16A, the ultraviolet-curing resin material is cured, and the first prism 16B is integrally provided with the first base material 16A. The ultraviolet-curing resin material constituting the first prism 16B is an acrylic resin such as PMMA, for example. A refractive index of the ultraviolet-curing resin material constituting the first prism 16B is preferably set in a range from 1.49 to 1.52, and is most preferably set to 1.49.

Figure 4:
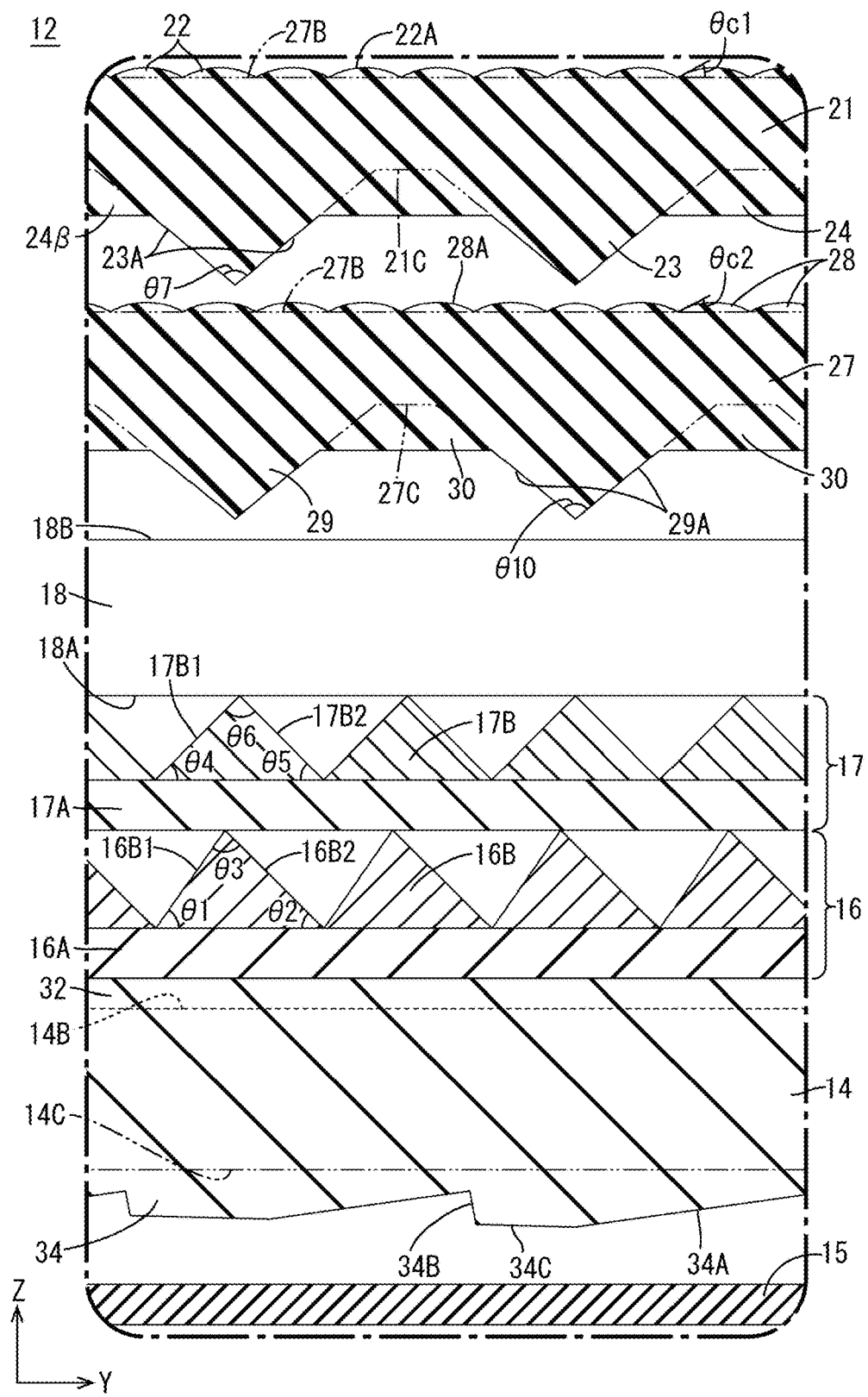
FIG. 4 is a cross-sectional view, taken at the same cutting position as that in FIG. 2, in the backlight device according to the first embodiment.

As illustrated in FIG. 4, the first prism 16B is provided so as to protrude from the main surface of the first base material 16A toward the front side (the side opposite to the third light guide plate 14 side) in the Z-axis direction. The first prism 16B has a substantially triangular shape (is substantially mountain shaped) in a cross section taken along the Y-axis direction (a second direction orthogonal to the first direction) and extends linearly in the X-axis direction. A plurality of the first prisms 16B are continuously arranged side by side with substantially no interval therebetween in the Y-axis direction on the main surface of the first base material 16A. The first prism 16B includes a pair of inclined surfaces 16B1 and 16B2. Of the pair of inclined surfaces 16B1 and 16B2 in the first prism 16B, the inclined surface on the third LED 13 side in the Y-axis direction is the first prism inclined surface 16B1, and the inclined surface on the opposite side is the second prism inclined surface 16B2. The first prism inclined surface 16B1 has an inclination gradually upward from the third LED 13 side (the left side in FIG. 4) toward an opposite side (the right side in FIG. 4) thereto in the Y-axis direction in the first prism sheet 16. Of light incident on the first prism 16B, mainly the light traveling, in the Y-axis direction, in the direction approaching the third LED 13 is incident on the first prism inclined surface 16B1, and is refracted. The second prism inclined surface 16B2 has an inclination gradually upward from the side opposite to the third LED 13 (the right side in FIG. 4) toward the third LED 13 side (the left side in FIG. 4) in the Y-axis direction in the first prism sheet 16. Of the light incident on the first prism 16B, mainly the light traveling, in the Y-axis direction, in the direction away from the third LED 13 is incident on the second prism inclined surface 16B2, and is refracted. Most of the light refracted by the pair of inclined surfaces 16B1 and 16B2 in the first prism 16B is selectively raised and condensed in the Y-axis direction.

Then, as illustrated in FIG. 4, in the first prism 16B, when comparing an inclination angle θ1 formed by the first prism inclined surface 16B1 with respect to the Y-axis direction, and an inclination angle θ2 formed by the second prism inclined surface 16B2 with respect to the Y-axis direction, the former is larger than the latter. In other words, the first prism 16B has an asymmetrical cross-sectional shape, which is a scalene triangle. Specifically, the inclination angle θ1 of the first prism inclined surface 16B1 with respect to the Y-axis direction is preferably set within a range from 50° to 60°, and is most preferably set to 55°. In contrast, the inclination angle θ2 of the second prism inclined surface 16B2 with respect to the Y-axis direction is preferably set within a range from 35° to 50°, and is most preferably set to 45°. Further, an angle θ3 formed between the pair of inclined surfaces 16B1 and 16B2 in the first prism 16B is preferably set within a range from 70° to 95°, and is most preferably set to 80°. Note that all the plurality of first prisms 16B arranged in the Y-axis direction have substantially the same height dimension, substantially the same width dimension, substantially the same inclination angle of each of the inclined surfaces 16B1 and 16B2 with respect to the Y-axis direction, and the like, and are also arrayed such that array intervals between the adjacent first prisms 16B are substantially constant and equal.

As illustrated in FIG. 2, the second prism sheet 17 includes a second base material 17A having a sheet shape, and a second prism 17B provided on a main surface (light emission main surface) on the front side (light emission side) of the second base material 17A. The second base material 17A is formed of a substantially transparent synthetic resin, and specifically, is formed of, for example, a crystalline transparent resin material such as PET, which is the same as that of the first base material 16A. The second prism 17B is formed of an ultraviolet-curing resin material that is substantially transparent and is a type of photo-curable resin material. A manufacturing method of the second prism sheet 17 is similar to the manufacturing method of the first prism sheet 16 described above. The ultraviolet-curing resin material constituting the second prism 17B is, for example, an acrylic resin such as PMMA. A refractive index of the ultraviolet-curing resin material is set to be higher than the refractive index of the material of the first prism 16B, and is set to approximately 1.61, for example.

As illustrated in FIG. 4, the second prism 17B is provided so as to protrude from the main surface of the second base material 17A toward the front side (the side opposite to the first prism sheet 16 side) in the Z-axis direction. The second prism 17B has a substantially triangular shape (is substantially mountain shaped) in a cross section taken along the Y-axis direction and extends linearly in the X-axis direction. A plurality of the second prisms 17B are continuously arranged side by side with substantially no interval therebetween in the Y-axis direction on the main surface of the second base material 17A. The second prism 17B includes a pair of inclined surfaces 17B1 and 17B2. Of the pair of inclined surfaces 17B1 and 17B2 in the second prism 17B, the inclined surface on the third LED 13 side in the Y-axis direction is the third prism inclined surface (fifth inclined surface) 17B1, and the inclined surface on a side opposite to the third prism inclined surface 17B1 is the fourth prism inclined surface (sixth inclined surface) 17B2. The third prism inclined surface 17B1 has an inclination gradually upward from the third LED 13 side (the left side in FIG. 4) toward an opposite side (the right side in FIG. 4) thereto in the Y-axis direction in the second prism sheet 17. Of light incident on the second prism 17B, mainly the light traveling, in the Y-axis direction, in the direction approaching the third LED 13 is incident on the third prism inclined surface 17B1, and is refracted. The fourth prism inclined surface 17B2 has an inclination gradually upward from the side opposite the third LED 13 side (the right side in FIG. 4) to the third LED 13 side (the left side in FIG. 4) in the Y-axis direction in the second prism sheet 17. Of the light incident on the second prism 17B, mainly the light traveling, in the Y-axis direction, in the direction away from the third LED 13 is incident on the fourth prism inclined surface 17B2, and is refracted. Most of the light refracted by the pair of inclined surfaces 17B1 and 17B2 in the second prism 17B is selectively raised and condensed in the Y-axis direction.

Then, as illustrated in FIG. 4, in the second prism 17B, an inclination angle θ4 formed by the third prism inclined surface 17B1 with respect to the Y-axis direction, and an inclination angle θ5 formed by the fourth prism inclined surface 17B2 with respect to the Y-axis direction are the same. In other words, the second prism 17B has a symmetric cross-sectional shape, which is an isosceles triangle. Moreover, each of the inclination angles θ4 and 05 of the third prism inclined surface 17B1 and the fourth prism inclined surface 17B2 with respect to the Y-axis direction is smaller than the inclination angle θ1 of the first prism inclined surface 16B1 with respect to the Y-axis direction. Specifically, each of the inclination angles θ4 and 05 of the third prism inclined surface 17B1 and the fourth prism inclined surface 17B2 with respect to the Y-axis direction is preferably set within a range from 40° to 50°, and is most preferably set to 45°. In contrast, an angle θ6 formed between the pair of inclined surfaces 17B1 and 17B2 in the second prism 17B is preferably set within a range from 80° to 100°, and is most preferably set to 90°, that is, a right angle. Note that all the plurality of second prisms 17B arranged along the Y-axis direction have substantially the same height dimension, substantially the same width dimension, substantially the same inclination angle of each of the surfaces 17B1 and 17B2 with respect to the Y-axis direction, and the like, and are also arrayed such that array intervals between the adjacent second prisms 17B are substantially constant and equal. In addition, it is preferable that the height dimension and the array interval in the second prism 17B differ from the height dimension and the array interval in the first prism 16B, respectively, in terms of suppressing an occurrence of interference fringes called moire.

The first prism sheet 16 and the second prism sheet 17 having the configurations described above can obtain the following actions and effects. Specifically, most of the light emitted from the third light guide plate-light emission main surface 14B of the third light guide plate 14 and incident on the first prism sheet 16 is incident on the second prism inclined surface 16B2 of the first prism 16B and refracted, is then emitting while rising, or is directed to the first prism inclined surface 16B1. Here, the inclination angle θ1 formed by the first prism 16B with respect to the Y-axis direction is larger than the inclination angle θ2 formed by the second prism 17B with respect to the Y-axis direction. Thus, compared to a case in which the angles are the same or a magnitude relationship between the angles is reversed, the light incident on the first prism sheet 16 is less likely to be incident on the first prism inclined surface 16B1. When the incident light on the first prism sheet 16 is incident on the first prism inclined surface 16B1 of the first prism 16B, the light is not raised when the light is emitted from the first prism 16B, and tends to be more likely to be emitted as side lobe light (stray light). Thus, when it is made difficult for the incident light on the first prism sheet 16 to be directly incident on the first prism inclined surface 16B1 of the first prism 16B, an occurrence of side lobe light is suppressed, and, as a result, usage efficiency of light is improved.

Most of the light emitted from the first prism sheet 16 and incident on the second prism sheet 17 is incident on the fourth prism inclined surface 17B2 of the second prism 17B and refracted, and then, is raised and emitted, or is directed to the third prism inclined surface 17B1. Here, the inclination angle θ2 formed by the second prism 17B with respect to the Y-axis direction is smaller than the inclination angle θ1 formed by the first prism 16B with respect to the Y-axis direction. Thus, compared to a case in which the angles are the same or the magnitude relationship between the angles is reversed, light refracted by the fourth prism inclined surface 17B2 and directed to the third prism inclined surface 17B1 is more likely to be returned to the first prism sheet 16 side by the third prism inclined surface 17B1. As a result, the amount of the light (hereinafter referred to as recursive light) returned from the second prism sheet 17 to the first prism sheet 16 side is increased. This recursive light reaches the second prism sheet 17 again by being reflected or the like inside the backlight device 12, and is raised and emitted by either of the pair of inclined surfaces 17B1 and 17B2 in the second prism 17B, and thus the usage efficiency of the light is improved. Since an optical path of the recursive light up to being emitted from the second prism sheet 17 is complex, rise angles of the recursive light provided by the second prism 17B are also diversified, thereby improving viewing angle characteristics. As described above, viewing angle characteristics and brightness can be improved.

Figure 5:
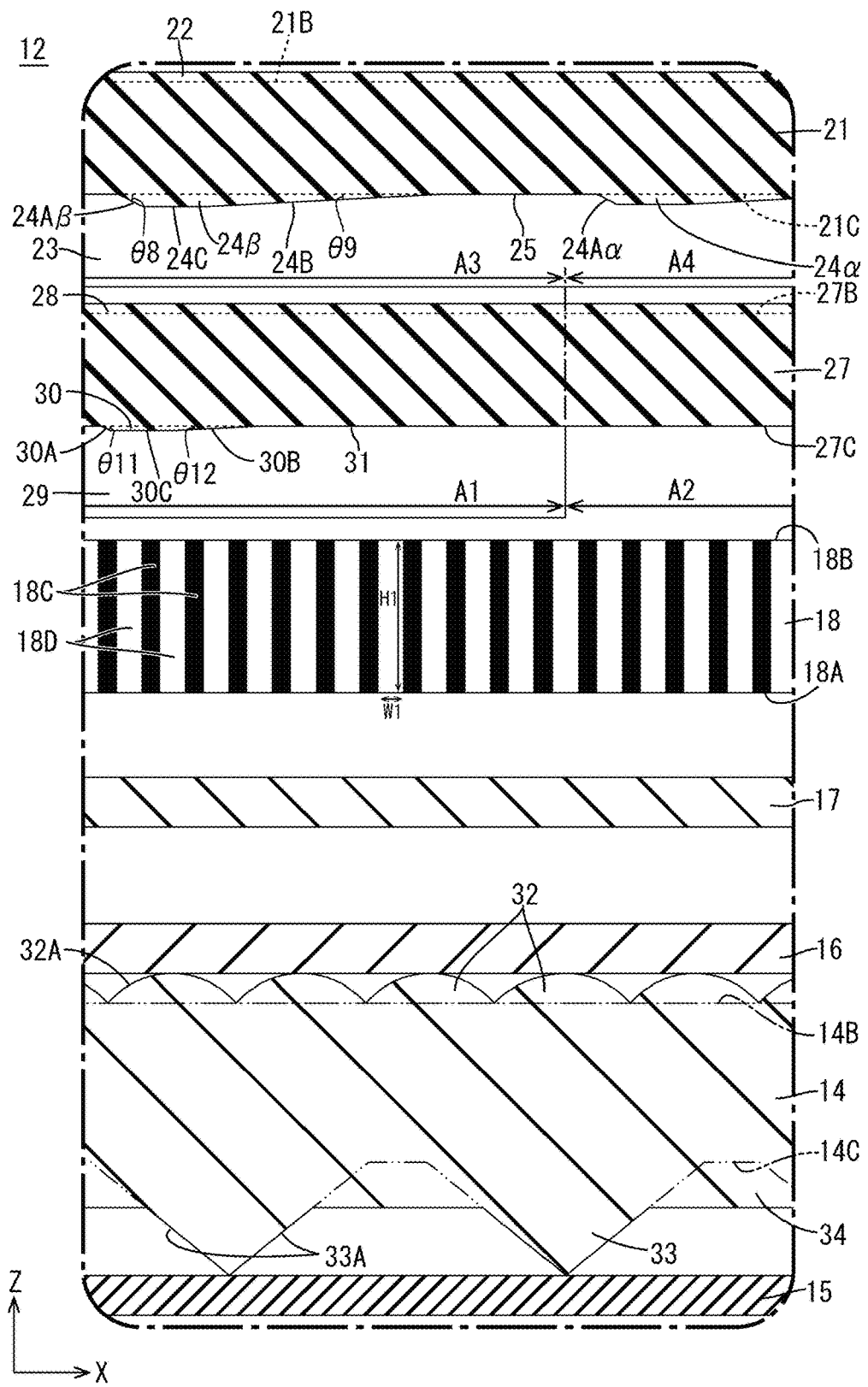
FIG. 5 is a cross-sectional view, taken at the same cutting position as that in FIG. 1, in the backlight device according to the first embodiment.

Next, a detailed structure of the third light guide plate 14 will be described. As illustrated in FIGS. 4 and 5, a first light guide plate lens 32, a second light guide plate lens 33, and a third light guide plate lens 34 are provided on the third light guide plate 14. As illustrated in FIG. 5, the first light guide plate lens 32 is provided on the third light guide plate-light emission main surface 14B of the third light guide plate 14. The first light guide plate lens 32 extends in the Y-axis direction, and a plurality of the first light guide plate lenses 32 are arranged side by side in the X-axis direction. In the present embodiment, the first light guide plate lens 32 is a so-called lenticular lens. The first light guide plate lens 32 has a convex shape protruding to the front side from the third light guide plate-light emission main surface 14B. Specifically, the first light guide plate lens 32 has a semi-circular shape in a cross section taken along the X-axis direction, and a semi-cylindrical shape extending linearly in the Y-axis direction. A front surface of the first light guide plate lens 32 is a first circular arc-shaped surface 32A. When an angle formed by a tangent line of a base end portion of the first circular arc-shaped surface 32A with respect to the X-axis direction is defined as a "contact angle", the contact angle of the first light guide plate lens 32 is approximately 62°, for example. All of the plurality of first light guide plate lenses 32 arranged side by side in the X-axis direction have substantially the same contact angle, substantially the same width dimension (substantially the same array interval), and substantially the same height dimension. In order to provide the first light guide plate lens 32 having such a configuration integrally with the third light guide plate 14, for example, the third light guide plate 14 may be manufactured by injection molding, and a transfer shape for transferring the first light guide plate lens 32 may be formed in advance on a molding face of a forming mold of the third light guide plate 14 for molding the third light guide plate-light emission main surface 14B.

As illustrated in FIG. 5, the second light guide plate lens 33 is provided on the third opposite main surface 14C of the third light guide plate 14. The second light guide plate lens 33 extends in the Y-axis direction, and a plurality of the second light guide plate lenses 33 are arranged side by side in the X-axis direction. In the present embodiment, the second light guide plate lens 33 is a convex shaped prism protruding to the back side from the third opposite main surface 14C. Specifically, the second light guide plate lens 33 has a substantially triangular shape (is substantially mountain shaped) in a cross section taken along the X-axis direction, and extends linearly in the Y-axis direction. A width dimension (dimension in the X-axis direction) of the second light guide plate lens 33 is set to be constant over the entire length in the Y-axis direction. The second light guide plate lens 33 has an approximately isosceles triangle cross-sectional shape and includes a pair of first light guide plate inclined surfaces 33A. An apex angle of the second light guide plate lens 33 is preferably set to an obtuse angle (an angle greater than 90°), specifically, within a range from 1000 to 150°, and is most preferably set to 140°. All of the plurality of second light guide plate lenses 33 arranged side by side in the X-axis direction have substantially the same apex angle, substantially the same width dimension (substantially the same array interval), and substantially the same height dimension. In the present embodiment, the array interval of the second light guide plate lenses 33 is greater than the array interval of the first light guide plate lenses 32. In order to provide the second light guide plate lens 33 having such a configuration integrally with the third light guide plate 14, for example, the third light guide plate 14 may be manufactured by injection molding, and a transfer shape for transferring the second light guide plate lens 33 may be formed in advance on a molding face of the forming mold of the third light guide plate 14 for molding the third light guide plate-light emission main surface 14B.

According to the third light guide plate 14 having such a configuration, as illustrated in FIG. 5, light propagating inside the third light guide plate 14 is repeatedly reflected as a result of being incident on the first circular arc-shaped surface 32A of each of the first light guide plate lenses 32 on the third light guide plate-light emission main surface 14B side in the Z-axis direction, and travels in a zigzag manner substantially in the X-axis direction. On the other hand, light propagating inside the third light guide plate 14 is repeatedly reflected as a result of being incident on the pair of first light guide plate inclined surfaces 33A of each of the second light guide plate lenses 33 on the third opposite main surface 14C side in the Z-axis direction, and travels in a zigzag manner substantially in the Y-axis direction. In this way, the light propagating inside the third light guide plate 14 is restricted from spreading in the X-axis direction, and thus unevenness of brightness and darkness is less likely to occur between a vicinity of the third LED 13 and the surroundings thereof in the X-axis direction.

As illustrated in FIG. 4, the third light guide plate lens 34 is provided on the third opposite main surface 14C of the third light guide plate 14. A plurality of the third light guide plate lenses 34 are arranged side by side at intervals in the Y-axis direction. The third light guide plate lens 34 protrudes to the back side from the third opposite main surface 14C in the Z-axis direction. The third light guide plate lens 34 includes a second light guide plate inclined surface 34A disposed on the side (the right side in FIG. 4) opposite to the third LED 13 in the Y-axis direction, a third light guide plate inclined surface 34B disposed on the side of the third LED 13 (the left side in FIG. 4) in the Y-axis direction, and a fourth light guide plate inclined surface 34C located between the second light guide plate inclined surface 34A and the third light guide plate inclined surface 34B. The second light guide plate inclined surface 34A has an inclination gradually upward from the side of the third LED 13 (the left side in FIG. 4) toward the side opposite to the third LED 13 (the right side in FIG. 4) in the Y-axis direction in the third light guide plate 14. The third light guide plate inclined surface 34B has an inclination gradually upward from the side (the right side in FIG. 4) opposite to the third LED 13 toward the side of the third LED 13 (the left side in FIG. 4) in the Y-axis direction in the third light guide plate 14. The fourth light guide plate inclined surface 34C has an inclination gradually upward from the side of the third LED 13 (the left side in FIG. 4) toward the side (the right side in FIG. 4) opposite to the third LED 13 in the Y-axis direction in the third light guide plate 14.

As illustrated in FIG. 4, the second light guide plate inclined surface 34A and the third light guide plate inclined surface 34B reflect light propagating inside the third light guide plate 14, and raise the light toward the front side so as to be at an angle close to the Z-axis direction. The second light guide plate inclined surface 34A and the third light guide plate inclined surface 34B can thus promote emission from the third light guide plate-light emission main surface 14B. Thus, it can be said that the plurality of third light guide plate lenses 34 having the second light guide plate inclined surface 34A and the third light guide plate inclined surface 34B constitute a "third light reflection portion 37", which reflects the light present in the third light guide plate 14 to promote light emission. Specifically, the second light guide plate inclined surface 34A mainly functions to reflect and raise light traveling away from the third LED 13 in the Y-axis direction. On the other hand, the third light guide plate inclined surface 34B mainly functions to reflect and raise light traveling toward the third LED 13 in the Y-axis direction. The second light guide plate inclined surface 34A has a gradient such that, the further from the third LED 13 in the Y-axis direction, the smaller the distance thereto from the third light guide plate-light emission main surface 14B (a portion at which the third light guide plate lens 34 is not installed). The second light guide plate inclined surface 34A has an inclination angle of approximately 8° with respect to the Y-axis direction, for example. The third light guide plate inclined surface 34B has a gradient such that, the further from the third LED 13 in the Y-axis direction, the larger the distance thereto from the third light guide plate-light emission main surface 14B, that is, has a gradient that is the reverse of that of the second light guide plate inclined surface 34A. The third light guide plate inclined surface 34B has a steep, near-vertical gradient at an inclination angle of approximately 80° with respect to the Y-axis direction, for example, and the inclination angle is greater than the inclination angle of the second light guide plate inclined surface 34A.

Figure 6:
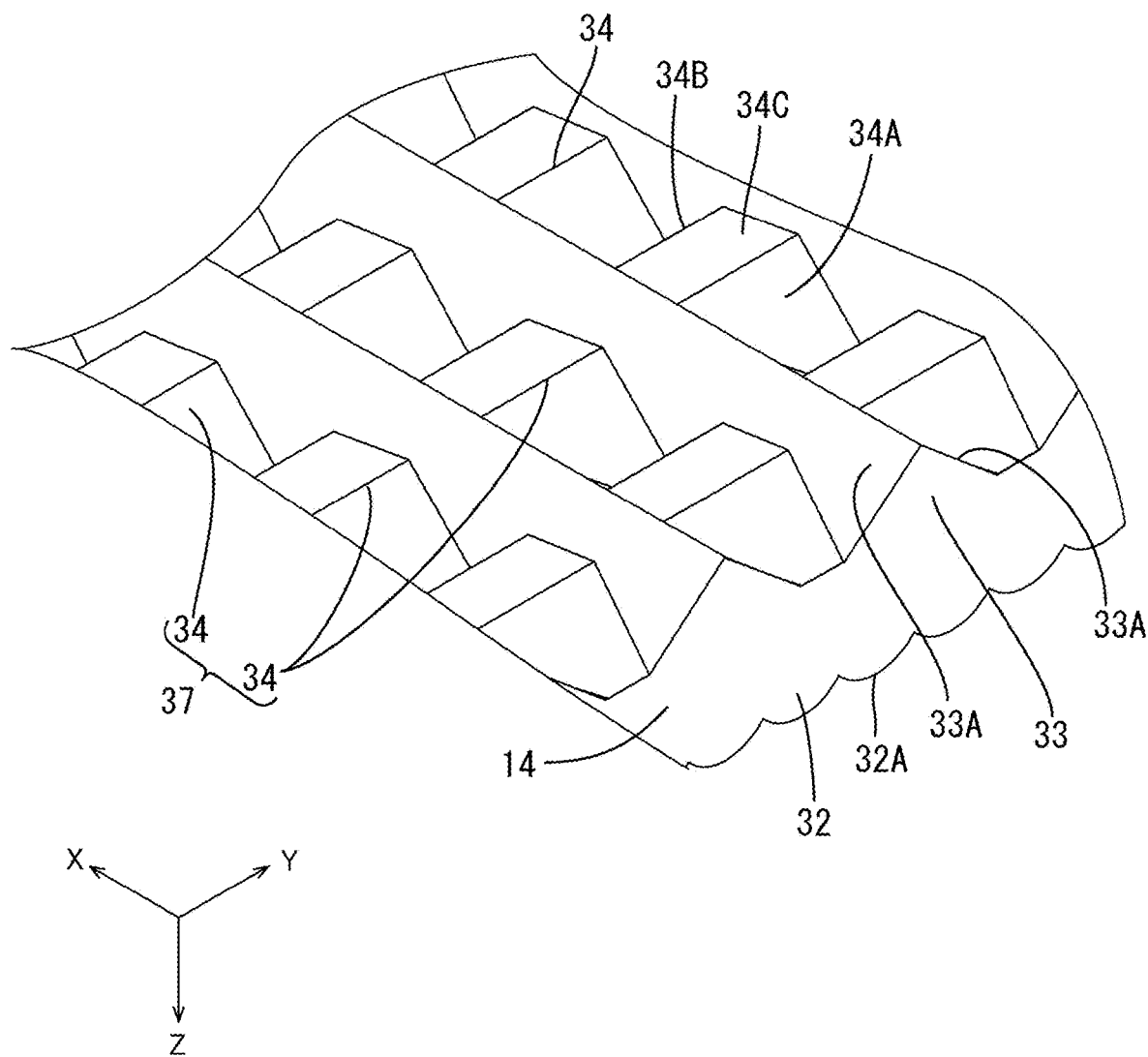
FIG. 6 is a perspective view when a third light guide plate constituting the backlight device according to the first embodiment is viewed from a third opposite main surface side.
Figure 7:
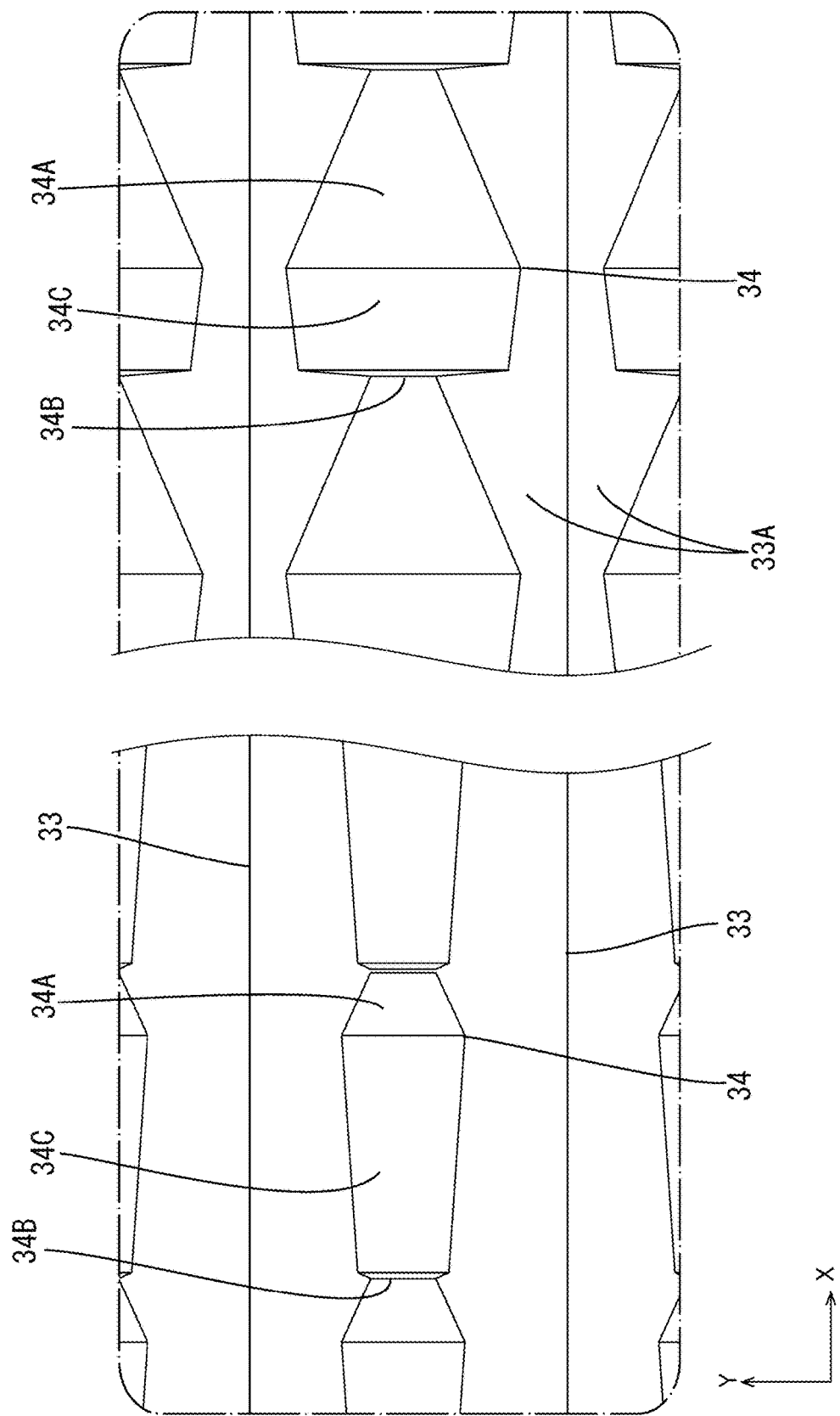
FIG. 7 is a bottom view illustrating a configuration of the third opposite main surface of the third light guide plate according to the first embodiment.

Further, as illustrated in FIGS. 4, 6, and 7, the plurality of third light guide plate lenses 34 arranged side by side in the Y-axis direction are designed such that a height dimension (the dimension in the Z-axis direction) and a length dimension (the dimension in the Y-axis direction) each increase the farther the third light guide plate lens 34 is from the third LED 13 in the Y-axis direction. More specifically, when comparing the third light guide plate lens 34 closer to the third LED 13 in the Y-axis direction with the third light guide plate lens 34 farther from the third LED 13 in the Y-axis direction, respective areas of the second light guide plate inclined surface 34A and the third light guide plate inclined surface 34B are larger in the latter than in the former. In this way, on a side closer to the third LED 13 in the Y-axis direction, light is less likely to be incident on the second light guide plate inclined surface 34A and the third light guide plate inclined surface 34B of the third light guide plate lens 34 and light emission is suppressed, while on a side farther from the third LED 13 in the Y-axis direction, light is more likely to be incident on the second light guide plate inclined surface 34A and the third light guide plate inclined surface 34B of the third light guide plate lens 34, and light emission is promoted. As a result, the amount of light emitted from the third light guide plate-light emission main surface 14B is made uniform between the third LED 13 side and the side opposite to the third LED 13 side in the Y-axis direction.

As illustrated in FIG. 4, of the fourth light guide plate inclined surface 34C, an end portion on the side (the right side in FIG. 4) opposite to the third LED 13 in the Y-axis direction is continuous with the second light guide plate inclined surface 34A, and an end portion on the side of the third LED 13 (the left side in FIG. 4) in the Y-axis direction is continuous with the third light guide plate inclined surface 34B. The fourth light guide plate inclined surface 34C has a gradient such that, the further from the third LED 13 in the Y-axis direction, the larger the distance thereto from the third light guide plate-light emission main surface 14B (the portion at which the third light guide plate lens 34 is not installed). That is, the fourth light guide plate inclined surface 34C has the gradient similar to that of the third light guide plate inclined surface 34B. The fourth light guide plate inclined surface 34C has an inclination angle of approximately 1.4° with respect to the Y-axis direction, for example, and the inclination angle is smaller than the inclination angle of each of the second light guide plate inclined surface 34A and the third light guide plate inclined surface 34B. The fourth light guide plate inclined surface 34C having such a configuration reflects light traveling away from the third LED 13 inside the third light guide plate 14, and thus, that light is directed to the third light guide plate-light emission main surface 14B side. However, an angle of incidence of the light with respect to the third light guide plate-light emission main surface 14B does not exceed a critical angle. Thus, that light is totally reflected by the third light guide plate-light emission main surface 14B, and is guided so as to travel farther away from the third LED 13. In this way, emission light from the third light guide plate-light emission main surface 14B is less likely to be biased toward the third LED 13 side in the Y-axis direction. As described above, the third light guide plate 14 is configured such that the inclination angles with respect to the Y-axis direction increase in the order of the fourth light guide plate inclined surface 34C, the second light guide plate inclined surface 34A, and the third light guide plate inclined surface 34B. Further, a plurality of the fourth light guide plate inclined surfaces 34C arranged side by side in the Y-axis direction are designed such that the length dimension thereof decreases the farther the fourth light guide plate inclined surface 34C is from the third LED 13 in the Y-axis direction. The reason for this is that the length dimension of the third light guide plate lens 34 increases the further from the third LED 13 in the Y-axis direction, and a range occupied by the third light guide plate lens 34 increases.

As illustrated in FIGS. 4, 6, and 7, the third light guide plate lens 34 having the configuration described above is disposed so as to be sandwiched between the two second light guide plate lenses 33 adjacent to each other in the X-axis direction. Thus, the third light guide plate lenses 34 are repeatedly arranged alternating with the second light guide plate lenses 33 in the X-axis direction. In the third light guide plate lens 34, a maximum value of a protrusion dimension (height dimension) from the third opposite main surface 14C is set to be smaller than the same protrusion dimension of the second light guide plate lens 33. Thus, even the third light guide plate lens 34 located on the farthest side from the third LED 13 in the Y-axis direction does not protrude farther toward the back side than the second light guide plate lens 33.

Next, a configuration of the first louver 18 will be described. As illustrated in FIG. 1, the first louver 18 includes a main surface having a sheet shape parallel to each of the main surfaces of the liquid crystal panel 11, the third light guide plate 14, and the like. Note that the main surface of the first louver 18 is parallel to the X-axis direction and the Y-axis direction, and a normal direction (thickness direction) of the main surface coincides with the Z-axis direction. The first louver 18 has a function of restricting an emission angle range of light in the X-axis direction. The first louver 18 has approximately the same size in a plan view as the third light guide plate 14, the first prism sheet 16, and the second prism sheet 17, and is disposed so as to overlap at least the entire display region AA in a plan view. The first louver 18 includes a first louver light incident main surface (seventh main surface) 18A on the back side, and a first louver light emission main surface (sixth main surface) 18B on the front side. The first louver light incident main surface 18A is disposed to be oriented toward the third light guide plate-light emission main surface 14B of the third light guide plate 14, and faces the main surface on the front side (light emission side) of the second prism sheet 17. The first louver light emission main surface 18B faces a first light guide plate opposite main surface 27C of a first light guide plate 27 to be described later.

As illustrated in FIG. 5, the first louver 18 includes a first light blocking portion 18C that blocks light, and a first light-transmitting portion 18D that transmits light. The first light blocking portion 18C is formed of, for example, a light blocking resin material (light blocking material) that exhibits a black color and blocks light. The first light blocking portion 18C has a layer shape extending in the Y-axis direction and the Z-axis direction, and a plurality of the first light blocking portions 18C are arranged side by side at intervals in the X-axis direction. The first light-transmitting portion 18D is formed of a light-transmissive resin material (light-transmissive material) that is substantially transparent and transmits light. The first light-transmitting portion 18D has a layer shape extending in the Y-axis direction and the Z-axis direction, and a plurality of the first light-transmitting portions 18D are arranged side by side at intervals in the X-axis direction. The plurality of first light blocking portions 18C and the plurality of first light-transmitting portions 18D are repeatedly and alternately arranged side by side in the X-axis direction. Thus, the first light-transmitting portion 18D is interposed between two of the first light blocking portions 18C that are adjacent to each other at the interval in the X-axis direction, and the first light blocking portion 18C is interposed between two of the first light-transmitting portions 18D that are adjacent to each other at the interval in the X-axis direction. Light incident on the first louver light incident main surface 18A of the first louver 18 is transmitted through the first light-transmitting portion 18D disposed between the two first light blocking portions 18C that are adjacent to each other in the X-axis direction, and is emitted from the first louver light emission main surface 18B. An emission angle, in the X-axis direction, of emission light from the first louver light emission main surface 18B is restricted by the two first light blocking portions 18C that are adjacent to each other in the X-axis direction. Note that emission light from the first louver light emission main surface 18B has an emission angle that is not restricted by the first louver 18 in the Y-axis direction. The emission angle range of emission light from the first louver light emission main surface 18B in the X-axis direction is defined by two straight lines that diagonally connect each of end portions in the Z-axis direction of the two first light blocking portions 18C that sandwich the first light-transmitting portion 18D. An emission angle range, in the X-axis direction, of transmitted light of the first light-transmitting portion 18D changes according to a ratio between a width W1 and a height H1 of the first light-transmitting portion 18D. Further, the first louver 18 includes a pair of sheet carriers that sandwich and carry the plurality of first light blocking portions 18C and the plurality of first light-transmitting portions 18D from the front side and the back side. The sheet carrier is formed of a light-transmissive resin material that is substantially transparent and transmits light. The sheet carrier extends over the entire first louver 18, and collectively carries the plurality of first light blocking portions 18C and the plurality of first light-transmitting portions 18D.

Specifically, as illustrated in FIG. 5, in the first louver 18, a ratio acquired by dividing the width W1 of the first light-transmitting portion 18D by the height H1 is equal to "tan 10°". In this way, a maximum absolute value of an angle formed by light transmitted through the first light-transmitting portion 18D with respect to the Z-axis direction is 10°. An emission angle range of the emission light of the backlight device 12 is sufficiently narrowed, compared to a case in which the ratio acquired by dividing the width of the first light-transmitting portion 18D by the height is greater than "tan 10°", for example. Accordingly, this is preferable in terms of limiting the viewing angle, such that the display image of the second display portion AA2 located in front of the front passenger seat in the display region AA is not visible from at least the driver's seat. Further, the amount of light blocked by the first light blocking portion 18C decreases, and usage efficiency of light is improved, compared to a case in which the ratio acquired by dividing the width of the first light-transmitting portion 18D by the height is smaller than "tan 10°".

Next, a configuration of the second backlight unit 12U2 will be described. As illustrated in FIGS. 1 and 2, the second backlight unit 12U2 includes at least a second LED (second light source) 20 and a second light guide plate 21 that guides light from the second LED 20.

As illustrated in FIG. 1, the second LED 20 has a substantially block shape, and one surface of a pair of surfaces along the Y-axis direction and the Z-axis direction is a second light-emitting surface 20A that emits light. As illustrated in FIG. 3, a plurality of the second LEDs 20 are arranged side by side at intervals in the Y-axis direction. The second LED 20 is mounted on an LED substrate. The second LED 20 has a configuration in which an LED chip is sealed with a sealing material on a substrate portion mounted on the LED substrate. The LED chip provided in the second LED 20 emits light of a single color, such as blue light, for example. A phosphor is dispersed and mixed in the sealing material provided in the second LED 20. The phosphor contained in the sealing material includes a yellow phosphor, a green phosphor, a red phosphor, and the like. The second LED 20 including such an LED chip and such a sealing material emits white light as a whole.

The second light guide plate 21 is formed of a synthetic resin material (for example, acrylic resin such as PMMA or the like) that has a sufficiently higher refractive index than that of the air and that is substantially transparent. As illustrated in FIG. 1, the second light guide plate 21 has a plate shape, and a main surface of the second light guide plate 21 is parallel to and overlaps the main surface of the liquid crystal panel 11 and the like. Note that the main surface of the second light guide plate 21 is parallel to the X-axis direction and the Y-axis direction, and a normal direction (thickness direction) of the main surface coincides with the Z-axis direction. The second light guide plate 21 is disposed so as to overlap at least the entire display region AA in a plan view. The second light guide plate 21 is arranged alongside the second LED 20 in the X-axis direction (first direction), and is also arranged side by side with the liquid crystal panel 11, the third light guide plate 14, the first louver 18, and the like in the Z-axis direction. The second light guide plate 21 is arranged on the other side (the left side in FIG. 1) of the second LED 20 in the X-axis direction. In other words, as illustrated in FIG. 3, the positional relationship (the positional relationship in the X-axis direction) between the second light guide plate 21 and the second LED 20 is orthogonal to the positional relationship (the positional relationship in the Y-axis direction) between the third light guide plate 14 and the third LED 13. In this way, the third LEDs 13 and the second LEDs 20 are disposed in a dispersed manner in a plan view, and thus, even when both the third LEDs 13 and the second LEDs 20 are turned on, heat is less likely to accumulate.

As illustrated in FIG. 1, of an outer peripheral end surface of the second light guide plate 21, one end surface is a second light incident end surface (second end surface) 21A facing the second light-emitting surface 20A of the second LED 20. The second light incident end surface 21A is a surface parallel to the second light-emitting surface 20A of the second LED 20, and light emitted from the second light-emitting surface 20A is incident on the second light incident end surface 21A. As described above, the second light guide plate 21 is provided with the first second LED 20 only on one side in the X-axis direction. Thus, the second backlight unit 12U2 is a one-side light incident edge light type. Of the pair of main surfaces of the second light guide plate 21, the main surface on the front side facing the diffuser sheet 12S is a second light guide plate-light emission main surface (third main surface) 21B that emits internally guided light. Of the pair of main surfaces of the second light guide plate 21, the main surface on the back side facing a first light guide plate-light emission main surface 27B of the first light guide plate 27 to be described later is a second opposite main surface (fourth main surface) 21C located on the opposite side to the second light guide plate-light emission main surface 21B. In the second light guide plate 21, the second opposite main surface 21C is disposed so as to face the first light guide plate 27 in the Z-axis direction. Then, the second light guide plate 21 can introduce, from the second light incident end surface 21A, light emitted from the second LED 20 toward the second light guide plate 21A, can propagate the light therein, and subsequently, can emit the light from the second light guide plate-light emission main surface 21B while causing the light to rise along the Z-axis direction such that the light is directed toward (onto the light emission side of) the diffuser sheet 12S (the liquid crystal panel 11). In addition, the second light guide plate 21 can introduce, from the second opposite main surface 21C, emission light from the first light guide plate 27, and can also emit the light from the second light guide plate-light emission main surface 21B toward the diffuser sheet 12S on the front side. Note that a normal direction of the second light incident end surface 21A coincides with the X-axis direction (the direction in which the second LED 20 and the second light guide plate 21 are arranged).

As illustrated in FIGS. 4 and 5, a fourth light guide plate lens 22, a fifth light guide plate lens 23, and a sixth light guide plate lens (second lens) 24 are provided on the second light guide plate 21. As illustrated in FIG. 4, the fourth light guide plate lens 22 is provided on the second light guide plate-light emission main surface 21B of the second light guide plate 21. The fourth light guide plate lens 22 extends in the X-axis direction, and a plurality of the fourth light guide plate lenses 22 are arranged side by side in the Y-axis direction. In the present embodiment, the fourth light guide plate lens 22 is a so-called lenticular lens. The fourth light guide plate lens 22 has a convex shape protruding from the second light guide plate-light emission main surface 21B to the front side. Specifically, the fourth light guide plate lens 22 has a semi-circular shape in a cross section taken along the Y-axis direction and a semi-cylindrical shape linearly extending in the X-axis direction, and a front surface of the fourth light guide plate lens 22 is a second circular arc-shaped surface 22A. When an angle formed by a tangent line of a base end portion of the second circular arc-shaped surface 22A with respect to the Y-axis direction is defined as a "contact angle", a contact angle $\theta c1$ of the fourth light guide plate lens 22 is approximately 30°, for example. All of the plurality of fourth light guide plate lenses 22 arranged in side by side the Y-axis direction have substantially the same contact angle $\theta c1$, substantially the same width dimension (substantially the same array interval), and substantially the same height dimension. In order to provide the fourth light guide plate lens 22 having such a configuration integrally with the second light guide plate 21, for example, the second light guide plate 21 may be manufactured by injection molding, and a transfer shape for transferring the fourth light guide plate lens 22 may be formed in advance on a molding face of a forming mold of the second light guide plate 21 for molding the second light guide plate-light emission main surface 21B.

As illustrated in FIG. 4, the fifth light guide plate lens 23 is provided on the second opposite main surface 21C of the second light guide plate 21. The fifth light guide plate lens 23 extends in the X-axis direction, and a plurality of the fifth light guide plate lenses 23 are arranged side by side in the Y-axis direction. In the present embodiment, the fifth light guide plate lens 23 is a convex-shaped prism protruding from the second opposite main surface 21C to the back side. Specifically, the fifth light guide plate lens 23 has a substantially triangular shape (is substantially mountain shaped) in a cross section taken along the Y-axis direction, and also extends linearly in the X-axis direction. A width dimension (dimension in the Y-axis direction) of the fifth light guide plate lens 23 is set to be constant over the entire length thereof in the X-axis direction. The fifth light guide plate lens 23 has an approximately isosceles triangle shape in a cross section, and includes a pair of fifth light guide plate inclined surfaces 23A. An apex angle $\theta 7$ of the fifth light guide plate lens 23 is preferably set to an obtuse angle (an angle greater than 90°), specifically, within a range from 1000 to 150°, and is most preferably set to 140°. All of the plurality of fifth light guide plate lenses 23 arranged side by side in the Y-axis direction have substantially the same apex angle $\theta 7$, substantially the same width dimension (substantially the same array interval), and substantially the same height dimension. In the present embodiment, the array interval of the fifth light guide plate lenses 23 is greater than the array interval of the fourth light guide plate lenses 22. In order to provide the fifth light guide plate lens 23 having such a configuration integrally with the second light guide plate 21, for example, the second light guide plate 21 may be manufactured by injection molding, and a transfer shape for transferring the fifth light guide plate lens 23 may be formed in advance on a molding face of the forming mold of the second light guide plate 21 for molding the second opposite main surface 21C.

As illustrated in FIG. 5, the sixth light guide plate lens 24 is provided on the second opposite main surface 21C of the second light guide plate 21. A plurality of the sixth light guide plate lenses 24 are arranged side by side with intervals therebetween in the X-axis direction. The sixth light guide plate lens 24 protrudes from the second opposite main surface 21C toward the back side in the Z-axis direction. The sixth light guide plate lens 24 includes a sixth light guide plate inclined surface 24A disposed on a side opposite (the left side in FIG. 5) to the second LED 20 side in the X-axis direction, a seventh light guide plate inclined surface 24B disposed on the second LED 20 side (the right side in FIG. 5) in the X-axis direction, and a first plane 24C located between the sixth light guide plate inclined surface 24A and the seventh light guide plate inclined surface 24B. The sixth light guide plate inclined surface 24A has an inclination gradually upward from the second LED 20 side (the right side in FIG. 5) toward the opposite side (the left side in FIG. 5) in the X-axis direction in the second light guide plate 21. The seventh light guide plate inclined surface 24B has an inclination gradually upward from the side (the left side in FIG. 5) opposite to the second LED 20 toward the side of the second LED 20 (the right side in FIG. 5) in the X-axis direction in the second light guide plate 21. The first plane 24C is a surface parallel to the X-axis direction and the Y-axis direction. Further, a second plane 25 is provided between two of the sixth light guide plate lenses 24 that are adjacent to each other in the X-axis direction. Thus, the sixth light guide plate lenses 24 and the second planes 25 are repeatedly and alternately arranged side by side in the X-axis direction.

Figure 8:
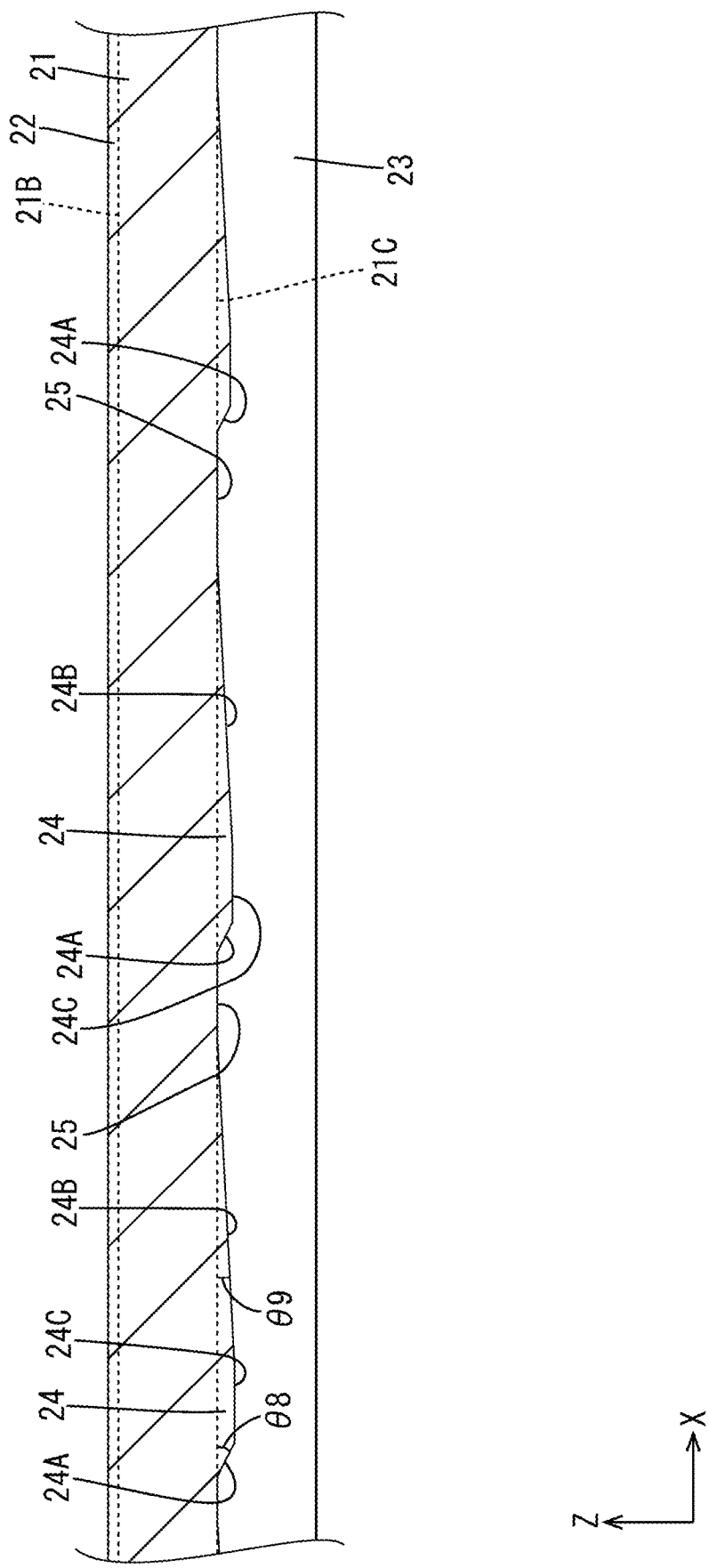
FIG. 8 is a side cross-sectional view of a second light guide plate constituting the backlight device according to the first embodiment.

As illustrated in FIG. 5, the sixth light guide plate inclined surface 24A reflects light propagating inside the second light guide plate 21 and raises the light toward the front side, and can thus promote emission from the second light guide plate-light emission main surface 21B. Thus, it can be said that the plurality of sixth light guide plate lenses 24 including the sixth light guide plate inclined surface 24A constitute a "second light reflection portion 36" that reflects light present in the second light guide plate 21 and thus promotes light emission. Specifically, the sixth light guide plate inclined surface 24A mainly functions to reflect and raise light traveling away from the second LED 20 in the X-axis direction inside the second light guide plate 21. Specifically, as illustrated in FIG. 8, an inclination angle (angle) θ8 of the sixth light guide plate inclined surface 24A with respect to the X-axis direction is set to be equal to or less than 40°, for example, and is preferably set to approximately 27°. When the inclination angle θ8 of the sixth light guide plate inclined surface 24A with respect to the X-axis direction is set to be equal to or less than 40°, light can be raised in a direction inclined to the opposite side to the second LED 20 in the X-axis direction, with respect to the front direction. Thus, in the emission light from the second light guide plate-light emission main surface 21B, with respect to the Z-axis direction (the normal direction of the second light guide plate-light emission main surface 21B), there is more light traveling toward the side opposite to the second LED 20 in the X-axis direction than there is light traveling toward the second LED 20 side in the X-axis direction. Thus, when the second LED 20 is turned on, it is possible to supply the emission light of a brightness angle distribution in which a peak brightness of the emission light is biased toward the side opposite to the second LED 20 side in the X-axis direction. In the liquid crystal display device 10 for vehicle use according to the present embodiment, the second LED 20 is preferably disposed on a side opposite to the driver seat side in the X-axis direction, that is, on the side of the front passenger seat.

On the other hand, as illustrated in FIG. 5, the seventh light guide plate inclined surface 24B can reflect and raise light traveling toward the second LED 20 in the X-axis direction, and can reflect light traveling away from the second LED 20 in the X-axis direction inside the second light guide plate 21 so as to guide the light farther away from the second LED 20. Specifically, as illustrated in FIG. 8, an inclination angle (angle) θ9 of the seventh light guide plate inclined surface 24B with respect to the X-axis direction is set to be within a range from 3° to 10°, for example, and is preferably set to be approximately 3°. The inclination angle θ9 of the seventh light guide plate inclined surface 24B is smaller than the inclination angle θ8 of the sixth light guide plate inclined surface 24A. According to the seventh light guide plate inclined surface 24B having such a configuration, when the light traveling toward the second LED 20 in the X-axis direction inside the second light guide plate 21 is incident on the seventh light guide plate inclined surface 24B and refracted, the light travels toward the side opposite to the second LED 20 side in the X-axis direction with respect to a front direction. In this way, the brightness of the emission light in a direction inclined with respect to the front direction can be further improved. Further, when the light traveling away from the second LED 20 in the X-axis direction inside the second light guide plate 21 is incident on the seventh light guide plate inclined surface 24B and refracted, the light is guided so as to travel farther away from the second LED 20. In this way, the emission light from the second light guide plate-light emission main surface 21B is less likely to be biased toward the second LED 20 side in the X-axis direction.

As illustrated in FIG. 5, the first plane 24C and the second plane 25 are parallel to the X-axis direction and the Y-axis direction, and the normal direction of the first plane 24C and the second plane 25 coincides with the Z-axis direction. Light emitted from the first light guide plate 27 to be described later and incident on the second opposite main surface 21C of the second light guide plate 21 travels while barely being refracted even when the light is incident on one of the first plane 24C and the second plane 25. Thus, compared to a case of a configuration in which, for example, the sixth light guide plate inclined surface 24A and the seventh light guide plate inclined surface 24B are directly connected without the first plane 24C being interposed therebetween, and to a case of a configuration in which, for example, two of the sixth light guide plate lenses 24 that are adjacent to each other in the X-axis direction are directly connected to each other without the second plane 25 being interposed therebetween, it is possible to suppress the occurrence of side lobe light traveling in a direction inclined to the side opposite to the second LED 20 side in the X-axis direction with respect to the front direction.

Figure 9:
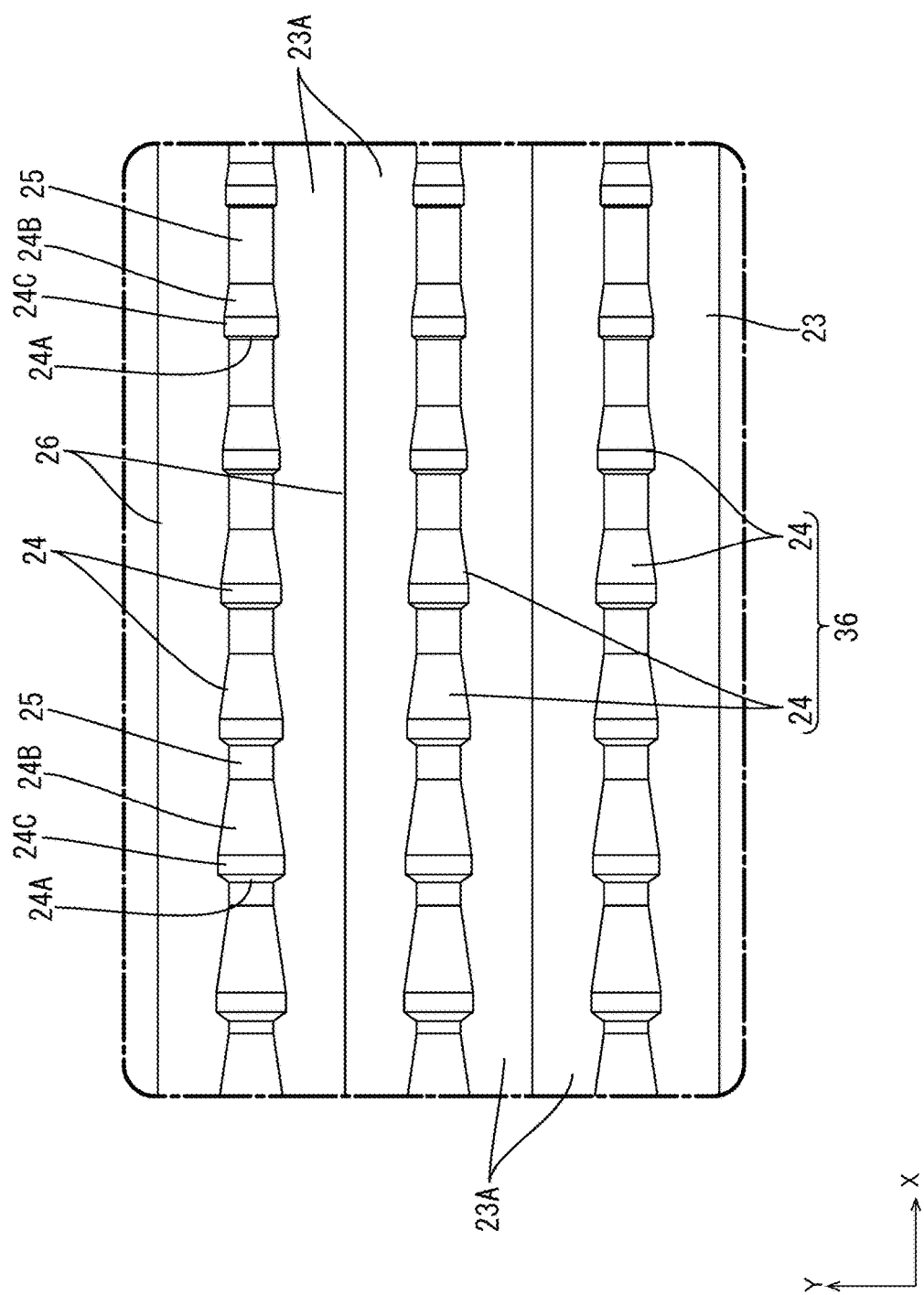
FIG. 9 is a bottom view illustrating a configuration of a second opposite main surface of the second light guide plate according to the first embodiment.

As illustrated in FIGS. 8 and 9, the plurality of sixth light guide plate lenses 24 arranged side by side in the X-axis direction are designed such that a height dimension (a dimension in the Z-axis direction) thereof increases the farther the sixth light guide plate lens 24 is from the second LED 20 in the X-axis direction, while an array pitch (array interval) in the X-axis direction is constant. The farther the sixth light guide plate inclined surface 24A is from the second LED 20 in the X-axis direction, the larger the width dimension (dimension in the X-axis direction) thereof, although the increase is slight. The farther the seventh light guide plate inclined surface 24B is from the second LED 20 in the X-axis direction, the larger the width dimension (dimension in the X-axis direction) thereof, and a rate of increase in the width dimensions of the seventh light guide plate inclined surfaces 24B is higher than a rate of increase of the wide dimensions of the sixth light guide plate inclined surfaces 24A. The width dimension (dimension in the X-axis direction) of the first plane 24C is set to be constant regardless of the position of the first plane 24C in the X-axis direction. The farther the second plane 25 is from the second LED 20 in the X-axis direction, the smaller the width dimension (dimension in the X-axis direction) thereof. The array pitch of the sixth light guide plate lenses 24 in the X-axis direction is a sum of the width dimension of the sixth light guide plate inclined surface 24A, the width dimension of the seventh light guide plate inclined surface 24B, the width dimension of the first plane 24C, and the width dimension of the second plane 25.

When a length dimension (dimension in the X-axis direction) of the second light guide plate 21 is set to be 300 mm, for example, the array pitch of the sixth light guide plate lenses 24 in the X-axis direction is set to be constant at approximately 0.114 mm, for example, and the width dimension of the first plane 24C is set to be constant at approximately 0.017 mm, for example. When the length dimension of the second light guide plate 21 is set to be 300 mm, for example, the width dimensions of the sixth light guide plate inclined surfaces 24A change over a range from 0.002 mm to 0.005 mm, for example, depending on the position of the sixth light guide plate lens 24 in the X-axis direction in the second light guide plate 21. When the length dimension of the second light guide plate 21 is set to 300 mm, for example, the width dimensions of the seventh light guide plate inclined surfaces 24B change over a range from 0.032 mm to 0.005 mm, for example, depending on the position of the sixth light guide plate lens 24 in the X-axis direction in the second light guide plate 21. When the length of the second light guide plate 21 is set to be 300 mm, for example, the width dimensions of the second planes 25 change over a range from 0.038 mm to 0.063 mm, for example, depending on the position of the sixth light guide plate lens 24 in the X-axis direction in the second light guide plate 21. A minimum value of the height dimension of the sixth light guide plate lens 24 is secured to be approximately 0.002 mm (2 m), for example. In this way, sufficient ease of manufacturing can be secured when the second light guide plate 21 is manufactured by resin molding. In order to secure the minimum value of the height dimension of the sixth light guide plate lens 24 to be approximately 0.002 mm, the inclination angle θ9 formed by the seventh light guide plate inclined surface 24B with respect to the X-axis direction is preferably set to be equal to or greater than 3°. Note that each of the inclination angle θ8 of the sixth light guide plate inclined surface 24A with respect to the X-axis direction and the inclination angle θ9 of the seventh light guide plate inclined surface 24B with respect to the X-axis direction is set to be constant regardless of the position of the second light guide plate 21 in the X-axis direction.

As illustrated in FIGS. 4 and 9, the sixth light guide plate lens 24 having the configuration described above is sandwiched and disposed between two of the fifth light guide plate lenses 23 that are adjacent to each other in the Y-axis direction. Thus, the sixth light guide plate lenses 24 are repeatedly disposed in an alternating manner with the fifth light guide plate lenses 23 in the Y-axis direction. In the sixth light guide plate lens 24, a maximum value of the height dimension (protrusion dimension from the second opposite main surface 21C) is set to be smaller than the height dimension of the fifth light guide plate lens 23. Therefore, even the sixth light guide plate lens 24 located on a farthest side from the second LED 20 in the X-axis direction does not protrude farther toward the back side than the fifth light guide plate lens 23.

Next, the configuration of the first backlight unit 12U1 will be described. As illustrated in FIGS. 1 and 2, the first backlight unit 12U1 includes at least a first LED (first light source) 26 and a first light guide plate 27 that guides light from the first LED 26.

As illustrated in FIG. 1, the first LED 26 has a substantially block shape, and one surface of a pair of surfaces along the Y-axis direction and the Z-axis direction is a first light-emitting surface 26A that emits light. As illustrated in FIG. 3, a plurality of the first LEDs 26 are arranged side by side at intervals in the Y-axis direction. The first LED 26 is mounted on an LED substrate. The first LED 26 has a configuration in which an LED chip is sealed with a sealing material on a substrate portion mounted on the LED substrate. The LED chip provided in the first LED 26 emits light of a single color, such as blue light, for example. A phosphor is dispersed and mixed in the sealing material provided in the first LED 26. The phosphor contained in the sealing material includes a yellow phosphor, a green phosphor, a red phosphor, and the like. The first LED 26 including such an LED chip and such a sealing material emits white light as a whole.

The first light guide plate 27 is formed of a synthetic resin material (for example, acrylic resin such as PMMA or the like) that has a sufficiently higher refractive index than that of the air and that is substantially transparent. As illustrated in FIG. 1, the first light guide plate 27 has a plate shape, and a main surface of the first light guide plate 27 is parallel to and overlaps the main surface of the liquid crystal panel 11 and the like. Note that the main surface of the first light guide plate 27 is parallel to the X-axis direction and the Y-axis direction, and a normal direction (thickness direction) of the main surface coincides with the Z-axis direction. The first light guide plate 27 is disposed so as to overlap at least the entire display region AA in a plan view. The main surfaces of the first light guide plate 27 and the second light guide plate 21 overlap each other. The first light guide plate 27 and the second light guide plate 21 overlapping each other are disposed on the opposite side (front side) to the third light guide plate 14 side with respect to the first louver 18. The first light guide plate 27 is arranged alongside the first LED 26 in the X-axis direction (first direction), and is also arranged side by side with the liquid crystal panel 11, the third light guide plate 14, the first louver 18, and the like in the Z-axis direction. The first light guide plate 27 is arranged on the other side (the left side in FIG. 1) of the first LED 26 in the X-axis direction. In other words, as illustrated in FIG. 3, the positional relationship (the positional relationship in the X-axis direction) between the first light guide plate 27 and the first LED 26 is the same as the positional relationship (the positional relationship in the X-axis direction) between the second light guide plate 21 and the second LED 20, and is orthogonal to the positional relationship (the positional relationship in the Y-axis direction) between the third first light guide plate 14 and the third LED 13. In this way, the third LEDs 13 and the first LEDs 26 are disposed in a dispersed manner in a plan view, and thus, even when both the third LEDs 13 and the first LEDs 26 are turned on, heat is less likely to accumulate.

As illustrated in FIG. 1, an end surface of an outer peripheral end surface of the first light guide plate 27 is a first light incident end surface (first end surface) 27A facing the first light-emitting surface 26A of the first LED 26. The first light incident end surface 27A is a surface parallel to the first light-emitting surface 26A of the first LED 26, and light emitted from the first light-emitting surface 26A is incident on the first light incident end surface 27A. As described above, the first light guide plate 27 is provided with the first LED 26 only on one side in the X-axis direction. Thus, the first backlight unit 12U1 is a one-side light incident edge light type. Of the pair of main surfaces of the first light guide plate 27, the main surface on the front side facing the second light guide plate 21 is a first light guide plate-light emission main surface (first main surface) 27B that emits internally guided light. Of the pair of main surfaces of the first light guide plate 27, the main surface on the back side facing the first louver 18 is a first opposite main surface (second main surface) 27C located on the opposite side to the first light guide plate-light emission main surface 27B. In the first light guide plate 27, the first opposite main surface 27C is disposed so as to face the first louver light emission main surface 18B of the first louver 18 in the Z-axis direction. Then, the first light guide plate 27 can introduce, from the first light incident end surface 27A, light emitted from the first LED 26 toward the first light guide plate 27, can propagate the light therein, and subsequently, can emit the light from the first light guide plate-light emission main surface 27B while causing the light to rise along the Z-axis direction toward the second light guide plate 21 (the liquid crystal panel 11) on the front side (the light emission side). In addition, the first light guide plate 27 can introduce, from the first opposite main surface 27C, emission light from the first louver 18, and can also emit the light from the first light guide plate-light emission main surface 27B toward the second light guide plate 21 on the front side. Note that a normal direction of the first light incident end surface 27A coincides with the X-axis direction (the direction in which the first LED 26 and the first light guide plate 27 are arranged).

As illustrated in FIGS. 4 and 5, a seventh light guide plate lens 28, an eighth light guide plate lens 29, and a ninth light guide plate lens (first lens) 30 are provided on the first light guide plate 27. As illustrated in FIG. 4, the seventh light guide plate lens 28 is provided on the first light guide plate-light emission main surface 27B of the first light guide plate 27. The seventh light guide plate lens 28 extends along the X-axis direction, and a plurality of the seventh light guide plate lenses 28 are disposed side by side in the Y-axis direction. In the present embodiment, the seventh light guide plate lens 28 is a so-called lenticular lens. The seventh light guide plate lens 28 has a convex shape protruding from the first light guide plate-light emission main surface 27B to the front side. Specifically, the seventh light guide plate lens 28 has a semi-circular shape in a cross section taken along the Y-axis direction and a semi-cylindrical shape linearly extending in the X-axis direction, and a front surface of the seventh light guide plate lens 28 is a third circular arc-shaped surface 28A. When an angle formed by a tangent line of a base end portion of the third circular arc-shaped surface 28A with respect to the Y-axis direction is defined as a "contact angle", a contact angle θc2 of the seventh light guide plate lens 28 is approximately 30°, for example. All of the plurality of seventh light guide plate lenses 28 arranged side by side in the Y-axis direction have substantially the same contact angle θc2, substantially the same width dimension (substantially the same array interval), and substantially the same height dimension. In order to provide the seventh light guide plate lens 28 having such a configuration integrally with the first light guide plate 27, for example, the first light guide plate 27 may be manufactured by injection molding, and a transfer shape for transferring the seventh light guide plate lens 28 may be formed in advance on a molding face of a forming mold of the first light guide plate 27 for molding the first light guide plate-light emission main surface 27B.

As illustrated in FIG. 4, the eighth light guide plate lens 29 is provided on the first opposite main surface 27C of the first light guide plate 27. The eighth light guide plate lens 29 extends in the X-axis direction, and a plurality of the eighth light guide plate lenses 29 are arranged side by side in the Y-axis direction. In the present embodiment, the eighth light guide plate lens 29 is a convex-shaped prism protruding from the first opposite main surface 27C to the back side. Specifically, the eighth light guide plate lens 29 has a substantially triangular shape (is substantially mountain shaped) in a cross section taken along the Y-axis direction, and also extends linearly in the X-axis direction. A width dimension (dimension in the Y-axis direction) of the eighth light guide plate lens 29 is set to be constant over the entire length thereof in the X-axis direction. The eighth light guide plate lens 29 has an approximately isosceles triangle shape in a cross section, and includes a pair of eighth light guide plate inclined surfaces 29A. An apex angle θ10 of the eighth light guide plate lens 29 is preferably set to an obtuse angle (an angle greater than 90°), specifically, within a range from 1000 to 150°, and is most preferably set to 140°. All of the plurality of eighth light guide plate lenses 29 arranged side by side in the Y-axis direction have substantially the same apex angle θ10, substantially the same width dimension (substantially the same array interval), and substantially the same height dimension. In the present embodiment, the array interval of the eighth light guide plate lenses 29 is greater than the array interval of the seventh light guide plate lenses 28. In order to provide the eighth light guide plate lens 29 having such a configuration integrally with the first light guide plate 27, for example, the first light guide plate 27 may be manufactured by injection molding, and a transfer shape for transferring the eighth light guide plate lens 29 may be formed in advance on a molding face of the forming mold of the first light guide plate 27 for molding the first opposite main surface 27C.

As illustrated in FIG. 5, the ninth light guide plate lens 30 is provided on the first opposite main surface 27C of the first light guide plate 27. A plurality of the ninth light guide plate lenses 30 are arranged side by side with intervals therebetween in the X-axis direction. The ninth light guide plate lens 30 protrudes from the first opposite main surface 27C toward the back side in the Z-axis direction. The ninth light guide plate lens 30 includes a ninth light guide plate inclined surface (third inclined surface) 30A disposed on a side opposite (the left side in FIG. 5) to the first LED 26 side in the X-axis direction, a tenth light guide plate inclined surface 30B disposed on the first LED 26 side (the right side in FIG. 5) in the X-axis direction, and a third plane 30C located between the ninth light guide plate inclined surface 30A and the tenth light guide plate inclined surface 30B. The ninth light guide plate inclined surface 30A has an inclination gradually upward from the first LED 26 side (the right side in FIG. 5) toward the side opposite (the left side in FIG. 5) to the first LED 26 in the X-axis direction in the first light guide plate 27. The tenth light guide plate inclined surface 30B has an inclination gradually upward from the side (the left side in FIG. 5) opposite to the first LED 26 side toward the side of the first LED 26 (the right side in FIG. 5) in the X-axis direction in the first light guide plate 27. The third plane 30C is a surface parallel to the X-axis direction and the Y-axis direction. Further, a fourth plane 31 is provided between two of the ninth light guide plate lenses 30 that are adjacent to each other in the X-axis direction. Thus, the ninth light guide plate lenses 30 and the fourth planes 31 are repeatedly and alternately arranged side by side in the X-axis direction.

As illustrated in FIG. 5, the ninth light guide plate inclined surface 30A reflects light propagating inside the first light guide plate 27 and raises the light toward the front side, and can thus promote emission from the first light guide plate-light emission main surface 27B. Thus, it can be said that the plurality of ninth light guide plate lenses 30 including the ninth light guide plate inclined surface 30A constitute a "first light reflection portion 35" that reflects light present in the first light guide plate 27 and thus promotes light emission. Specifically, the ninth light guide plate inclined surface 30A mainly functions to reflect and raise light traveling away from the first LED 26 in the X-axis direction inside the first light guide plate 27. Specifically, an inclination angle (angle) θ11 of the ninth light guide plate inclined surface 30A with respect to the X-axis direction is set to be equal to or less than 40°, for example, and is preferably set to approximately 27°. When the inclination angle θ11 of the ninth light guide plate inclined surface 30A with respect to the X-axis direction is set to be equal to or less than 40°, light can be raised in a direction inclined to the opposite side to the first LED 26 in the X-axis direction, with respect to the front direction. Thus, in the emission light from the first light guide plate-light emission main surface 27B, with respect to the Z-axis direction (the normal direction of the first light guide plate-light emission main surface 27B), there is more light traveling toward the side opposite to the first LED 26 in the X-axis direction than there is light traveling toward the first LED 26 side in the X-axis direction. Thus, when the first LED 26 is turned on, it is possible to supply the emission light of a brightness angle distribution in which a peak brightness of the emission light is biased toward the side opposite to the first LED 26 side in the X-axis direction. The inclination angle θ11 of the ninth light guide plate inclined surface 30A with respect to the X-axis direction is equal to the inclination angle θ8 of the sixth light guide plate inclined surface 24A with respect to the X-axis direction. In the liquid crystal display device 10 for vehicle use according to the present embodiment, the first LED 26 is preferably disposed on a side opposite to the driver seat side in the X-axis direction, that is, on the side of the front passenger seat.

On the other hand, as illustrated in FIG. 5, the tenth light guide plate inclined surface 30B can reflect and raise light traveling toward the first LED 26 in the X-axis direction, and can reflect light traveling away from the first LED 26 in the X-axis direction inside the first light guide plate 27 so as to guide the light farther away from the first LED 26. Specifically, an inclination angle (angle) θ12 of the tenth light guide plate inclined surface 30B with respect to the X-axis direction is set to be within a range from 3° to 10°, for example, and is preferably set to be approximately 3°. The inclination angle θ12 of the tenth light guide plate inclined surface 30B is smaller than the inclination angle θ11 of the ninth light guide plate inclined surface 30A. According to the tenth light guide plate inclined surface 30B having such a configuration, when the light traveling toward the first LED 26 in the X-axis direction inside the first light guide plate 27 is incident on the tenth light guide plate inclined surface 30B and refracted, the light travels toward the side opposite to the first LED 26 side in the X-axis direction with respect to the front direction. In this way, the brightness of the emission light in a direction inclined with respect to the front direction can be further improved. Further, when the light traveling away from the first LED 26 in the X-axis direction inside the first light guide plate 27 is incident on the tenth light guide plate inclined surface 30B and refracted, the light is guided so as to travel farther away from the first LED 26. In this way, the emission light from the first light guide plate-light emission main surface 27B is less likely to be biased toward the first LED 26 side in the X-axis direction. The inclination angle θ12 of the tenth light guide plate inclined surface 30B with respect to the X-axis direction is equal to the inclination angle θ9 of the seventh light guide plate inclined surface 24B with respect to the X-axis direction.

As illustrated in FIG. 5, the third plane 30C and the fourth plane 31 are parallel to the X-axis direction and the Y-axis direction, and the normal direction of the third plane 30C and the fourth plane 31 coincides with the Z-axis direction. Light emitted from the first louver 18 and incident on the first opposite main surface 27C of the first light guide plate 27 travels while barely being refracted even when the light is incident on one of the third plane 30C and the fourth plane 31. Thus, compared to a case of a configuration in which, for example, the ninth light guide plate inclined surface 30A and the tenth light guide plate inclined surface 30B are directly connected without the third plane 30C being interposed therebetween, and to a case of a configuration in which, for example, two of the ninth light guide plate lenses 30 that are adjacent to each other in the X-axis direction are directly connected to each other without the fourth plane 31 being interposed therebetween, it is possible to suppress the occurrence of side lobe light traveling in a direction inclined to the side opposite to the first LED 26 side in the X-axis direction with respect to the front direction.

As illustrated in FIG. 5, the plurality of ninth light guide plate lenses 30 arranged side by side in the X-axis direction are designed such that a height dimension (a dimension in the Z-axis direction) thereof increases the farther the ninth light guide plate lens 30 is from the first LED 26 in the X-axis direction, while an array pitch (array interval) in the X-axis direction is constant. Note that the configuration of the ninth light guide plate lens 30 is substantially the same as the configuration of the sixth light guide plate lens 24 illustrated in FIGS. 8 and 9. The farther the ninth light guide plate inclined surface 30A is from the first LED 26 in the X-axis direction, the larger the width dimension (dimension in the X-axis direction) thereof, although the increase is slight. The farther the tenth light guide plate inclined surface 30B is from the first LED 26 in the X-axis direction, the larger the width dimension (dimension in the X-axis direction) thereof, and a rate of increase in the width dimensions of the tenth light guide plate inclined surfaces 30B is higher than a rate of increase of the wide dimensions of the ninth light guide plate inclined surfaces 30A. The width dimension (dimension in the X-axis direction) of each of the third planes 30C is set to be constant regardless of the position of the third plane 30C in the X-axis direction. The farther the fourth plane 31 is from the first LED 26 in the X-axis direction, the smaller the width dimension (dimension in the X-axis direction) thereof. The array pitch of the ninth light guide plate lenses 30 in the X-axis direction is a sum of the width dimension of the ninth light guide plate inclined surface 30A, the width dimension of the tenth light guide plate inclined surface 30B, the width dimension of the third plane 30C, and the width dimension of the fourth plane 31.

When a length dimension (dimension in the X-axis direction) of the first light guide plate 27 is set to be 300 mm, for example, the array pitch of the ninth light guide plate lenses 30 in the X-axis direction is set to be constant at approximately 0.114 mm, for example, and the width dimension of the third plane 30C is set to be constant at approximately 0.017 mm, for example. When the length dimension of the first light guide plate 27 is set to be 300 mm, for example, the width dimensions of the ninth light guide plate inclined surfaces 30A change over a range from 0.002 mm to 0.005 mm, for example, depending on the position of the ninth light guide plate lens 30 in the X-axis direction in the first light guide plate 27. When the length dimension of the first light guide plate 27 is set to 300 mm, for example, the width dimensions of the tenth light guide plate inclined surfaces 30B change over a range from 0.032 mm to 0.005 mm, for example, depending on the position of the ninth light guide plate lens 30 in the X-axis direction in the first light guide plate 27. When the length of the first light guide plate 27 is set to be 300 mm, for example, the width dimensions of the fourth planes 31 change over a range from 0.038 mm to 0.063 mm, for example, depending on the position of the ninth light guide plate lens 30 in the X-axis direction in the first light guide plate 27. A minimum value of the height dimension of the ninth light guide plate lens 30 is secured to be approximately 0.002 mm (2 m), for example. In this way, sufficient ease of manufacturing can be secured when the first light guide plate 27 is manufactured by resin molding. In order to secure the minimum value of the height dimension of the ninth light guide plate lens 30 to be approximately 0.002 mm, the inclination angle θ12 formed by the tenth light guide plate inclined surface 30B with respect to the X-axis direction is preferably set to be equal to or greater than 3°. Note that the inclination angle θ11 of the ninth light guide plate inclined surface 30A with respect to the X-axis direction and the inclination angle θ12 of the tenth light guide plate inclined surface 30B with respect to the X-axis direction are both set to be constant regardless of the position thereof in the X-axis direction in the first light guide plate 27.

As illustrated in FIG. 4, the ninth light guide plate lens 30 having the configuration described above is sandwiched and disposed between two of the eighth light guide plate lenses 29 that are adjacent to each other in the Y-axis direction. Thus, the ninth light guide plate lenses 30 are repeatedly disposed in an alternating manner with the eighth light guide plate lenses 29 in the Y-axis direction. In the ninth light guide plate lens 30, a maximum value of the height dimension (protrusion dimension from the first opposite main surface 27C) is set to be smaller than the height dimension of the eighth light guide plate lens 29. Therefore, even the ninth light guide plate lens 30 located on a farthest side from the first LED 26 in the X-axis direction does not protrude farther toward the back side than the eighth light guide plate lens 29.

Figure 10:
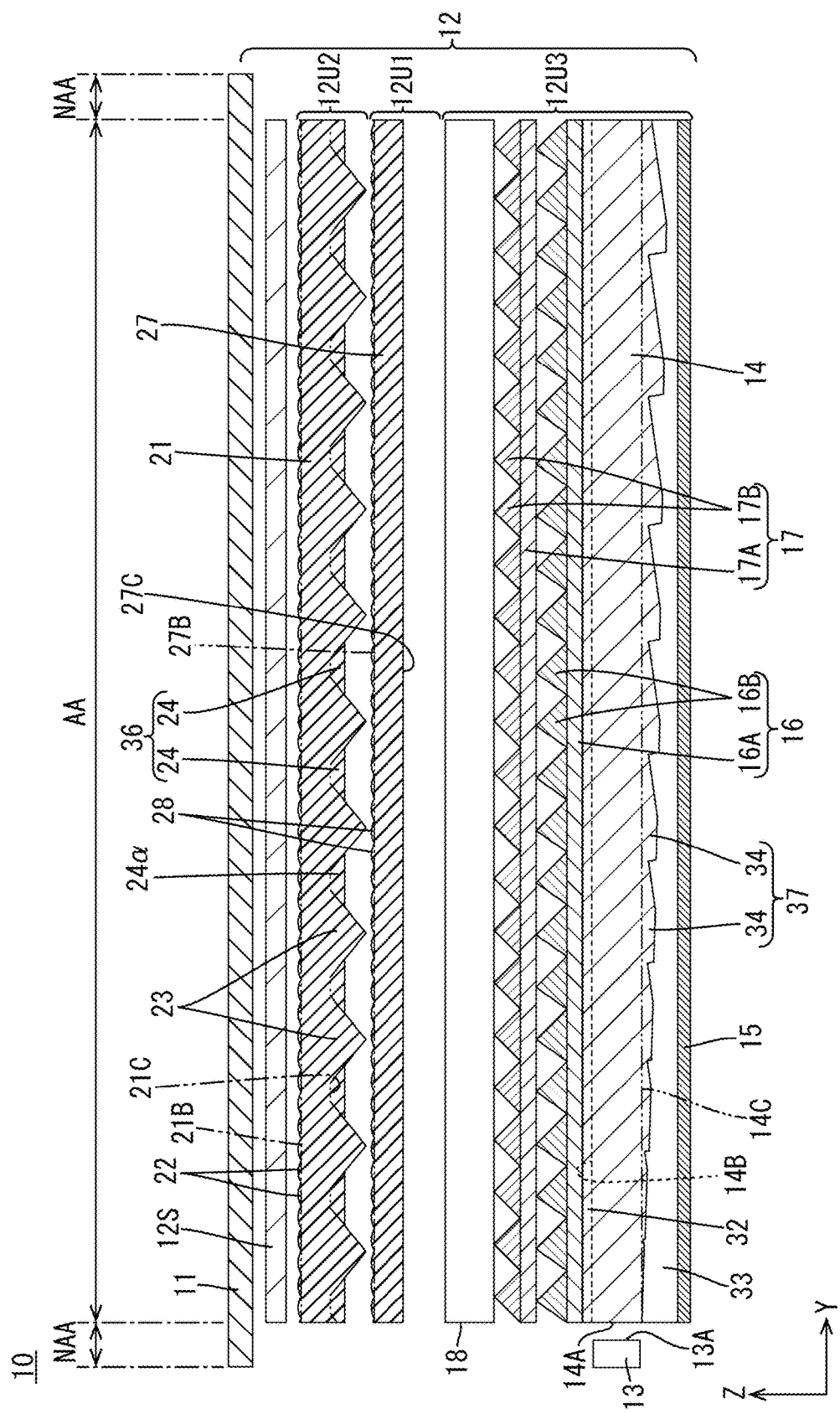
FIG. 10 is a cross-sectional view of the liquid crystal display device according to the first embodiment taken along a line x-x in FIG. 1.

As illustrated in FIGS. 1, 2, and 10, in the first light guide plate 27 and the second light guide plate 21 according to the present embodiment, formation ranges of the first light reflection portion 35 and the second light reflection portion 36 are set as follows. That is, when the first opposite main surface 27C is divided into a first region A1 overlapping the first display portion AA1 of the display region AA and a second region A2 overlapping the second display portion AA2 of the display region AA and adjacent to the first region A1 in the X-axis direction, the first light reflection portion 35 is selectively provided in the first region A1 in the first opposite main surface 27C. That is, the first light reflection portion 35 is selectively not formed in the second region A2 of the first opposite main surface 27C (particularly, see FIGS. 1 and 10). On the other hand, when the second opposite main surface 21C is divided into a third region A3 overlapping the first region A1 (the first display portion AA1) and a fourth region A4 overlapping the second region A2 (the second display portion AA2), the second light reflection portion 36 is provided at least in the fourth region A4 in the second opposite main surface 21C. Specifically, the second light reflection portion 36 is provided over the third region A3 and the fourth region A4 in the second opposite main surface 21C, and is provided over substantially the entire region of the second opposite main surface 21C. Further, an area ratio between the first region A1 (the third region A3) and the second region A2 (the fourth region A4) is 1:1, for example.

Figure 11:
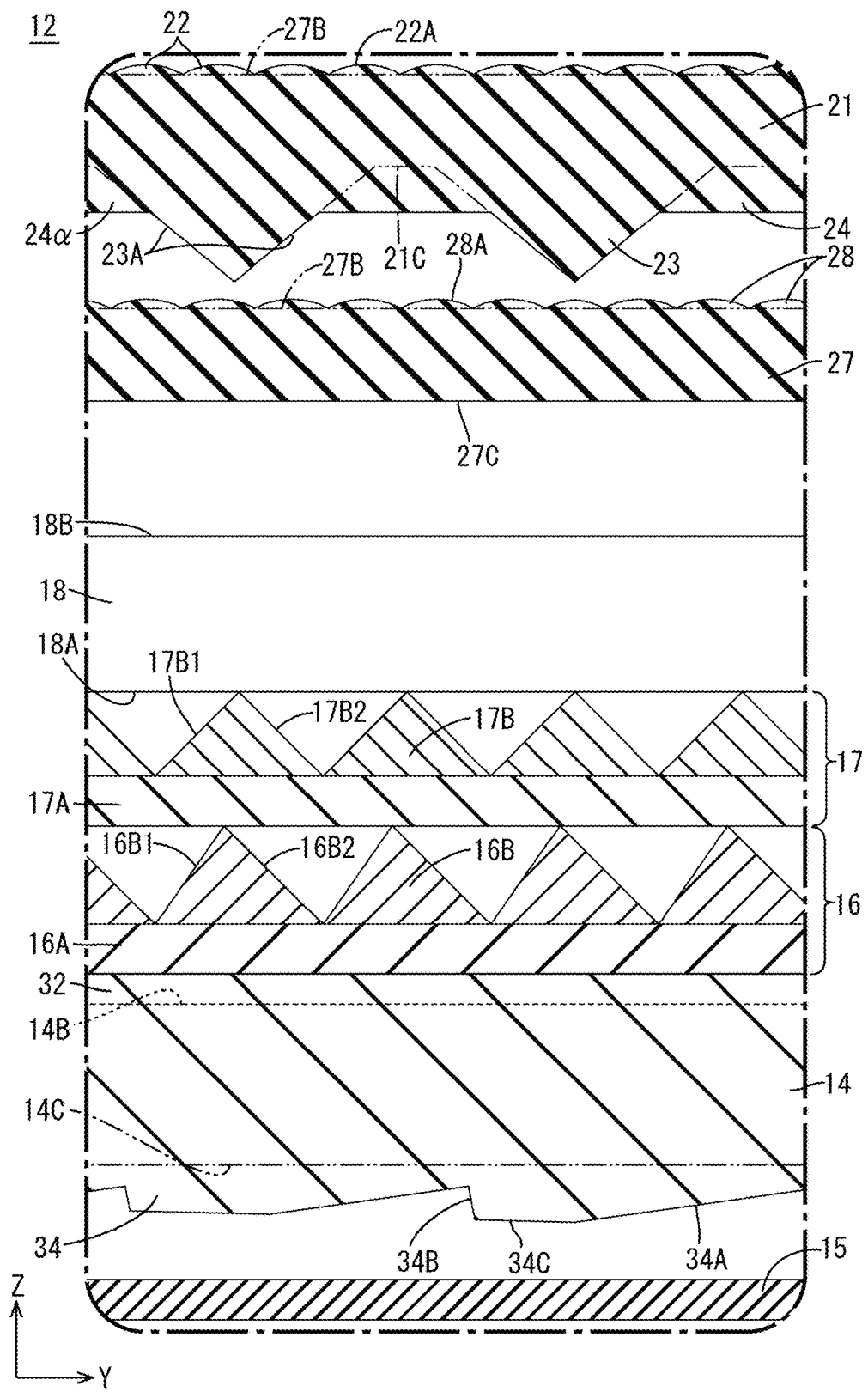
FIG. 11 is a cross-sectional view, taken at the same cutting position as that in FIG. 10, in the backlight device according to the first embodiment.

In this way, since the first light reflection portion 35 is selectively provided in the first region A1 of the first opposite main surface 27C, when the first LED 26 is turned on, as illustrated in FIGS. 5 and 11, light is emitted from a portion of the first light guide plate-light emission main surface 27B overlapping the first region A1, but light is not emitted from a portion of the first light guide plate-light emission main surface 27B overlapping the second region A2. On the other hand, since the second light reflection portion 36 is provided over the third region A3 and the fourth region A4 in the second opposite main surface 21C, when the second LED 20 is turned on, as illustrated in FIGS. 4 and 5, light is emitted from portions of the second light guide plate-light emission main surface 21B overlapping the third region A3 and the fourth region A4, that is, light is emitted from substantially the entire region. Further, with respect to the third backlight unit 12U3, when the third LED 13 is turned on, as illustrated in FIG. 5, the angle range of the light emitted from the third light guide plate 14 is restricted in the X-axis direction by the first light blocking portions 18C of the first louver 18 when the light is emitted from the first louver light emission main surface 18B.

Thus, for example, when the first LED 26 and the third LED 13 are turned on and the second LED 20 is turned off, the emission light of the backlight device 12 includes light emitted over a restricted angle range from the first louver light emission main surface 18B of the first louver 18, and light selectively emitted from the portion, in the first light guide plate-light emission main surface 27B of the first light guide plate 27, overlapping the first region A1. As a result, in this case, of the backlight device 12, the emission angle range of the light emitted from the portions overlapping the first region A1 and the third region A3 is not restricted in the X-axis direction, while, of the backlight device 12, the emission angle range of the light emitted from the portions overlapping the second region A2 and the fourth region A4 is restricted in the X-axis direction. Here, in the present embodiment, the first region A1 and the third region A3 overlap the first display portion AA1 of the display region AA, and the second region A2 and the fourth region A4 overlap the second display portion AA2 of the display region AA. Thus, for example, during a period in which the passenger vehicle is traveling, the first LEDs 26 and the third LEDs 13 are turned on, while the second LEDs 20 are not turned on. In this way, since the emission angle range of the light emitted from the portions, of the backlight device 12, overlapping the second region A2 and the fourth region A4 is limited in the X-axis direction, the image displayed on the second display portion AA2 in front of the front passenger seat can be viewed from the front passenger seat but cannot be viewed from the driver's seat. On the other hand, since the emission angle range of the light emitted from the portions, of the backlight device 12, overlapping the first region A1 and the third region A3 is not limited in the X-axis direction, the image displayed on the first display portion AA1 in front of the driver's seat can be viewed from both the driver's seat and the front passenger seat.

On the other hand, for example, when the second LEDs 20 and the third LEDs 13 are turned on and the first LEDs 26 are turned off, the emission light of the backlight device 12 includes the light emitted over the restricted angle range from the first louver light emission main surface 18B of the first louver 18, and the light emitted from the second light guide plate-light emission main surface 21B of the second light guide plate 21 over the portions overlapping the third region A3 and the fourth region A4. As a result, in this case, the emission angle range of the light emitted from the backlight device 12 is not limited in the X-axis direction. Here, if, for example, the second light reflection portion 36 is selectively provided in the fourth region A4 in the second opposite main surface 21C, in order to obtain light whose emission angle range is not limited in the X-axis direction, it is necessary to turn on both the first LEDs 26 and the second LEDs 20. However, in this case, there is a possibility that a dark portion may be seen between the light emitted from the portion of the first light guide plate-light emission main surface 27B overlapping the first region A1 and the light emitted from the portion of the second light guide plate-light emission main surface 21B overlapping the fourth region A4. In this regard, since it is sufficient to turn on the second LED 20 while turning off the first LED 26 in order to obtain the light whose emission angle range is not limited in the X-axis direction, the dark portion described above is less likely to be seen. Further, in the present embodiment, the first region A1 and the third region A3 overlap the first display portion AA1 of the display region AA, and the second region A2 and the fourth region A4 overlap the second display portion AA2 of the display region AA. Thus, during a period in which the passenger vehicle is stopped, the second LEDs 20 and the third LEDs 13 are turned on and the first LEDs 26 are turned off. In this way, since the emission angle range of the emission light of the backlight device 12 is not restricted in the X-axis direction over substantially the entire region, both the image displayed on the first display portion AA1 in front of the driver's seat and the image displayed on the second display portion AA2 in front of the front passenger seat can be visually recognized from both the driver's seat and the front passenger seat.

Further, in the present embodiment, as illustrated in FIG. 1, the second light guide plate 27 is disposed such that the first light guide plate 21 is interposed between the second light guide plate 27 and the first louver 18. Here, for example, if the second region A2 of the first opposite main surface 27C of the first light guide plate 27 is scratched or the like, there is a concern that the light propagating in the first light guide plate 27 may be emitted from a portion of the first light guide plate-light emission main surface 27B overlapping the second region A2, due to the scratch or the like. Even in this case, since the second opposite main surface 21C of the second light guide plate 21 is disposed facing the first light guide plate-light emission main surface 27B of the first light guide plate 27, the light emitted from the portion of the first light guide plate-light emission main surface 27B overlapping the second region A2 can be caused to be less likely to be emitted from the second opposite main surface 21C, as a result of being reflected or the like by the second light guide plate 21. In particular, in the present embodiment, since the fourth light guide plate lens 22, which is the lenticular lens, is provided on the second light guide plate-light emission main surface 21B of the second light guide plate 21, the light emitted from the portion of the first light guide plate-light emission main surface 27B overlapping the second region A2 can be favorably reflected toward the back side by the fourth light guide plate lens 22. Accordingly, when the first LEDs 26 and the third LEDs 13 are turned on and the second LEDs 20 are turned off, it is possible to prevent the light emitted from the first LEDs 26 from being unintentionally supplied to the second display portion AA2 of the display region AA.

As illustrated in FIG. 5, the plurality of sixth light guide plate lenses 24 constituting the second light reflection portion 36 are provided in a plurality thereof in both the third region A3 and the fourth region A4 in the second opposite main surface 21C. In the following description, when a distinction is made with respect to the sixth light guide plate lenses 24 and the sixth light guide plate inclined surfaces 24A, a suffix "α" is appended to the reference sign of those disposed in the fourth region A4, and a suffix "β" is appended to the reference sign of those disposed in the third region A3. When the sixth light guide plate lenses 24 and the sixth light guide plate inclined surfaces 24A are collectively referred to without distinction, a suffix is not appended to the reference sign. Among the plurality of sixth light guide plate lenses 24 constituting the second light reflection portion 36, the sixth light guide plate lens 24α disposed in the fourth region A4 includes the sixth light guide plate inclined surface (first inclined surface) 24Aα with an inclination gradually upward from the side opposite to the second LED 20 side toward the second LED 20 in the X-axis direction. On the other hand, among the plurality of sixth light guide plate lenses 24, the sixth light guide plate lens 24β disposed in the third region A3 includes the sixth light guide plate inclined surface (second inclined surface) 24Aβ with an inclination gradually upward from the side opposite to the second LED 20 toward the second LED 20 side in the X-axis direction. Since the sixth light guide plate lenses 24α and 24β have the same structure, the inclination angles θ8 formed by the sixth light guide plate inclined surfaces 24Aα and 24Aβ with respect to the X-axis direction are equal to each other.

According to such a configuration, when the second LED 20 is turned on, light that has entered into the second light guide plate 21 is incident on the sixth light guide plate inclined surface 24Aα of the sixth light guide plate lens 24a in the fourth region A4 of the second opposite main surface 21C, and is incident on the sixth light guide plate inclined surface 24Aβ of the sixth light guide plate lens 24β in the third region A3. The light incident on the sixth light guide plate inclined surface 24Aα is reflected, and is emitted from the portion of the second light guide plate-light emission main surface 21B overlapping the fourth region A4. This emission light includes a greater amount of light traveling toward the opposite side to the second LED 20 side in the X-axis direction with respect to the front direction than light traveling toward the second LED 20 side in the X-axis direction. The light incident on the sixth light guide plate inclined surface 24Aβ is reflected, and is emitted from the portion of the second light guide plate-light emission main surface 21B overlapping the third region A3. This emission light includes a greater amount of light traveling toward the opposite side to the second LED 20 side in the X-axis direction with respect to the front direction than light traveling toward the second LED 20 side in the X-axis direction. Thus, it is possible to supply the emission light of a brightness angle distribution in which the peak brightness of the emission light from the portion of the second light guide plate-light emission main surface 21B overlapping the fourth region A4 and the peak brightness of the emission light from the portion overlapping the third region A3 are both biased toward the side opposite to the second LED 20 side in the X-axis direction. In this way, it is possible to sufficiently secure the brightness of the emission light that is inclined, with respect to the front direction, to the side opposite to the second LED 20 side in the X-axis direction.

Moreover, as illustrated in FIG. 5, the sixth light guide plate inclined surface 24Aβ has the same inclination as the sixth light guide plate inclined surface 24Aα. Thus, when the second LED 20 is turned on, the brightness angle distribution of the light emitted from the second light guide plate-light emission main surface 21B has the same inclination. Accordingly, a local dark portion is less likely to occur in the vicinity of the boundary between the portion of the second light guide plate-light emission main surface 21B overlapping the third region A3 and the portion overlapping the fourth region A4. Further, since the inclination angles θ8 of the sixth light guide plate inclined surface 24Aα and the sixth light guide plate inclined surface 24Aβ with respect to the X-axis direction are equal to each other, the evenness of the brightness angle distribution relating to the light emitted from the second light guide plate-light emission main surface 21B when the second LED 20 is turned on is improved. Accordingly, a local dark portion is less likely to occur in the vicinity of the boundary between the portion of the second light guide plate-light emission main surface 21B overlapping the third region A3 and the portion of the second light guide plate-light emission main surface 21B overlapping the fourth region A4.

Further, as illustrated in FIG. 5, each of the plurality of ninth light guide plate lenses 30 constituting the first light reflection portion 35 includes the ninth light guide plate inclined surface (third inclined surface) 30A with an inclination gradually upward from the opposite side to the first LED 26 toward the first LED 26 side in the X-axis direction. In this manner, the ninth light guide plate inclined surface 30A has the same inclination as that of the sixth light guide plate inclined surface 24Aα and the sixth light guide plate inclined surface 24Aβ. Thus, when the second LED 20 is turned off and the first LED 26 is turned on, the brightness angle distribution relating to the light emitted from the first light guide plate-light emission main surface 27B has the same inclination as the brightness angle distribution relating to the light emitted from the second light guide plate-light emission main surface 21B when the first LED 26 is turned off and the second LED 20 is turned on. As a result, a sense of incongruity is less likely to occur in the appearance of the light emitted from the backlight device 12 between the case in which the second LED 20 is turned off and the first LED 26 is turned on, and the case in which the first LED 26 is turned off and the second LED 20 is turned on.

Figure 12:
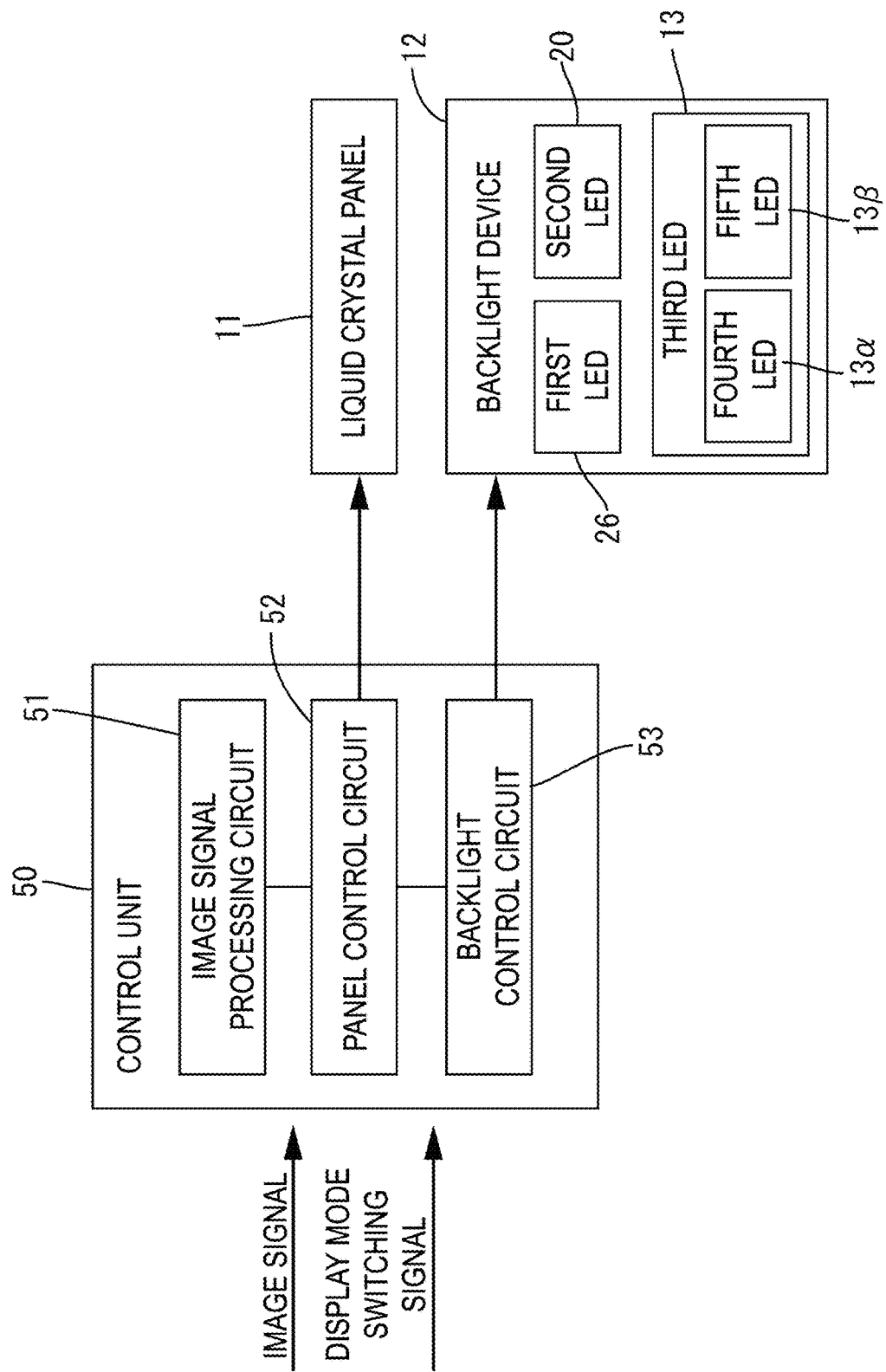
FIG. 12 is a block diagram illustrating an electrical configuration of the liquid crystal display device according to the first embodiment.

Next, a circuit configuration for controlling the driving of the liquid crystal panel 11 and the backlight device 12 described above will be described with reference to a block diagram illustrated in FIG. 12. As illustrated in FIG. 12, the liquid crystal display device 10 includes a control unit 50 that controls the driving of the liquid crystal panel 11 and the backlight device 12. The control unit 50 includes an image signal processing circuit 51, a panel control circuit 52, and a backlight control circuit (light source control unit) 53. The image signal processing circuit 51 processes an image signal supplied from an external host system, and outputs a processed image signal. The panel control circuit 52 writes, to the liquid crystal panel 11, an image based on the processed image signal output from the image signal processing circuit 51. When the liquid crystal display device 10 includes a gate driver and a source driver for writing the image to the liquid crystal panel 11, the panel control circuit 52 controls the driving of the gate driver and the source driver. The backlight control circuit 53 controls the first LED 26, the second LED 20, and the third LED 13 to adjust the light emission amounts and the like of the first LED 26, the second LED 20, and the third LED 13. In order to control the first LED 26, the second LED 20, and the third LED 13, the backlight control circuit 53 can perform, for example, pulse width modulation (PWM) light adjustment and the like. When the liquid crystal display device 10 includes an LED driver that drives the first LED 26, the second LED 20, and the third LED 13, the backlight control circuit 53 controls the driving of the LED driver.

As illustrated in FIG. 12, based on a display mode switching signal supplied from the external host system, the control unit 50 according to the present embodiment can switch between display in a first display mode (first mode) and display in a second display mode (a second mode). In the first display mode, the display image of the first display portion AA1 in the display region AA is allowed to be viewed from both the driver's seat and the front passenger seat, while the display image of the second display portion AA2 in the display region AA is allowed to be viewed from the front passenger seat but is restricted from being viewed from the driver's seat. Thus, the first display mode can be referred to as a "partial privacy mode". In the second display mode, the display image of the first display portion AA1 and the display image of the second display portion AA2 in the display region AA are both allowed to be viewed from both the driver's seat and the front passenger seat. Thus, the second display mode can be referred to as a "full screen public mode." A traveling speed of the passenger vehicle in which the liquid crystal display device 10 is mounted can be used as a trigger for the input of the display mode switching signal. For example, the external host system can supply the display mode switching signal to the control unit 50 at each of a timing at which the traveling speed of the passenger vehicle exceeds a threshold value and a timing at which the traveling speed falls below the threshold value.

Specifically, at the timing at which the traveling speed of the passenger vehicle exceeds the threshold value, the control unit 50 performs display in the first display mode, based on the display mode switching signal supplied from the external host system. When performing the display in the first display mode, the backlight control circuit 53 included in the control unit 50 performs control to turn on the first LED 26 and the third LED 13 and turn off the second LED 20, as illustrated in FIGS. 1 and 5. With this configuration, of the backlight device 12, the emission angle range of the light emitted from the portions overlapping the first region A1 and the third region A3 is not restricted in the X-axis direction. Accordingly, the image displayed on the first display portion AA1 that is in front of the driver's seat and overlaps the first region A1 and the third region A3 can be visually recognized from both the driver's seat and the front passenger seat. Of the backlight device 12, the emission angle range of light emitted from the portions overlapping the second region A2 and the fourth region A4 is restricted in the X-axis direction. Thus, the image displayed on the second display portion AA2 that is in front of the front passenger seat and overlaps the second region A2 and the fourth region A4 can be viewed from the front passenger seat but cannot be viewed from the driver's seat.

On the other hand, at the timing at which the traveling speed of the passenger vehicle falls below the threshold value, the control unit 50 performs the display in the second display mode, based on the display mode switching signal supplied from the external host system. When performing display in the second display mode, the backlight control circuit 53 included in the control unit 50 performs control to turn on the second LED 20 and the third LED 13 and turn off the first LED 26. With this configuration, the emission angle range of the emission light of the backlight device 12 is not restricted over substantially the entire region in the X-axis direction. Accordingly, both the image displayed on the first display portion AA1 that is in front of the driver's seat and overlaps the first region A1 and the third region A3 and the image displayed on the second display portion AA2 that is in front of the front passenger seat and overlaps the second region A2 and the fourth region A4 can be viewed from both the driver's seat and the front passenger seat.

In both the first display mode and the second display mode, the backlight control circuit 53 included in the control unit 50 divides the plurality of third LEDs 13 into the following two groups and drives the third LEDs 13. Specifically, as illustrated in FIGS. 1 and 3, the plurality of third LEDs 13 arranged in the X-axis direction (first direction) are grouped into a plurality of fourth LEDs (fourth light sources) 13α arranged facing portions of the third light guide plate 14 overlapping the first region A1 and the third region A3, and a plurality of fifth LEDs (fifth light sources) 13β arranged facing portions of the third light guide plate 14 overlapping the second region A2 and the fourth region A4. In the following description, when a distinction is made with respect to the third LEDs 13, the suffix "α" is appended to the reference sign of the "fourth LEDs", and the suffix "β" is appended to the reference sign of the "fifth LEDs". When the third LEDs 13 are collectively referred to without distinction, the suffix is not appended to the reference sign.

As illustrated in FIGS. 1, 3, and 12, even when the display gray scale in the first display portion AA1 and the display gray scale in the second display portion AA2 are the same, the backlight control circuit 53 performs control such that a light emission amount per unit time of the fourth LED 13α is larger than the light emission amount per unit time of the fifth LED 13β. Here, the "display gray scale in the first display portion AA1" has the same meaning as the light emission amount from the portions of the backlight device 12 overlapping the first region A1 and the third region A3. Similarly, here, the "display gray scale in the second display portion AA2" has the same meaning as the light emission amount from the portions of the backlight device 12 overlapping the second region A2 and the fourth region A4. Note that, when the display gray scale in the second display portion AA2 is lower than the display gray scale in the first display portion AA1, the backlight control circuit 53 may perform control such that the light emission amount per unit time of the fourth LED 13α and the light emission amount per unit time of the fifth LED 13β are equal to each other.

As illustrated in FIGS. 1 and 3, when the light emitted from the plurality of third LEDs 13 is emitted from the third light guide plate-light emission main surface 14B of the third light guide plate 14, the light is transmitted through the first light guide plate 27 and the second light guide plate 21 and is emitted to the outside. Here, there is a possibility that the light emitted from the portions of the third light guide plate-light emission main surface 14B overlapping the second region A2 and the fourth region A4 may be refracted by the second light reflection portion 36 when the light is incident on the fourth region A4 of the second opposite main surface 21C of the second light guide plate 21. Here, when the emission light described above is incident on the second region A2 of the first opposite main surface 27C of the first light guide plate 27, the light is hardly refracted because the first light reflection portion 35 is not formed in the second region A2 and the second region A2 is substantially flat. On the other hand, there is a possibility that the light emitted from the portions of the third light guide plate-light emission main surface 14B overlapping the first region A1 and the third region A3 may be refracted by the first light reflection portion 35 when the light is incident on the second region A2 of the first opposite main surface 27C of the first light guide plate 27, and may be refracted by the second light reflection portion 36 when the light is incident on the fourth region A4 of the second opposite main surface 21C of the second light guide plate 21. Thus, the light emitted from the portions of the third light guide plate-light emission main surface 14B overlapping the first region A1 and the third region A3 tends to be diffused more easily than the light emitted from the portions overlapping the second region A2 and the fourth region A4, and, of the backlight device 12, the amount of emission light from the portions overlapping the first region A1 and the third region A3 tends to be smaller than the amount of emission light from the portions overlapping the second region A2 and the fourth region A4. In this regard, even when the display gray scale of the first display portion AA1 and the gray scale of the second display portion AA2 are the same, the backlight control circuit 53 causes the light emission amount per unit time of the fourth LED 13α that supplies the light to the portions of the third light guide plate-light emission main surface 14B overlapping the first region A1 and the third region A3 to be the same as the light emission amount per unit time of the fifth LED 13β that supplies the light to the portions of the third light guide plate-light emission main surface 14B overlapping the second region A2 and the fourth region A4. In this way, of the backlight device 12, a difference is less likely to occur between the amount of emission light from the portions overlapping the first region A1 and the third region A3 and the amount of emission light from the portions overlapping the second region A2 and the fourth region A4.

Subsequently, in the liquid crystal display device 10 having the above-described configuration, in order to obtain knowledge about how the light distribution of the backlight device 12 changes between the display performed in the first display mode and the display performed in the second display mode, a Demonstration Experiment 1 was performed. In Demonstration Experiment 1, using the liquid crystal display device 10 described before this paragraph, the brightness of the light emitted from the backlight device 12 was measured in each of a case in which the backlight control circuit 53 turned on the first LED 26 and the third LED 13 and turned off the second LED 20 to perform display in the first display mode, and a case in which the backlight control circuit 53 turned on the second LED 20 and the third LED 13 and turned off the first LED 26 to perform display in the second display mode. A graph of the light distribution (brightness angle distribution) in the X-axis direction was created. The measurement of the brightness was performed on each of the portions of the backlight device 12 overlapping the first region A1 and the third region A3 and the portions of the backlight device 12 overlapping the second region A2 and the fourth region A4.

Figure 13:
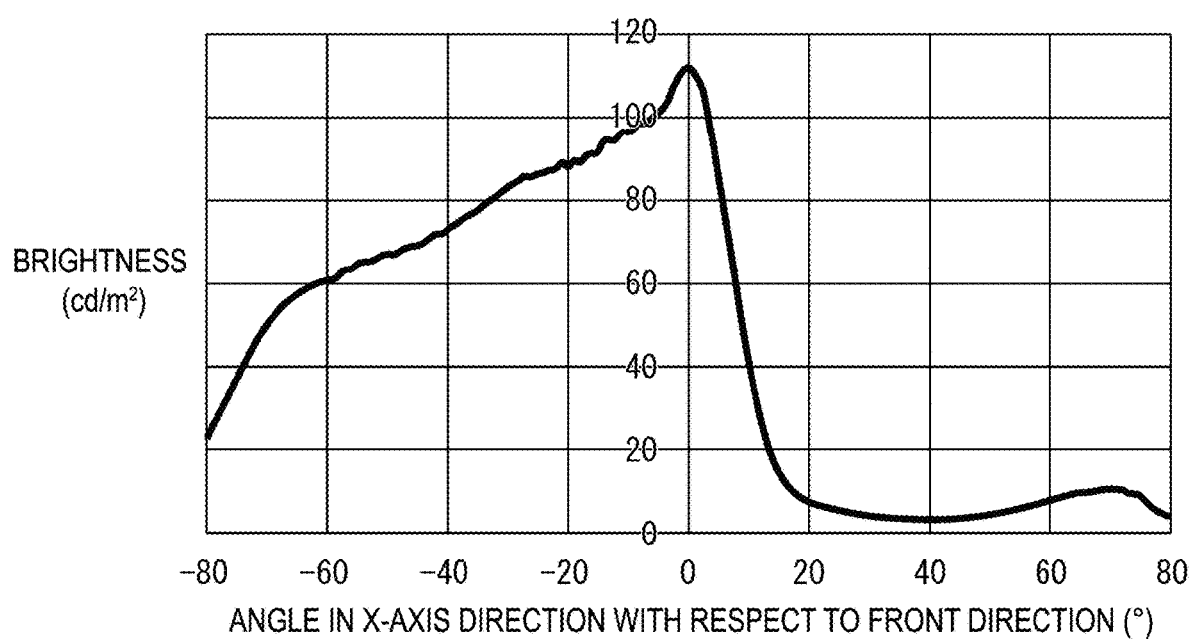
FIG. 13 is a graph showing experiment results of a Demonstration Experiment 1 according to the first embodiment, showing light distribution in a second display mode, and light distribution of emission light from a portion, of the backlight device, overlapping a first region and a third region in a first display mode.
Figure 14:
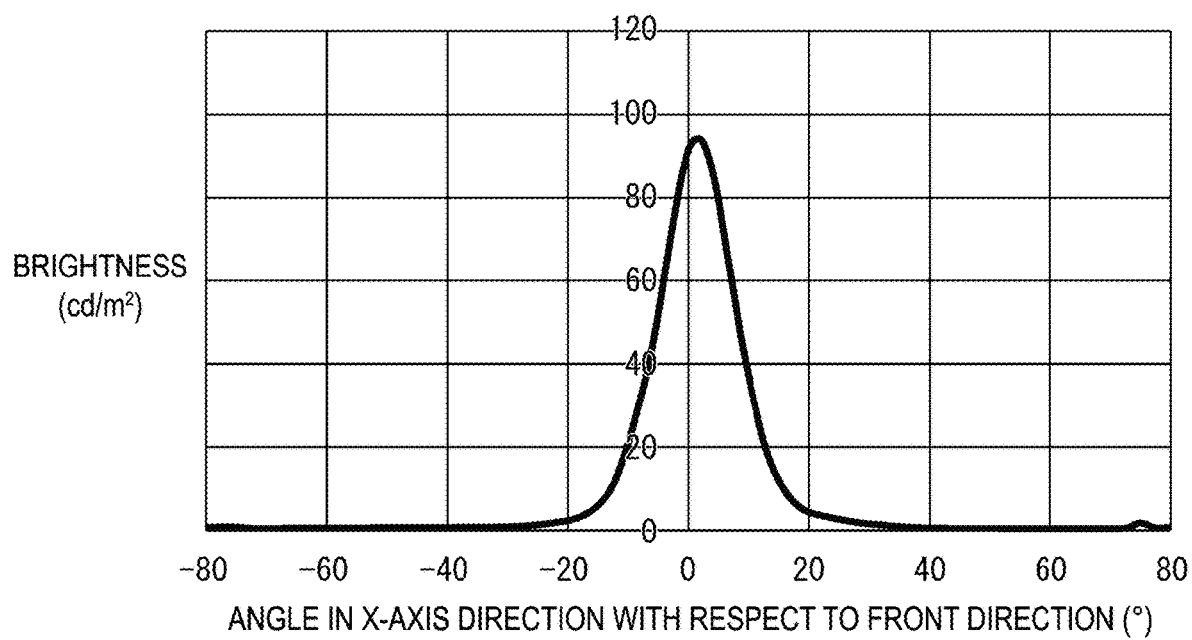
FIG. 14 is a graph showing experiment results of Demonstration Experiment 1 according to the first embodiment, showing a light distribution of emission light from a portion, of the backlight device, overlapping a second region and a fourth region in the first display mode.

Experiment results relating to the light distribution in Demonstration Experiment 1 are as illustrated in FIGS. 13 and 14. In graphs relating to the light distribution illustrated in FIGS. 13 and 14, the horizontal axis is an angle (in units of "°") in the X-axis direction with respect to the front direction (Z-axis direction), and the vertical axis is brightness (in units of "cd/m$^2$"). Of positive and negative symbols assigned to the angles of the horizontal axis in FIGS. 13 and 14, "− (negative)" refers to the left side in the X-axis direction with respect to 0° (the front direction) that is a reference when the backlight device 12 is viewed from the front, and "+(positive)" refers to the right side in the X-axis direction with respect to 0° (the front direction) that is the reference when the backlight device 12 is viewed from the front. FIG. 13 shows the light distribution when the first LED 26 and the third LED 13 are turned on and the second LED 20 is turned off (the second display mode). Further, FIG. 13 also shows the light distribution of the emission light from the portions of the backlight device 12 overlapping the first region A1 and the third region A3 when the second LED 20 and the third LED 13 are turned on and the first LED 26 is turned off (the first display mode). FIG. 14 shows the light distribution of the emission light from the portions of the backlight device 12 overlapping the second region A2 and the fourth region A4 when the second LED 20 and the third LED 13 are turned on and the first LED 26 is turned off (the first display mode).

The experiment results of Demonstration Experiment 1 will be described. In FIG. 13, the peak brightness is approximately 0°, and it can be said that the light distribution of the emission light is asymmetric in the left-right direction with a greater amount of the emission light being biased to the "−" side. Specifically, the light distribution of the emission light in FIG. 13 is biased toward the left side in the X-axis direction, that is, toward the side opposite to the second LED 20 side, and the emission angle range is approximately −80° to +20°. In FIG. 14, the peak brightness is approximately 0°, and it can be said that the light distribution is substantially symmetrical in the left-right direction. Specifically, the light distribution shown in FIG. 14 has an emission angle range of approximately ±10°. It can be said that these results reflect the fact that the emission angle range of the light emitted from the third light guide plate 14 as a result of turning on the third LED 13 is restricted to approximately ±10° by the first louver 18. In FIG. 14, the emission angle range is extremely narrowly restricted, compared with FIG. 13. In FIG. 13, the emission angle range is relatively wide compared with FIG. 14, and it can be said that the emission angle range is not so restricted.

Figure 15:
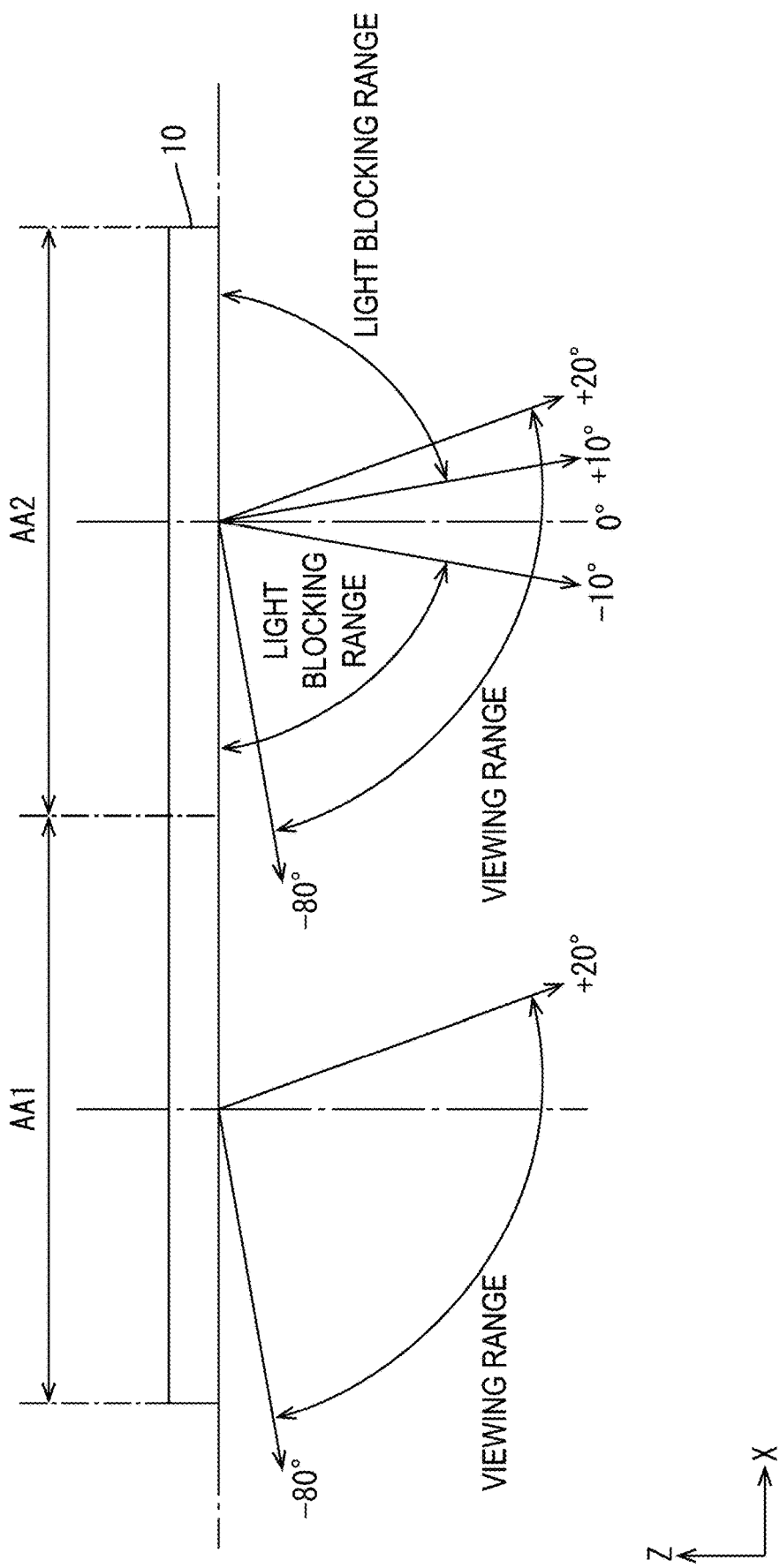
FIG. 15 is a diagram illustrating light blocking ranges and viewing ranges of a first display portion and a second display portion in the liquid crystal display device installed in a passenger vehicle according to the first embodiment.

Viewing angle characteristics in the first display portion AA1 and the second display portion AA2 of the display region AA of the liquid crystal display device 10 will be described with reference to FIG. 15. FIG. 15 illustrates viewing ranges and light blocking ranges based on the light emission angle range in each of the first display portion AA1 and the second display portion AA2. In the first display portion AA1, the viewing range is approximately −80° to +20° in both the first display mode and the second display mode, which matches the light distribution shown in FIG. 13. In the second display portion AA2, the viewing range is approximately −80° to +20° in the second display mode, which matches the light distribution shown in FIG. 13, and is approximately −10° to +10° in the first display mode, which matches the light distribution shown in FIG. 14. Thus, when the display is performed in the second display mode in the liquid crystal display device 10, the image displayed on the first display portion AA1 and the image displayed on the second display portion AA2 can both be viewed from both the driver's seat and the front passenger seat. On the other hand, when the display is performed in the liquid crystal display device 10 in the first display mode, the image displayed on the first display portion AA1 and the image displayed on the second display portion AA2 can be viewed from the front passenger seat, while the image displayed on the first display portion AA1 can be viewed from the driver seat, but the image displayed on the second display portion AA2 is barely visible.

Subsequently, in the liquid crystal display device 10 having the above-described configuration, in order to obtain knowledge relating to how the brightness distribution of the backlight device 12 changes between the display performed in the first display mode and the display performed in the second display mode, a Demonstration Experiment 2 was performed. In Demonstration Experiment 2, using the liquid crystal display device 10 described in the paragraphs preceding Demonstration Experiment 1, the brightness of the light emitted from the backlight device 12 was measured in each of a case in which the backlight control circuit 53 turned on the first LED 26 and the third LED 13 and turned off the second LED 20 to perform the display in the first display mode, and a case in which the backlight control circuit 53 turned on the second LED 20 and the third LED 13 and turned off the first LED 26 to perform the display in the second display mode. Specifically, the brightness measurement was performed at each of predetermined distances from a left end position in the X-axis direction of the backlight device 12 to a right end position thereof via a central position, and, at each of the positions, the brightness of the light emitted from the backlight device 12 at the angle of 0° (the front direction) and the brightness of the light emitted from the backlight device 12 at an angle of −45° (a diagonally left side in the X-axis direction) were measured. Based on the measurement results, a graph was created showing, using shading, the respective brightness distributions in the X-axis direction of the brightness distribution of the light emitted from the backlight device 12 at the angle of 0° and the brightness of the light emitted from the backlight device 12 at the angle of −45°, thus creating a graph showing the brightness distribution in the X-axis direction.

Experiment results of Demonstration Experiment 2 are as illustrated in FIGS. 16 to 23. FIGS. 16, 18, 20, and 22 illustrate diagrams relating to the brightness distribution. In FIGS. 16, 18, 20, and 22, the level of the brightness is represented by shading, and a legend is illustrated relating to the shading of the brightness (the higher up in the legend, the higher the brightness, and the lower down in the legend, the lower the brightness). FIGS. 17, 19, 21, and 23 show graphs relating to the brightness distribution. In FIGS. 17, 19, 21, and 23, the horizontal axis is a position in the X-axis direction (in units of "mm"), and the vertical axis is the brightness (in units of "cd/m$^2$"). The "position in the X-axis direction" on the horizontal axis in FIGS. 17, 19, 21, and 23 uses the central position in the X-axis direction in the backlight device 12 as a reference position (0 mm). Of the positive and negative symbols assigned to the "position in the X-axis direction" of the horizontal axis in FIGS. 17, 19, 21, and 23, "− (negative)" refers to the left side in the X-axis direction with respect to the above-described reference position, that is, the first display portion AA1, and "+(positive)" refers to the right side in the X-axis direction with respect to the above-described reference position, that is, the second display portion AA2. In the horizontal axes of FIGS. 17, 19, 21, and 23, the position of "−150 mm" coincides with the left end position in the X-axis direction, and the position of "+150 mm" coincides with the right end position in the X-axis direction.

Figure 16:
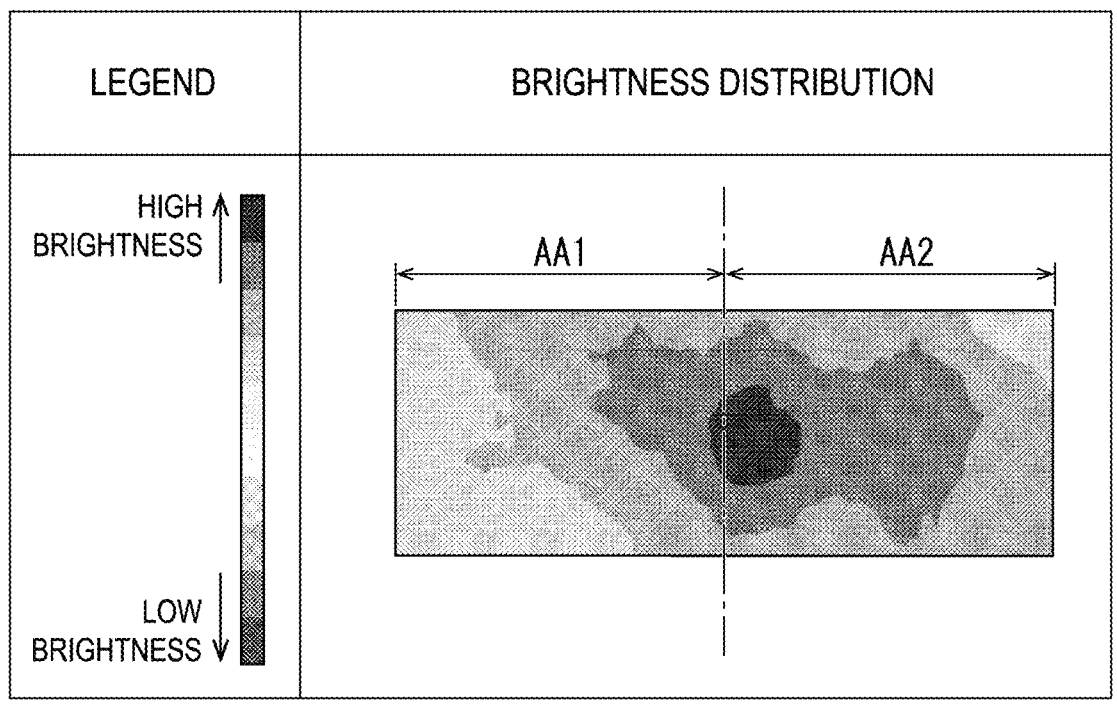
FIG. 16 is a diagram relating to brightness distribution, which is an experiment result, in Demonstration Experiment 2 according to the first embodiment, when the brightness of light emitted at an angle of 0° from the backlight device in the second display mode is measured.
Figure 17:
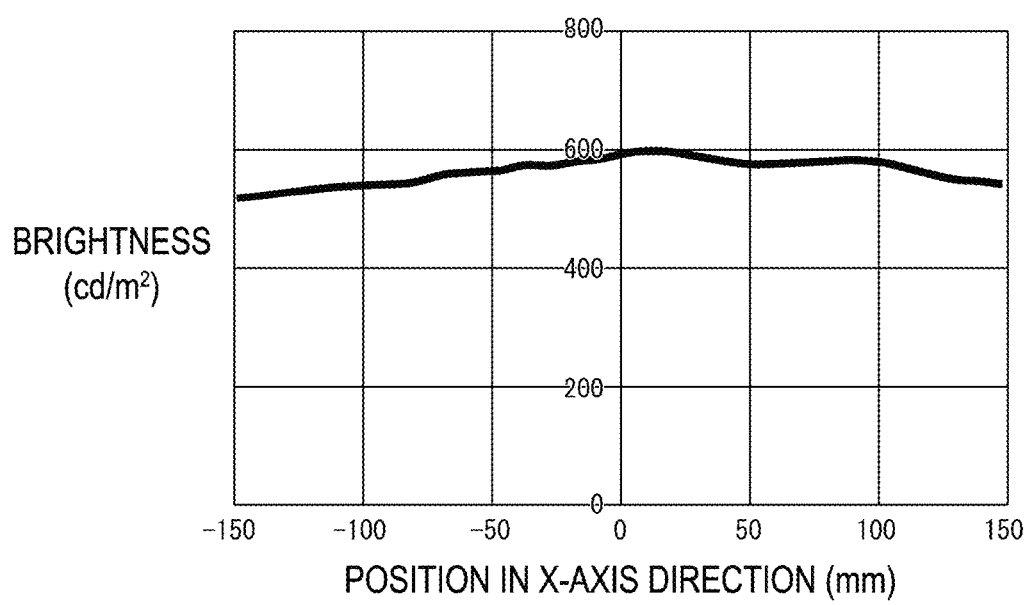
FIG. 17 is a graph relating to the brightness distribution which is the experiment result, in Demonstration Experiment 2 according to the first embodiment, when the brightness of the light emitted from the backlight device at the angle of 0° in the second display mode is measured.
Figure 18:
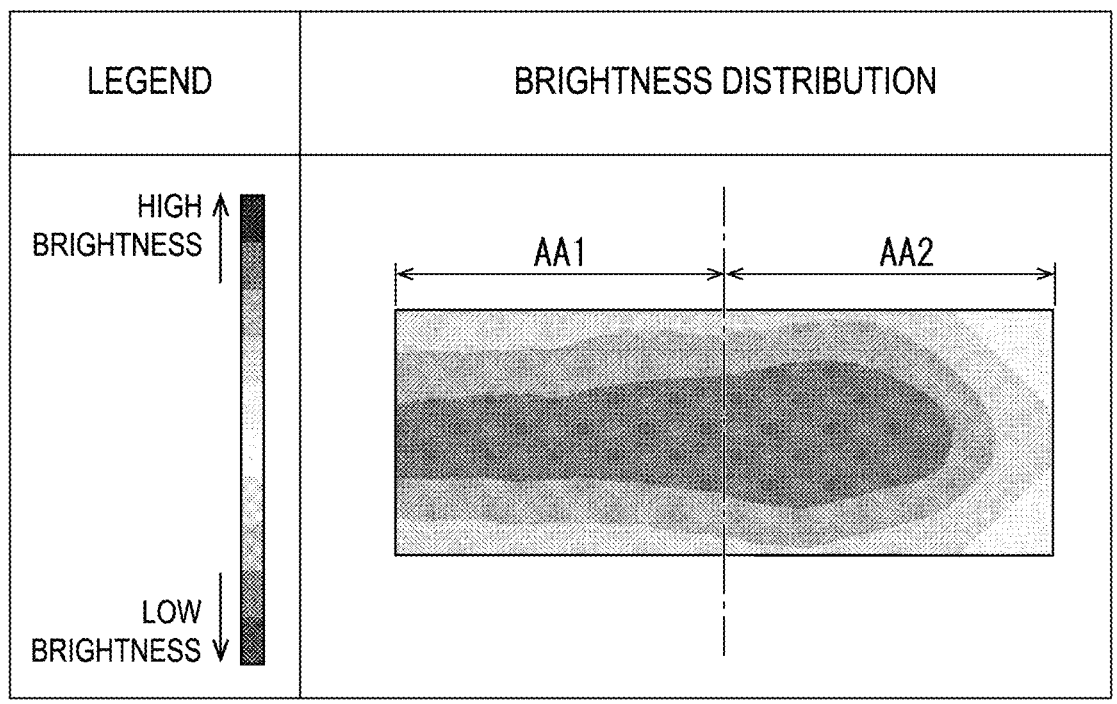
FIG. 18 is a diagram relating to brightness distribution, which is an experiment result, in Demonstration Experiment 2 according to the first embodiment, when the brightness of light emitted at an angle of −45° from the backlight device in the second display mode is measured.
Figure 19:
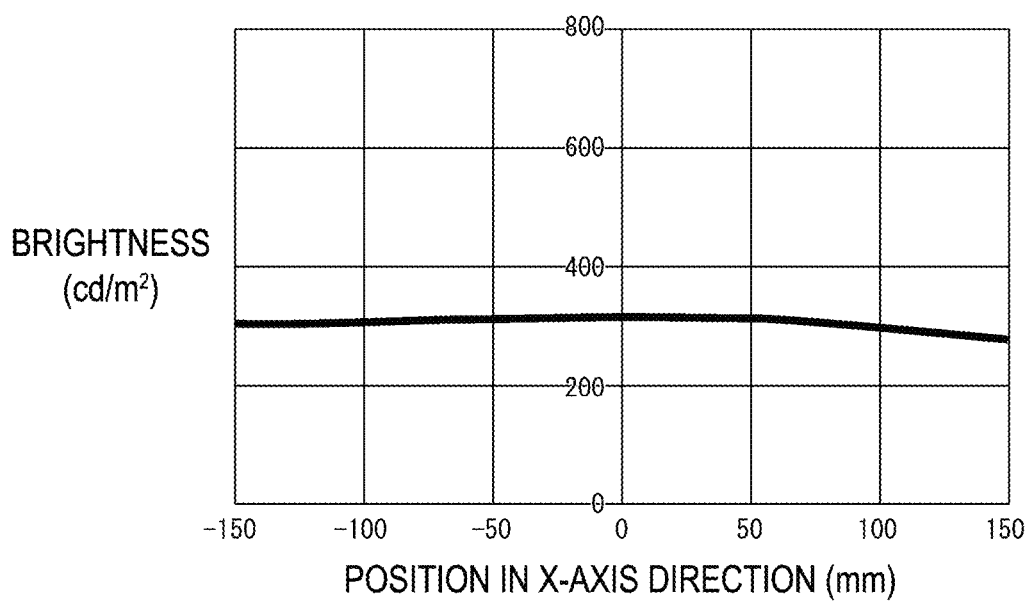
FIG. 19 is a graph relating to the brightness distribution which is the experiment result, in Demonstration Experiment 2 according to the first embodiment, when the brightness of the light emitted from the backlight device at the angle of −45° in the second display mode is measured.
Figure 20:
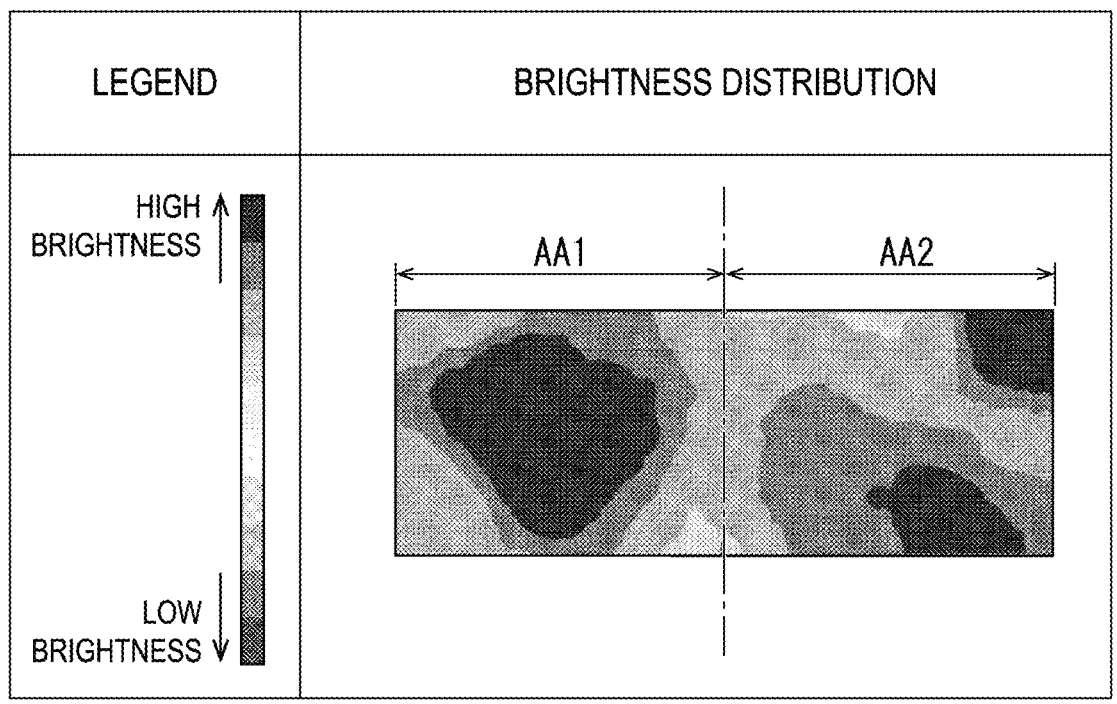
FIG. 20 is a diagram relating to brightness distribution, which is an experiment result, in a Demonstration Experiment 2 according to the first embodiment, when the brightness of light emitted at an angle of 0° from the backlight device in the first display mode is measured.
Figure 21:
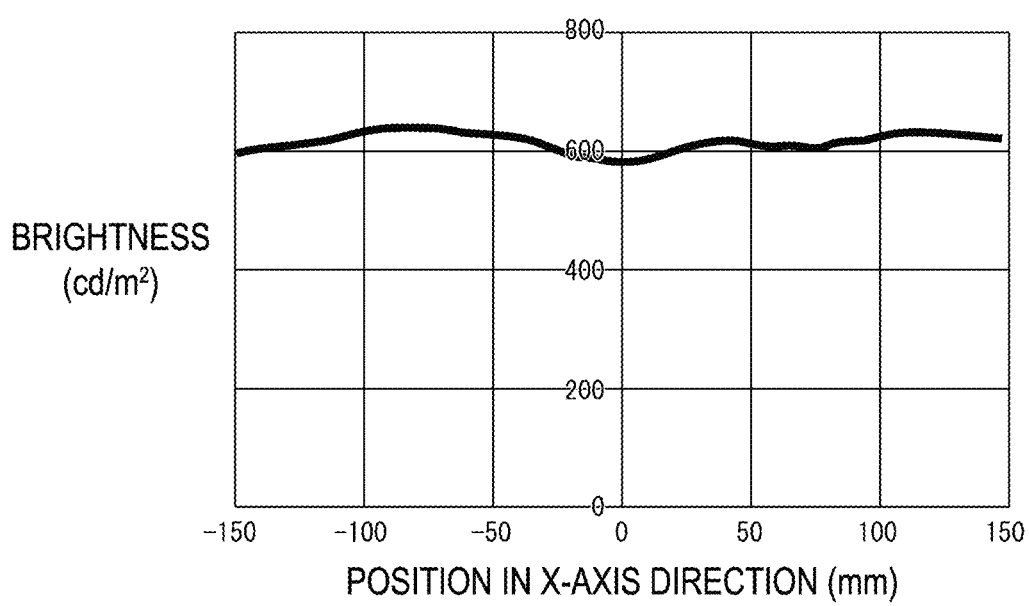
FIG. 21 is a graph relating to the brightness distribution which is the experiment result, in Demonstration Experiment 2 according to the first embodiment, when the brightness of the light emitted from the backlight device at the angle of 0° in the first display mode is measured.
Figure 22:
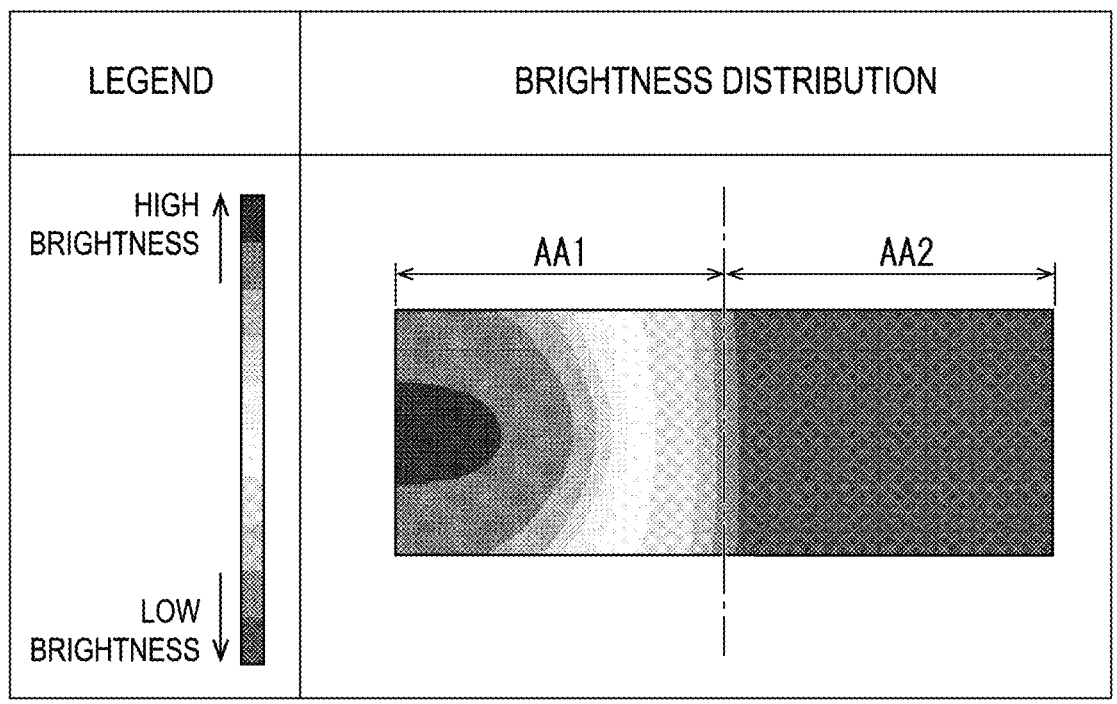
FIG. 22 is a diagram relating to brightness distribution, which is an experiment result, in Demonstration Experiment 2 according to the first embodiment, when the brightness of light emitted at an angle of −45° from the backlight device in the first display mode is measured.
Figure 23:
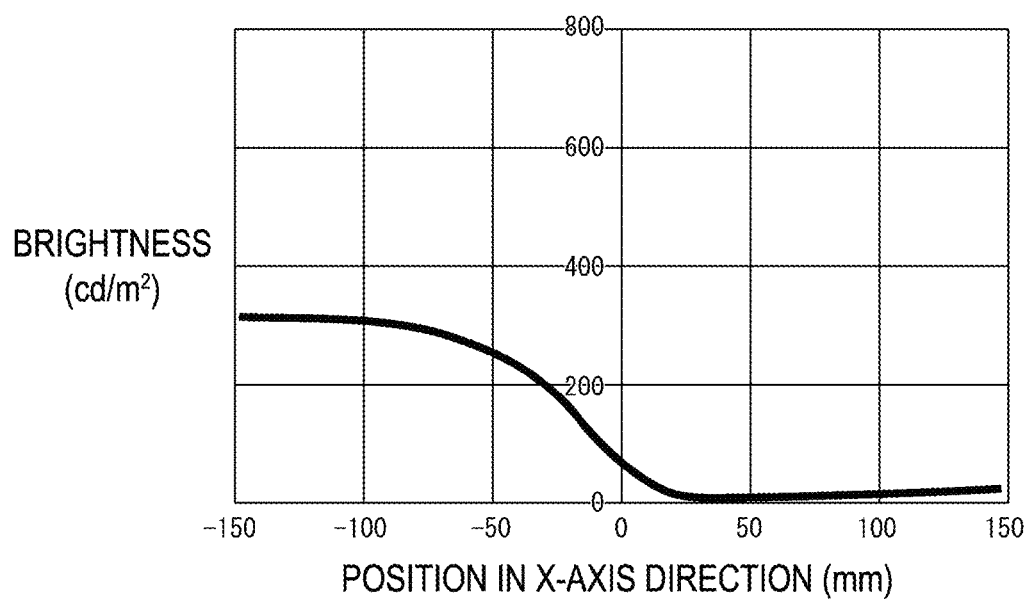
FIG. 23 is a graph relating to the brightness distribution which is the experiment result, in Demonstration Experiment 2 according to the first embodiment, when the brightness of the light emitted from the backlight device at the angle of −45° in the first display mode is measured.

FIGS. 16 to 19 illustrate the experiment results when the second LED 20 and the third LED 13 are turned on and the first LED 26 is turned off (the second display mode). Of these, FIGS. 16 and 17 illustrate the experiment results when the brightness of the light emitted from the backlight device 12 at the angle of 0° is measured, and FIGS. 18 and 19 illustrate the experiment results when the brightness of the light emitted from the backlight device 12 at the angle of −45° is measured. FIGS. 20 to 23 illustrate the experiment results when the first LED 26 and the third LED 13 are turned on and the second LED 20 is turned off (the first display mode). FIGS. 20 and 21 illustrate the experiment results when the brightness of the light emitted from the backlight device 12 at the angle of 0° is measured, and FIGS. 22 and 23 illustrate the experiment results when the brightness of the light emitted from the backlight device 12 at the angle of −45° is measured.

The experimental result of Demonstration Experiment 2 will be described. According to FIGS. 16 to 19, when the display is performed in the second display mode, there is a substantially high evenness of brightness between both the brightness distribution of the light emitted from the backlight device 12 at the angle of 0° and the brightness distribution of the light emitted from the backlight device 12 at the angle of −45°. Thus, when the display is performed in the second display mode, it can be said that both the image displayed on the first display portion AA1 and the image displayed on the second display portion AA2 can be viewed from the driver's seat with a sufficiently high brightness, and the image displayed on the second display portion AA2 can be viewed from the front passenger seat with a sufficiently high brightness.

According to FIGS. 20 and 21, it can be seen that the brightness distribution of the light emitted from the backlight device 12 at the angle of 0° when the display is performed in the first display mode has a high brightness uniformity that is approximately equal to that when the display is performed in the second display mode. On the other hand, according to FIGS. 22 and 23, it can be seen that the brightness distribution of the light emitted from the backlight device 12 at the angle of −45° is biased when the display is performed in the first display mode. Thus, when the display is performed in the first display mode, the image displayed on the first display portion AA1 can be viewed from the driver's seat with a sufficiently high brightness, and the image displayed on the second display portion AA2 can be viewed from the front passenger seat with a sufficiently high brightness, but the image displayed on the second display portion AA2 is barely visible from the driver's seat side.

As described above, the backlight device (illumination device) 12 according to the present embodiment is provided with the first LED (first light source) 26 and with the first light guide plate 27. At least part of the peripheral end surface of the first light guide plate 27 is the first light incident end surface (first end surface) 27A facing the first LED 26 and on which light is incident, one of the main surfaces of the first light guide plate 27 is the first light guide plate-light emission main surface (first main surface) 27B, and the other of the main surfaces is the first opposite main surface (second main surface) 27C. The backlight device 12 is provided with the second LED (second light source) 20 and with the second light guide plate 21. At least part of the peripheral end surface of the second light guide plate 21 is the second light incident end surface (second end surface) 21A facing the second LED 20 and on which light is incident, one of the main surfaces of the second light guide plate 21 is the second light guide plate-light emission main surface (third main surface) 21B, and the other of the main surfaces is the second opposite main surface (fourth main surface) 21C. The backlight device 12 is provided with the third LED (third light source) 13 and with the third light guide plate (optical member) 14 including the third light incident end surface (light incident surface) 14A facing the third LED 13 and on which light is incident, and the third light guide plate-light emission main surface (fifth main surface) 14B that emits the light. The backlight device 12 is provided with the first louver (first sheet) 18. One of the main surfaces of the first louver 18 is the first louver light emission main surface (sixth main surface) 18B, and the other of the main surfaces is the first louver light incident main surface (seventh main surface) 18A disposed facing the third light guide plate-light emission main surface 14B. The first light guide plate 27 and the second light guide plate 21 are overlaid such that the main surfaces thereof overlap each other, and are disposed on the opposite side from the side of the third light guide plate 14 with respect to the first louver 18. The first louver 18 at least includes two of the light blocking portions 18C and the light-transmitting portion 18D. The light blocking portions 18C block the light and are arranged with intervals therebetween in the first direction, which includes a direction from the first LED 26 toward the first light guide plate 27. The light-transmitting portion 18D is disposed between the two light blocking portions 18C and transmits the light. The first light reflection portion 35, which reflects the light and promotes the light emission from the first light guide plate-light emission main surface 27B, is provided on the first opposite main surface 27C. The second light reflection portion 36, which reflects the light and promotes the light emission from the second light guide plate-light emission main surface 21B, is provided on the second opposite main surface 21C. When the first opposite main surface 27C is divided into the first region A1, and the second region A2 disposed adjacent to the first region A1 in the first direction, the first light reflection portion 35 is selectively provided in the first region A1 in the first opposite main surface 27C. When the second opposite main surface 21C is divided into the third region A3 overlapping the first region A1, and the fourth region A4 overlapping the second region A2, the second light reflection portion 36 is provided in at least the fourth region A4 in the second opposite main surface 21C.

The light emitted from the first LED 26 and incident on the first light incident end surface 27A of the first light guide plate 27 propagates through the first light guide plate 27 and, as a result of being reflected by the first light reflection portion 35 provided on the first opposite main surface 27C, is emitted from the first light guide plate-light emission main surface 27B. Since the first light reflection portion 35 is selectively provided in the first region A1 in the first opposite main surface 27C, the light emitted from the first LED 26 is emitted from the portion of the first light guide plate-light emission main surface 27B overlapping the first region A1, but is not emitted from the portion overlapping the second region A2.

The light emitted from the second LED 20 and incident on the second light incident end surface 21A of the second light guide plate 21 propagates through the second light guide plate 21 and, as a result of being reflected by the second light reflection portion 36 provided on the second opposite main surface 21C, is emitted from the second light guide plate-light emission main surface 21B. Since the second light reflection portion 36 is provided in at least the fourth region A4 in the second opposite main surface 21C, the light emitted from the second LED 20 is at least emitted from the portion of the second light guide plate-light emission main surface 21B overlapping the fourth region A4.

When the light emitted from the third LED 13 is incident on the third light incident end surface 14A of the third light guide plate 14, the light is emitted from the third light guide plate-light emission main surface 14B, and is incident on the first louver light incident main surface 18A of the first louver 18. The light incident on the first louver light incident main surface 18A of the first louver 18 is transmitted through the first light-transmitting portion 18D disposed between the two first light blocking portions 18C, and is emitted from the first louver light emission main surface 18B. The emission angle of the emission light from the first louver light emission main surface 18B is restricted by the two first light blocking portions 18C. The light emitted from the first louver light emission main surface 18B is transmitted through the first light guide plate 27 and the second light guide plate 21 whose main surfaces overlap each other. Since the angle range of the light emitted from the first louver light emission main surface 18B is restricted by the first light blocking portion 18C of the first louver 18, the light is less likely to be emitted outside of the restricted angle range. In this way, when the third LED 13 is turned on, the light can be selectively emitted in the restricted angle range.

For example, when the first LED 26 and the third LED 13 are turned on and the second LED 20 is turned off, the light emitted from the backlight device 12 includes the light emitted from the first louver light emission main surface 18B of the first louver 18 in the restricted angle range and the light selectively emitted from the portion of the first light guide plate-light emission main surface 27B of the first light guide plate 27 overlapping the first region A1. As a result, in this case, although the emission angle range of the light emitted from the portions of the backlight device 12 overlapping the first region A1 and the third region A3 is not particularly restricted in the first direction, the emission angle range of the light emitted from the portion of the backlight device 12 overlapping the second region A2 and the fourth region A4 is restricted in the first direction.

Further, the second light reflection portion 36 is provided over the third region A3 and the fourth region A4 in the second opposite main surface 21C. The light emitted from the second LED 20 and incident on the second light incident end surface 21A of the second light guide plate 21 propagates through the second light guide plate 21 and, as a result of being reflected by the second light reflection portion 36 provided on the second opposite main surface 21C, is emitted from the second light guide plate-light emission main surface 21B. Since the second light reflection portion 36 is provided over the third region A3 and the fourth region A4 in the first direction on the second opposite main surface 21C, the light emitted from the second LED 20 is emitted over the portion overlapping the third region A3 and the portion overlapping the fourth region A4 in the second light guide plate-light emission main surface 21B. For example, when the second LED 20 and the third LED 13 are turned on and the first LED 26 is turned off, the light emitted from the backlight device 12 includes the light emitted from the first louver light emission main surface 18B of the first louver 18 in the restricted angle range and the light emitted from both the portion of the second light guide plate-light emission main surface 21B of the second light guide plate 21 overlapping the third region A3 and the portion overlapping the fourth region A4. As a result, in this case, the emission angle range of the light emitted from the backlight device 12 is not so restricted in the first direction. Here, if, for example, the second light reflection portion 36 is selectively provided in the fourth region A4 in the second opposite main surface 21C, it is necessary to turn on both the first LED 26 and the second LED 20 in order to obtain the light whose emission angle range is not substantially restricted in the first direction. However, in this case, there is the possibility that the dark portion may be seen between the light emitted from the portion of the first light guide plate-light emission main surface 27B overlapping the first region A1 and the light emitted from the portion of the second light guide plate-light emission main surface 21B overlapping the fourth region A4. In this regard, since it is sufficient to turn on the second LED 20 while turning off the first LED 26 in order to obtain the light whose emission angle range is not limited in the first direction, the dark portion described above is less likely to be seen.

Further, the first light reflection portion 35 is constituted by the plurality of ninth light guide plate lenses (first lenses) 30 arranged side by side in the first direction in the first opposite main surface 27C, and the second light reflection portion 36 is constituted by the plurality of sixth light guide plate lenses (second lenses) 24 arranged side by side in the first direction in the second opposite main surface 21C. Of the plurality of sixth light guide plate lenses 24, the sixth light guide plate lens 24α disposed at least in the fourth region A4 includes the sixth light guide plate inclined surface (first inclined surface) 24Aα with an inclination gradually upward from the side opposite to the second LED 20 toward the second LED 20 side in the first direction. In the course of propagating inside the second light guide plate 21, the light emitted from the second LED 20 and incident on the second light incident end surface 21A of the second light guide plate 21 is incident on the sixth light guide plate inclined surface 24Aα of the sixth light guide plate lens 24α provided in at least the fourth region A4 of the second opposite main surface 21C. The light incident on the sixth light guide plate inclined surface 24Aα having the inclination gradually upward from the side opposite to the second LED 20 in the first direction toward the second LED 20 side in the second light guide plate 21 is reflected, and is emitted from the portion of the second light guide plate-light emission main surface 21B overlapping at least the fourth region A4. The emission light from at least the portion of second light guide plate-light emission main surface 21B overlapping the fourth region A4 includes a greater amount of light traveling toward the opposite side to the second LED 20 side in the first direction with respect to the normal direction of the second light guide plate-light emission main surface 21B, namely, with respect to the front direction, than light traveling toward the second LED 20 side in the first direction. Thus, when the second LED 20 is turned on, it is possible to supply the emission light of a brightness angle distribution in which the peak brightness of the light emitted from the portion of the second light guide plate-light emission main surface 21B overlapping at least the fourth region A4 is biased toward the side opposite to the second LED 20 side in the first direction. In this way, the brightness of the emission light in a direction inclined with respect to the front direction can be further improved.

Further, of the plurality of sixth light guide plate lenses 24, the sixth light guide plate lens 24β disposed in the third region A3 includes the sixth light guide plate inclined surface (second inclined surface) 24Aβ with an inclination gradually upward from the side opposite to the second LED 20 toward the second LED 20 side in the first direction. Thus, the sixth light guide plate inclined surface 24Aβ has the same inclination as that of the sixth light guide plate inclined surface 24Aα. Thus, when the second LED 20 is turned on, the brightness angle distribution of the light emitted from the second light guide plate-light emission main surface 21B has the same inclination. Accordingly, the local dark portion is less likely to occur in the vicinity of the boundary between the portion of the second light guide plate-light emission main surface 21B overlapping the third region A3 and the portion overlapping the fourth region A4.

The inclination angles θ8 of the sixth light guide plate inclined surface 24Aα and the sixth light guide plate inclined surface 24Aβ with respect to the first direction are equal to each other. The evenness of the brightness angle distribution relating to the light emitted from the second light guide plate-light emission main surface 21B when the second LED 20 is turned on is improved. Accordingly, the local dark portion is less likely to occur in the vicinity of the boundary between the portion of the second light guide plate-light emission main surface 21B overlapping the third region A3 and the portion of the second light guide plate-light emission main surface 21B overlapping the fourth region A4.

Further, the positional relationship of the first LED 26 with respect to the first light guide plate 27 in the first direction is the same as the positional relationship of the second LED 20 with respect to the second light guide plate 21 in the first direction, and each of the plurality of ninth light guide plate lenses 30 includes the ninth light guide plate inclined surface (third inclined surface) 30A with an inclination gradually upward from the side opposite to the first LED 26 toward the first LED 26 side in the first direction. Thus, the ninth light guide plate inclined surface 30A has the same inclination as that of the sixth light guide plate inclined surface 24Aα. Thus, when the second LED 20 is turned off and the first LED 26 is turned on, the brightness angle distribution relating to the light emitted from the first light guide plate-light emission main surface 27B has the same inclination as the brightness angle distribution relating to the light emitted from the second light guide plate-light emission main surface 21B when the first LED 26 is turned off and the second LED 20 is turned on. As a result, the sense of incongruity is less likely to occur in the appearance of the light emitted from the backlight device 12 between the case in which the second LED 20 is turned off and the first LED 26 is turned on, and the case in which the first LED 26 is turned off and the second LED 20 is turned on.

Further, the backlight control circuit (light source control unit) 53 is provided that controls the driving of the first LED 26, the second LED 20, and the third LED 13. Based on the input of the switching signal, the backlight control circuit 53 switches between control in the first mode in which the first LED 26 and the third LED 13 are turned on and the second LED 20 is turned off, and control in the second mode in which the second LED 20 and the third LED 13 are turned on and the first LED 26 is turned off. When the control in the first mode is performed by the backlight control circuit 53, since the first LED 26 and the third LED 13 are turned on and the second LED 20 is turned off, while the emission angle range of the light emitted from the portion of the backlight device 12 overlapping the first region A1 and the third region A3 is not particularly restricted in the first direction, the emission angle range of the light emitted from the portion of the backlight device 12 overlapping the second region A2 and the fourth region A4 is restricted in the first direction. When the control in the second mode is performed by the backlight control circuit 53, since the second LED 20 and the third LED 13 are turned on and the first LED 26 is turned off, the emission angle range of the emission light of the backlight device 12 is not particularly restricted in the first direction.

Further, the second light guide plate 21 is disposed with the first light guide plate 27 interposed between the first louver 18 and the second light guide plate 21. If the second region A2 of the first opposite main surface 27C of the first light guide plate 27 is scratched or the like, there is a concern that the light propagating in the first light guide plate 27 may be emitted from a portion of the first light guide plate-light emission main surface 27B due to the scratch or the like. Even in this case, since the second opposite main surface 21C of the second light guide plate 21 is disposed facing the first light guide plate-light emission main surface 27B of the first light guide plate 27, the light emitted from the portion of the first light guide plate-light emission main surface 27B overlapping the second region A2 can be caused to be less likely to be emitted from the second opposite main surface 21C, as a result of being reflected or the like by the second light guide plate 21. In this way, unintentional light emission can be suppressed.

Further, the optical member is constituted by the third light guide plate 14 in which the third light incident end surface 14A is constituted by at least a part of the outer peripheral end surface, and the third light incident end surface 14A is disposed facing the third LED 13. The light emitted from the third LED 13 is incident on the third light incident end surface 14A of the outer peripheral end surface of the third light guide plate 14, propagates inside the third light guide plate 14, and is subsequently emitted from the third light guide plate-light emission main surface 14B.

The backlight control circuit 53 is provided that controls the driving of the first LED 26, the second LED 20, and the third LED 13. The third light incident end surface 14A is constituted by a portion, of the outer peripheral end surface of the third light guide plate 14, that extends in the first direction. The plurality of third LEDs 13 are arranged side by side in the first direction, and include the fourth LED (fourth light source) 13α arranged facing the portion of the third light guide plate 14 overlapping the first region A1 and the third region A3, and the fifth LED (fifth light source) 130 arranged facing the portion of the third light guide plate 14 overlapping the second region A2 and the fourth region A4. The backlight control circuit 53 causes the light emission amount per unit time of the fourth LED 13α to be larger than the light emission amount per unit time of the fifth LED 130. When the light emitted from the plurality of third LEDs 13 is emitted from the third light guide plate-light emission main surface 14B of the third light guide plate 14, the light is transmitted through the first light guide plate 27 and the second light guide plate 21 and is emitted to the outside. Here, there is a possibility that the light emitted from the portion of the third light guide plate-light emission main surface 14B overlapping the second region A2 and the fourth region A4 may be refracted by the second light reflection portion 36. In contrast to this, there is a possibility that the light emitted from the portion of the third light guide plate-light emission main surface 14B overlapping the first region A1 and the third region A3 may be refracted by both the first light reflection portion 35 and the second light reflection portion 36, and thus tends to be diffused more easily than the light emitted from the portion overlapping the second region A2 and the fourth region A4. In this regard, the backlight control circuit 53 causes the light emission amount per unit time of the fourth LED 13α that supplies the light to the portion of the third light guide plate-light emission main surface 14B overlapping the first region A1 and the third region A3 to be larger than the light emission amount per unit time of the fifth LED 130 that supplies the light to the portion of the third light guide plate-light emission main surface 14B overlapping the second region A2 and the fourth region A4. Thus, unevenness in the light emission amount of the backlight device 12 is less likely to occur.

Further, the liquid crystal display device (display device) 10 according to the present embodiment includes the backlight device 12 described above, and the liquid crystal panel (display panel) 11 configured to perform the display by using the light from the backlight device 12. According to the liquid crystal display device 10 having such a configuration, the emission angle range is restricted for some of the emission light in the backlight device 12, and this is preferable in terms of achieving diversification of the display modes.

Second Embodiment

A second embodiment will be described with reference to FIG. 24 or 25. In the second embodiment, an arrangement of a first backlight unit 112U1 and a second backlight unit 112U2 in the Z-axis direction is switched. Further, repeated description of structures, actions, and effects similar to those of the first embodiment described above will be omitted.

Figure 24:
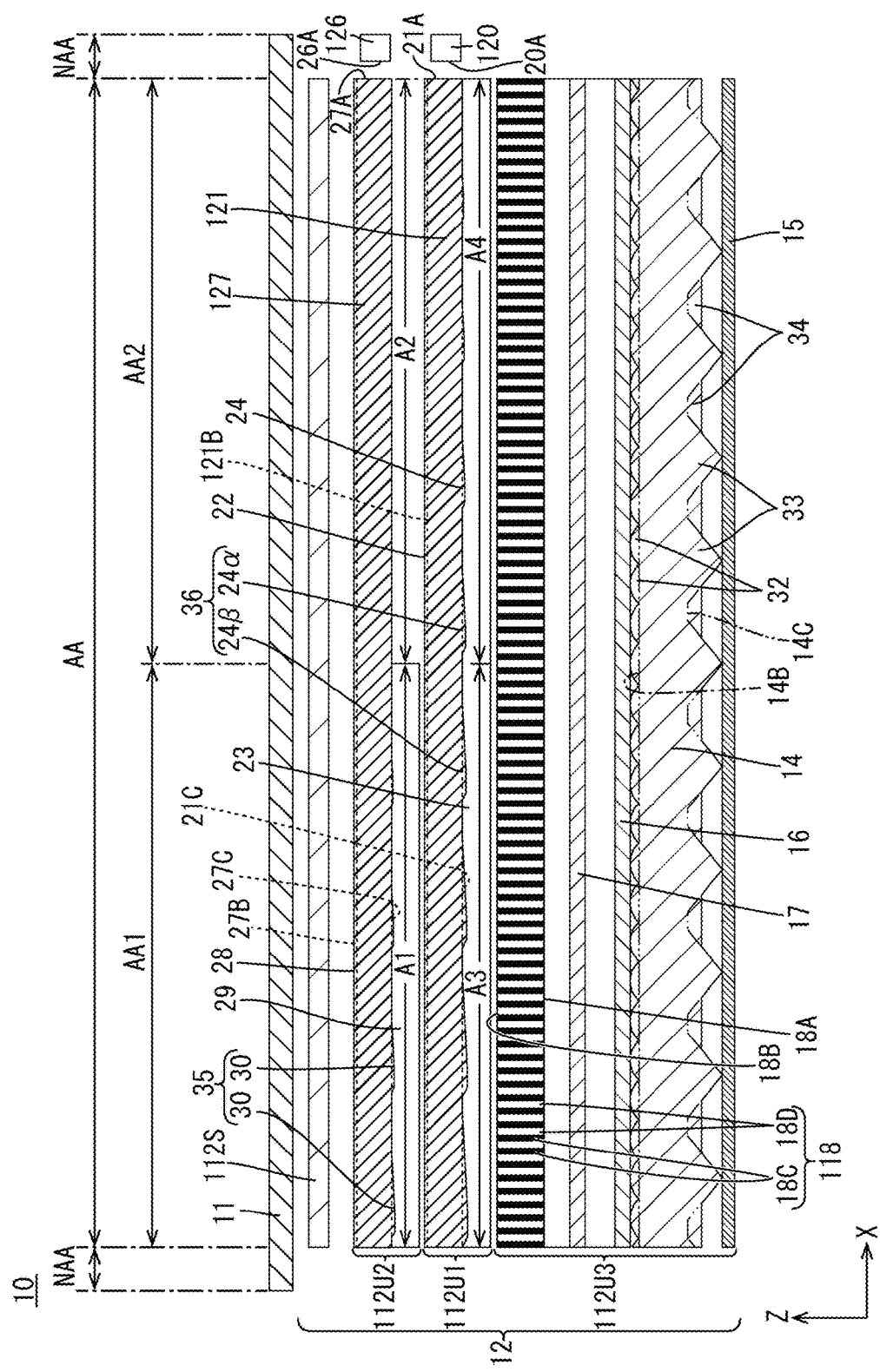
FIG. 24 is a cross-sectional view of the liquid crystal display device according to a second embodiment, taken at the same cutting position as that in FIG. 1.
Figure 25:
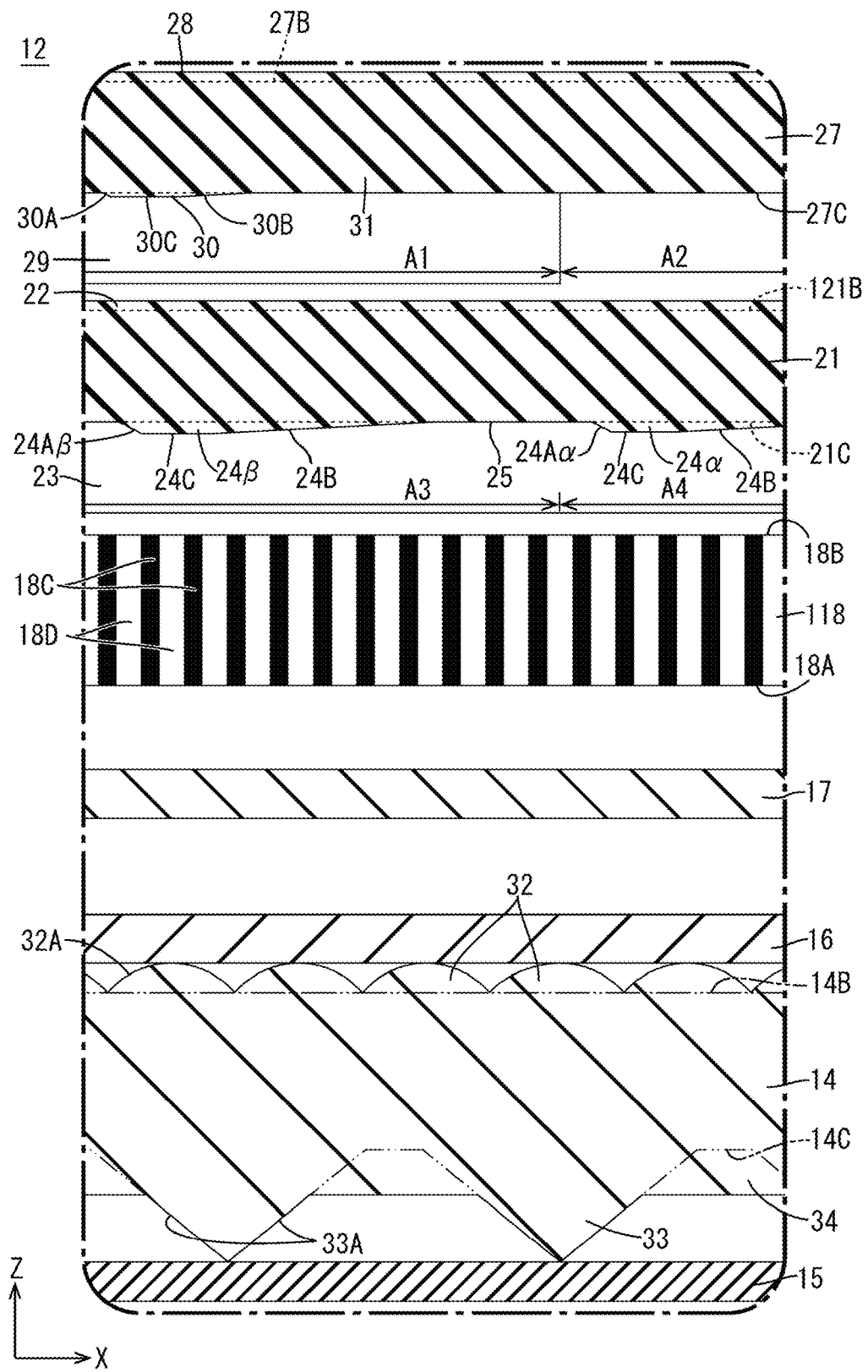
FIG. 25 is a cross-sectional view of the backlight device according to the second embodiment, taken at the same cutting position as that in FIG. 1.

As illustrated in FIG. 24, the first backlight unit 112U1 according to the present embodiment is disposed on the back side of a diffuser sheet 112S. In contrast to this, the second backlight unit 112U2 is disposed on the back side of the first backlight unit 112U1 and on the front side of a third backlight unit 112U3. Thus, as illustrated in FIG. 25, a first light guide plate 127 constituting the first backlight unit 112U1 is disposed so that a second light guide plate 121 constituting the second backlight unit 112U2 is interposed between the first light guide plate 127 and a louver 118 constituting the third backlight unit 112U3. According to such a configuration, when a first LED 126 is turned off and a second LED 120 is turned on, light is selectively emitted from a portion, of a second light guide plate-light emission main surface 121B of the second light guide plate 121, overlapping the fourth region A4. Since the emitted light is emitted to the outside without being transmitted through the first light guide plate 127, refraction or the like by the first light guide plate 127 is avoided.

As described above, according to the present embodiment, the first light guide plate 127 is disposed such that the second light guide plate 121 is sandwiched between first light guide plate 127 and the louver 118. When the first LED 126 is turned off and the second LED 120 is turned on, the light is selectively emitted from the portion of the second light guide plate-light emission main surface 121B of the second light guide plate 121 overlapping the fourth region A4. Since the emitted light is emitted to the outside without being transmitted through the first light guide plate 127, refraction or the like by the first light guide plate 127 is avoided.

Third Embodiment

A third embodiment will be described with reference to FIG. 26 or FIG. 27. In the third embodiment, a case will be described in which a configuration of a third backlight unit 212U3 is changed from that in the above-described first embodiment. Further, repeated description of structures, actions, and effects similar to those of the first embodiment described above will be omitted.

Figure 26:
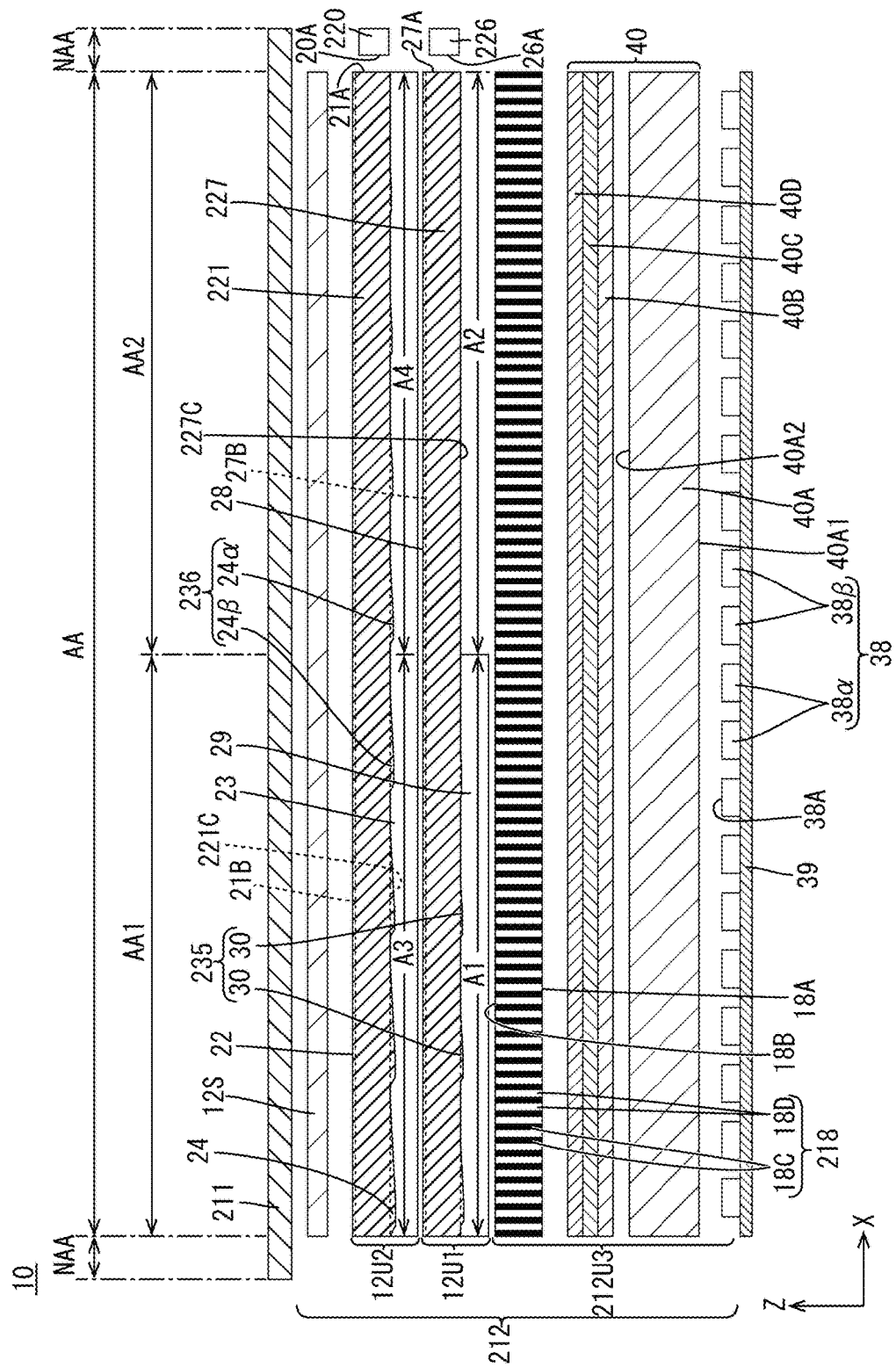
FIG. 26 is a cross-sectional view of the liquid crystal display device according to a third embodiment, taken at the same cutting position as that in FIG. 1.

As illustrated in FIG. 26, the third backlight unit 212U3 according to the present embodiment is a so-called direct-lit type. In the same manner as the first embodiment, the third backlight unit 212U3 includes at least a louver 218, a plurality of third LEDs (third light sources) 38, an LED substrate (light source substrate) 39 on which the plurality of third LEDs 38 are mounted, and an optical member 40 that imparts an optical action onto light emitted from the third LEDs 38.

Figure 27:
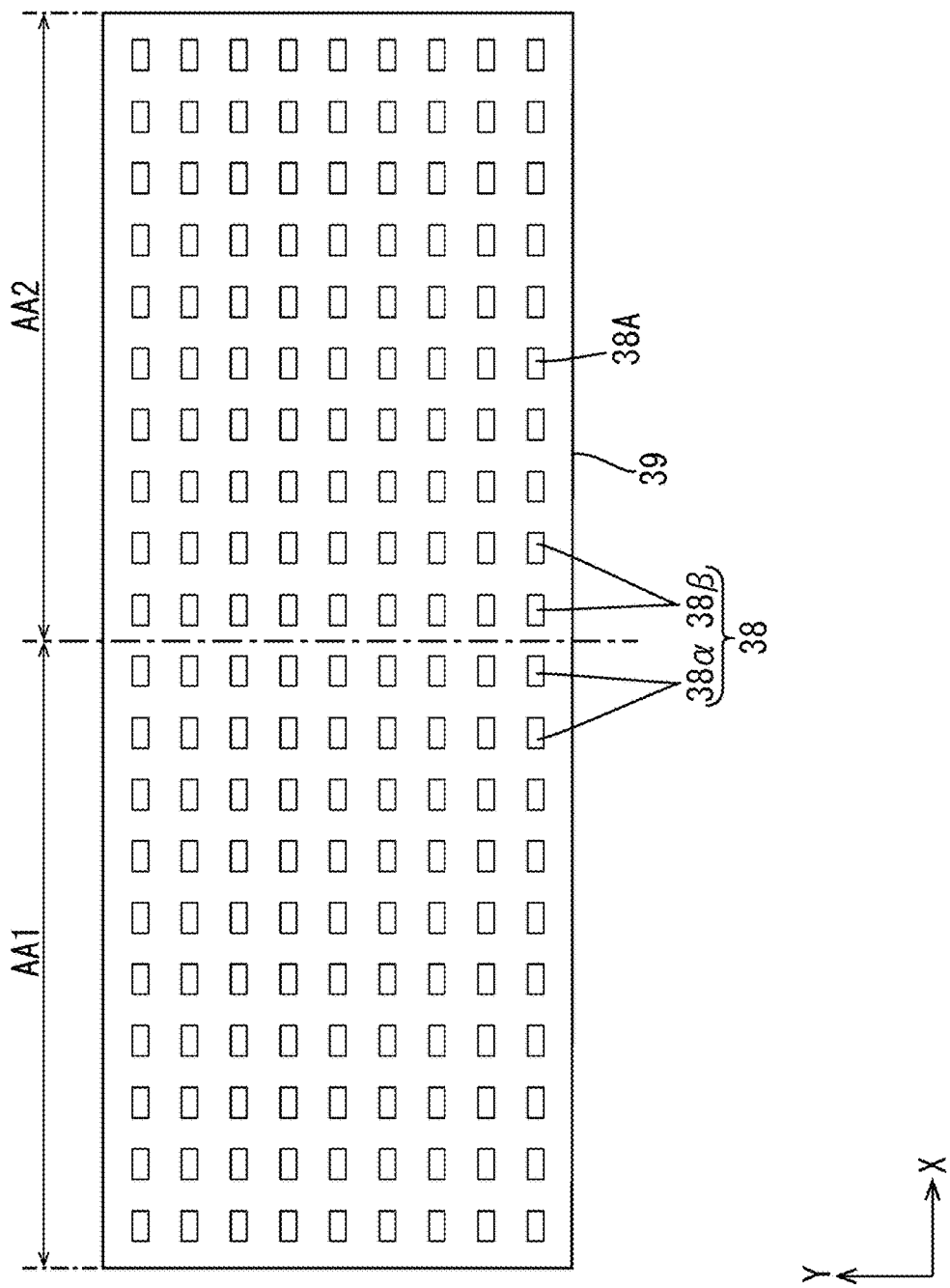
FIG. 27 is a plan view illustrating an LED substrate constituting the backlight device according to the third embodiment.

As illustrated in FIGS. 26 and 27, each of the third LEDs 38 is a so-called top emitting type LED that is mounted on a front surface of the LED substrate 39 and including a third light-emitting surface 38A facing the side (the front side, the side of the optical member 40) opposite to the side of the LED substrate 39. Main surfaces of the LED substrate 39 are parallel to and overlap each of main surfaces of a liquid crystal panel 211, each of light guide plates 221 and 227, and the like. Of the main surfaces of the LED substrate 39, the plurality of third LEDs 38 are mounted on the main surface facing the front side, and this is a mounting surface. The plurality of third LEDs 38 are arranged side by side in a matrix at positions at intervals from each other in the X-axis direction and the Y-axis direction, within the main surface on the front side of the LED substrate 39.

As illustrated in FIG. 26, the optical member 40 includes four optical members layered on each other in the Z-axis direction. Main surfaces of each of the plurality of optical members 40 are parallel to and overlap the main surfaces of the liquid crystal panel 211, the light guide plates 221 and 227, and the like. The four optical members 40 are, in order from the back side, a diffuser plate (optical member) 40A, a diffuser sheet 40B, and two prism sheets 40C and 40D.

A substrate thickness of the diffuser plate 40A is thicker than that of the other optical members 40B to 40D, as illustrated in FIG. 26. The diffuser plate 40A has a configuration in which a large number of diffusion particles are dispersed in a base material made of a substantially transparent resin, and has a function of diffusing transmitted light. The main surface on the back side of the diffuser plate 40A faces the third light-emitting surface 38A of the third LED 38, and serves as a light incident surface 40A1 on which the light from the third LED 38 is incident. The main surface on the front side of the diffuser plate 40A is a light exit surface (fifth main surface) 40A2 that emits light incident from the light incident surface 40A1 toward the front side. It can be said that the plurality of third side third LEDs 38 are disposed in a planar manner so as to overlap with the light incident surface 40A1 and the light exit surface 40A2 which are the main surfaces of the diffuser plate 40A. The light exit surface 40A2 of the diffuser plate 40A is arranged to face the louver 218 via the other optical members 40B to 40D. When the light emitted from the third light-emitting surface 38A of the third LED 38 is incident on the light incident surface 40A1 of the diffuser plate 40A, a diffusion effect is imparted to the light by the diffusion particles and the light is emitted from the light exit surface 40A2 toward the front side.

As illustrated in FIG. 26, the diffuser sheet 40B has a configuration in which a large number of diffusion particles for diffusing the light are dispersed and mixed in a substantially transparent synthetic resin substrate. The two prism sheets 40C and 40D each have a configuration in which prisms extending in the X-axis direction or the Y-axis direction at a main surface in a substantially transparent synthetic resin substrate are arranged side by side in a large number in the direction orthogonal to that extending direction (the Y-axis direction or the X-axis direction), and the prism sheets 40C and 40D selectively impart a condensing action on incident light in the arrangement direction of the prisms. The two prism sheets 40C and 40D are arranged such that the extending directions of the prisms (arrangement directions of the prisms) are orthogonal to each other.

In the present embodiment, the backlight control circuit 53 (see FIG. 12) drives the plurality of third LEDs 38 as follows. Specifically, the backlight control circuit 53 can control the light emission amount and the turning on and off of each of the plurality of third LEDs 38 illustrated in FIGS. 26 and 27 in accordance with the display gray scale of the image displayed in the display region AA of the liquid crystal panel 211. In this way, so-called local dimming control can be realized, and a contrast performance and the like can be improved.

Furthermore, in both the first display mode and the second display mode, the backlight control circuit 53 (see FIG. 12) divides the plurality of third LEDs 38 into the following two groups and drives them. Specifically, as illustrated in FIGS. 26 and 27, the plurality of third LEDs 38 arranged in the matrix are grouped into a plurality of fourth LEDs (fourth light sources) 38*a* arranged overlapping the first region A1 and the third region A3 and a plurality of fifth LEDs (fifth light sources) 380 arranged overlapping the second region A2 and the fourth region A4. In the following description, when a distinction is made with respect to the third LEDs 38, the suffix "a" is appended to the reference sign of the "fourth LEDs", and the suffix R is appended to the "fifth LEDs". When the third LEDs 38 are referred to without distinction, a suffix is not appended to the reference sign.

As illustrated in FIGS. 26 and 27, the backlight control circuit (see FIG. 12) 53 controls the light emission amount per unit time of the fourth LED 38*a* to be larger than the light emission amount per unit time of the fifth LED 380 even when the display gray scale of the first display portion AA1 is the same as the display gray scale of the second display portion AA2. Note that, when the display gray scale in the second display portion AA2 is lower than the display gray scale in the first display portion AA1, the backlight control circuit 53 may perform control such that the light emission amount per unit time of the fourth LED 38*a* and the light emission amount per unit time of the fifth LED 380 are the same as each other.

As illustrated in FIGS. 26 and 27, when the light emitted from the plurality of third LEDs 38 is emitted from the light exit surface 40A2 of the diffuser plate 40A, the light is transmitted through the first light guide plate 227 and the second light guide plate 221 and is emitted to the outside. Here, when the light emitted from the portion of the light exit surface 40A2 overlapping the second region A2 and the fourth region A4 is incident on the fourth region A4 of a second opposite main surface 221C of the second light guide plate 221, the light may be refracted by a second light reflection portion 236. Here, when the emitted light described above is incident on the second region A2 of a first opposite main surface 227C of the first light guide plate 227, the light is barely refracted because a first light reflection portion 235 is not formed in the second region A2 and the second region A2 is substantially flat. On the other hand, when the light emitted from the portion of the light exit surface 40A2 overlapping the first region A1 and the third region A3 is incident on the second region A2 of the first opposite main surface 227C of the first light guide plate 227, the light may be refracted by the first light reflection portion 235, and when the light is incident on the fourth region A4 of the second opposite main surface 221C of the second light guide plate 221, the light may also be refracted by the second light reflection portion 236. For this reason, the light emitted from the portion of the light exit surface 40A2 overlapping the first region A1 and the third region A3 tends to be diffused more easily than the light emitted from the portion overlapping the second region A2 and the fourth region A4, and the amount of light emitted from the portion of the backlight device 212 overlapping the first region A1 and the third region A3 tends to be smaller than the amount of light emitted from the portion overlapping the second region A2 and the fourth region A4. In this regard, even when the display gray scale of the first display portion AA1 is the same as the display gray scale of the second display portion AA2, the backlight control circuit 53 sets the light emission amount per unit time of the fourth LED 38*a*, which supplies the light to the portion of the light exit surface 40A2 overlapping the first region A1 and the third region A3, to be larger than the light emission amount per unit time of the fifth LED 380, which supplies the light to the portion of the light exit surface 40A2 overlapping the second region A2 and the fourth region A4. Accordingly, in the backlight device 212, a difference is less likely to occur between the amount of light emitted from the portion overlapping the first region A1 and the third region A3 and the amount of light emitted from the portion overlapping the second region A2 and the fourth region A4.

As described above, according to the present embodiment, the backlight control circuit 53 is provided that controls the driving of the first LED 226, the second LED 220, and the third LED (third light source) 38, and the plurality of third LEDs 38 are arranged in the planar manner so as to overlap the light exit surface (fifth main surface) 40A2 of the diffuser plate (optical member) 40A. The light incident surface 40A1 of the diffuser plate 40A is constituted by the main surface on the opposite side to the light exit surface 40A2, and is arranged so as to face the plurality of third LEDs 38. When the plurality of third LEDs 38 are turned on by the backlight control circuit 53, the light is incident on the light incident surface 40A1 on the opposite side to the light exit surface 40A2 of the diffuser plate 40A, the optical action is imparted to the light by the diffuser plate 40A, and the light is then emitted from the light exit surface 40A2. It is possible to realize the so-called local dimming control by the backlight control circuit 53 controlling the light emission amount and the turning on and off of each of the plurality of third LEDs 38 arranged in the planar manner overlapping the light exit surface 40A2.

Further, the plurality of third LEDs 38 include the fourth LED (fourth light source) 38*a* arranged overlapping the first region A1 and the third region A3 and the fifth LED (fifth light source) 380 arranged overlapping the second region A2 and the fourth region A4, and the backlight control circuit 53 causes the light emission amount per unit time of the fourth LED 38*a* to be larger than the light emission amount per unit time of the fifth LED 380. When the light emitted from the plurality of third LEDs 38 is emitted from the light exit surface 40A2 of the diffuser plate 40A, the light is transmitted through the first light guide plate 227 and the second light guide plate 221 and is emitted to the outside. Here, the light emitted from the portion of the light exit surface 40A2 overlapping the second region A2 and the fourth region A4 may be refracted by the second light reflection portion 236. On the other hand, the light emitted from the portion of the light exit surface 40A2 overlapping the first region A1 and the third region A3 may be refracted by both the first light reflection portion 235 and the second light reflection portion 236, and thus tends to be diffused more easily than the light emitted from the portion overlapping the second region A2 and the fourth region A4. In this regard, since the backlight control circuit 53 causes the light emission amount per unit time of the fourth LED 38*a*, which supplies the light to the portion of the light exit surface 40A2 overlapping the first region A1 and the third region A3, to be larger than the light emission amount per unit time of the fifth LED 380, which supplies the light to the portion of the light exit surface 40A2 overlapping the second region A2 and the fourth region A4, unevenness in the light emission amount of the backlight device 212 is less likely to occur.

Fourth Embodiment

A fourth embodiment will be described with reference to FIG. 28. In the fourth embodiment, a case will be described in which a configuration of a third backlight unit 312U3 is changed from that in the above-described first embodiment. Further, repeated description of structures, actions, and effects similar to those of the first embodiment described above will be omitted.

Figure 28:
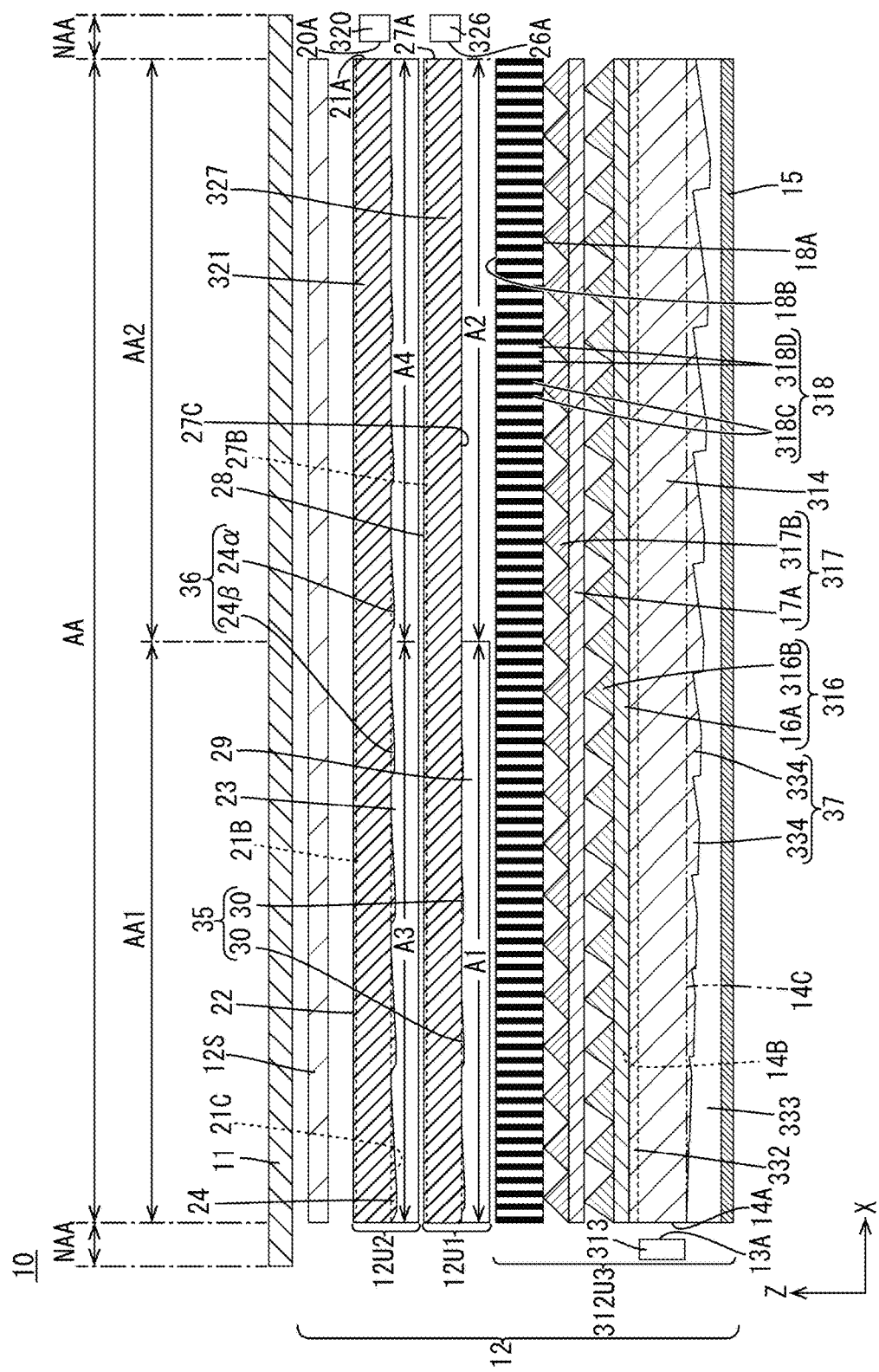
FIG. 28 is a cross-sectional view of the liquid crystal display device according to a fourth embodiment, taken at the same cutting position as that in FIG. 1.

As illustrated in FIG. 28, the third backlight unit 312U3 according to the present embodiment has a configuration obtained by rotating the third backlight unit 12U3 (see FIG. 2) described in the first embodiment by 90° around an axis along the Z-axis direction. To be specific, the third backlight unit 312U3 is configured such that an arrangement direction of a third LED 313 and a third light guide plate 314 coincides with the X-axis direction. The third LED 313 is disposed on the left side of the third light guide plate 314 in FIG. 28. Thus, the positional relationship between the third LED 313 and the third light guide plate 314 in the X-axis direction is the reverse of the positional relationship between a first LED 326 and a first light guide plate 327 in the X-axis direction and of the positional relationship between a second LED 320 and a second light guide plate 321 in the X-axis direction. A first light guide plate lens 332 provided in the third light guide plate 314 extends in the X-axis direction, and a plurality of the first light guide plate lenses 332 are disposed side by side in the Y-axis direction. A second light guide plate lens 333 extends in the X-axis direction, and a plurality of the second light guide plate lenses 333 are disposed side by side in the Y-axis direction. A plurality of third light guide plate lenses 334 are disposed side by side at intervals in the X-axis direction.

As illustrated in FIG. 28, a first prism sheet 316 constituting the third backlight unit 312U3 includes a first prism 316B that has a substantially triangular cross-sectional shape when cut along the X-axis direction and extends linearly in the Y-axis direction. A second prism sheet 317 constituting the third backlight unit 312U3 includes a second prism 317B that has a substantially triangular cross-sectional shape when cut along the X-axis direction and extends linearly in the Y-axis direction. The first prism 316B and the second prism 317B can selectively impart a condensing action in the X-axis direction on light from the third light guide plate 314 side. On the other hand, the arrangement direction of first light blocking portions 318C and first light-transmitting portions 318D constituting a louver 318 coincides with the X-axis direction. Thus, it can be said that a light condensing direction by the first prism 316B and the second prism 317B coincides with the direction in which the louver 318 restricts the emission angle range of light. Accordingly, an amount of light (loss light amount) absorbed or the like by the first light blocking portion 316B in the course of the light emitted from the first prism 317B and the second prism 318D being transmitted through the first light-transmitting portion 318C of the louver 318 is reduced, and it is thus possible to improve usage efficiency of light.

Fifth Embodiment

A fifth embodiment will be described with reference to FIG. 29. In the fifth embodiment, a case will be described in which an arrangement of a first backlight unit 412U1 and a second backlight unit 412U2 is changed from that of the above-described first embodiment. Further, repeated description of structures, actions, and effects similar to those of the first embodiment described above will be omitted.

Figure 29:
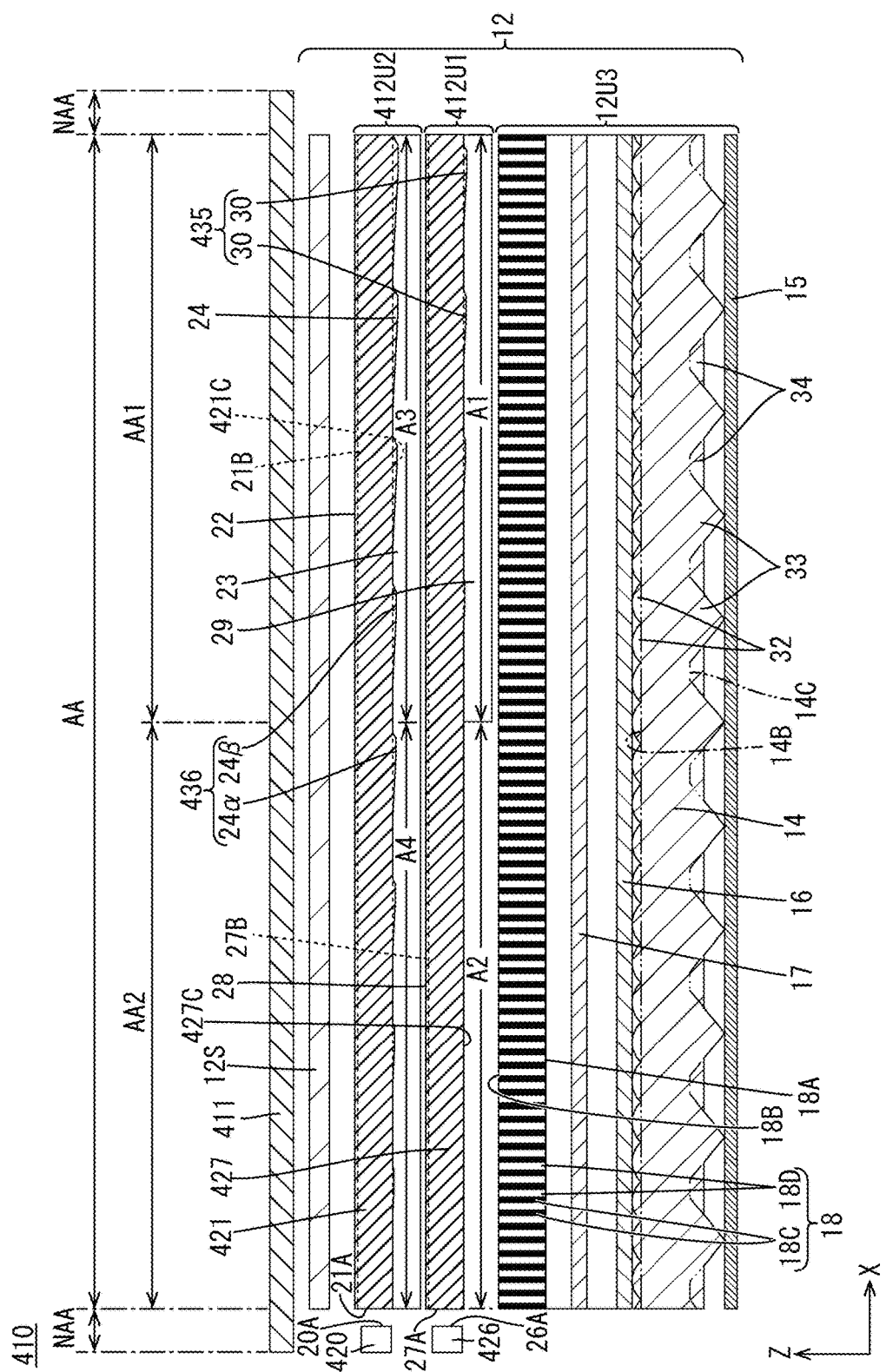
FIG. 29 is a cross-sectional view of a liquid crystal display device according to a fifth embodiment, taken at the same cutting position as that in FIG. 1.

As illustrated in FIG. 29, the first backlight unit 412U1 and the second backlight unit 412U2 according to the present embodiment have a configuration in which the first backlight unit 412U1 and the second backlight unit 412U2 described in the above-described first embodiment (see FIG. 1) are rotated by 180° around axes along the Z-axis direction. A first LED 426 is disposed on the left side of a first light guide plate 427 illustrated in FIG. 29. A second LED 420 is disposed on the left side of a second light guide plate 421 illustrated in FIG. 29.

A passenger vehicle in which a liquid crystal display device 410 according to the present embodiment is mounted has a configuration in which the driver's seat is located on the right side in FIG. 29 and the passenger seat is located on the left side in FIG. 29, that is, is a right-hand drive vehicle. Accordingly, the display region AA of a liquid crystal panel 411 is divided into the first display portion AA1 located on the right side in FIG. 29 and in front of the driver's seat, and the second display portion AA2 located on the left side in FIG. 29 and in front of the front passenger seat. A first opposite main surface 427C of the first light guide plate 427 is divided into the first region A1 located on the right side in FIG. 29 and overlapping the first display portion AA1 and the second region A2 located on the left side in FIG. 29 and overlapping the second display portion AA2. Similarly, a second opposite main surface 421C of the second light guide plate 421 is divided into the third region A3 located on the right side in FIG. 29 and overlapping the first region A1 (first display portion AA1) and the fourth region A4 located on the left side in FIG. 29 and overlapping the second region A2 (second display portion AA2).

Then, a first light reflection portion 435 is selectively provided in the first region A1 located on the right side in FIG. 29 in the first opposite main surface 427C, and is selectively not formed in the second region A2 located on the left side in FIG. 29. A light distribution relating to the light that is emitted from the first LED 426, is propagated through the first light guide plate 427, and then is raised and emitted by the first light reflection portion 435, is left-right inverted with respect to the light distribution shown in FIG. 13. A second light reflection portion 436 is provided over the third region A3 and the fourth region A4 in the second opposite main surface 421C. A light distribution relating to the light that is emitted from the second LED 420, is propagated through the second light guide plate 421, and then is raised and emitted by the second light reflection portion 436, is left-right inverted with respect to the light distribution shown in FIG. 13. With such a configuration also, actions and effects similar to those of the above-described first embodiment can be obtained.

Sixth Embodiment

A sixth embodiment will be described with reference to FIG. 30 or FIG. 31. In the sixth embodiment, a case will be described in which a configuration of a first backlight unit 512U1 is changed from that of the above-described first embodiment. Further, repeated description of structures, actions, and effects similar to those of the first embodiment described above will be omitted.

Figure 30:
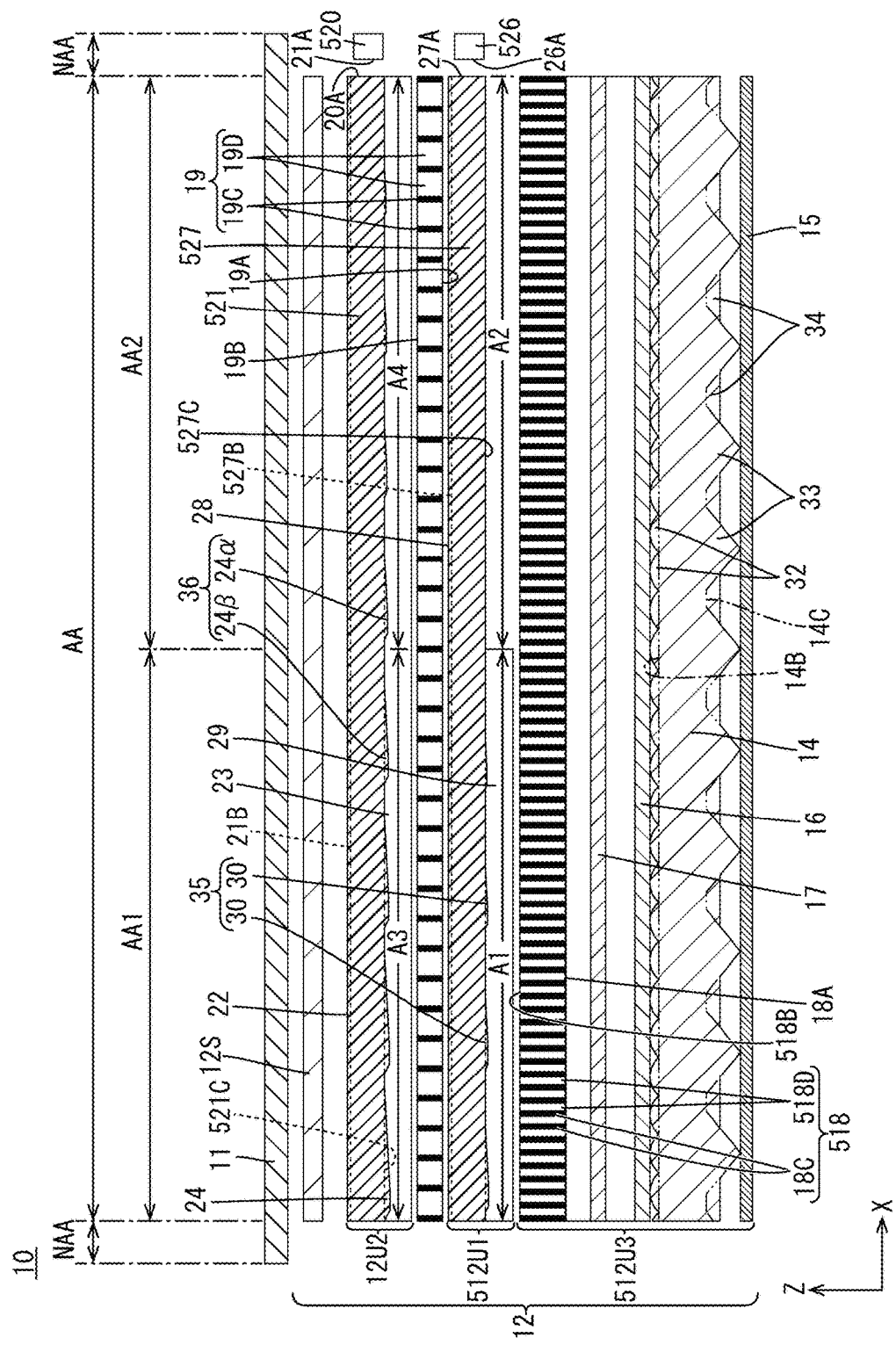
FIG. 30 is a side cross-sectional view of the liquid crystal display device according to a sixth embodiment.

As illustrated in FIG. 30, the first backlight unit 512U1 according to the present embodiment includes a second louver (second sheet) 19, in addition to a first LED 526 and a first light guide plate 527. The second louver 19 is disposed on the front side of the first light guide plate 527. In other words, the second louver 19 is interposed between the first light guide plate 527 and a second light guide plate 521 in the Z-axis direction. A main surface of the second louver 19 is parallel to each of main surfaces of the first light guide plate 527 and the like, and the second louver 19 has a sheet shape. Note that the main surface of the second louver 19 is parallel to the X-axis direction and the Y-axis direction, and the normal direction (thickness direction) of the main surface coincides with the Z-axis direction. The second louver 19 has a function of restricting the emission angle range of the light in the X-axis direction. The second louver 19 has approximately the same size as that of the first light guide plate 527 in a plan view, and is disposed to overlap at least the entire display region AA in a plan view. The second louver 19 includes a second louver light incident main surface (ninth main surface) 19A on the back side, and a second louver light emission main surface (eighth main surface) 19B on the front side. The second louver light incident main surface 19A is disposed so as to be oriented toward a first light guide plate-light emission main surface (first main surface) 527B of the first light guide plate 527, and faces the first light guide plate-light emission main surface 527B. The second louver light emission main surface 19B is arranged so as to be oriented toward a second light guide plate opposite main surface 521C of the second light guide plate 521, and faces the second light guide plate opposite main surface 521C.

Figure 31:
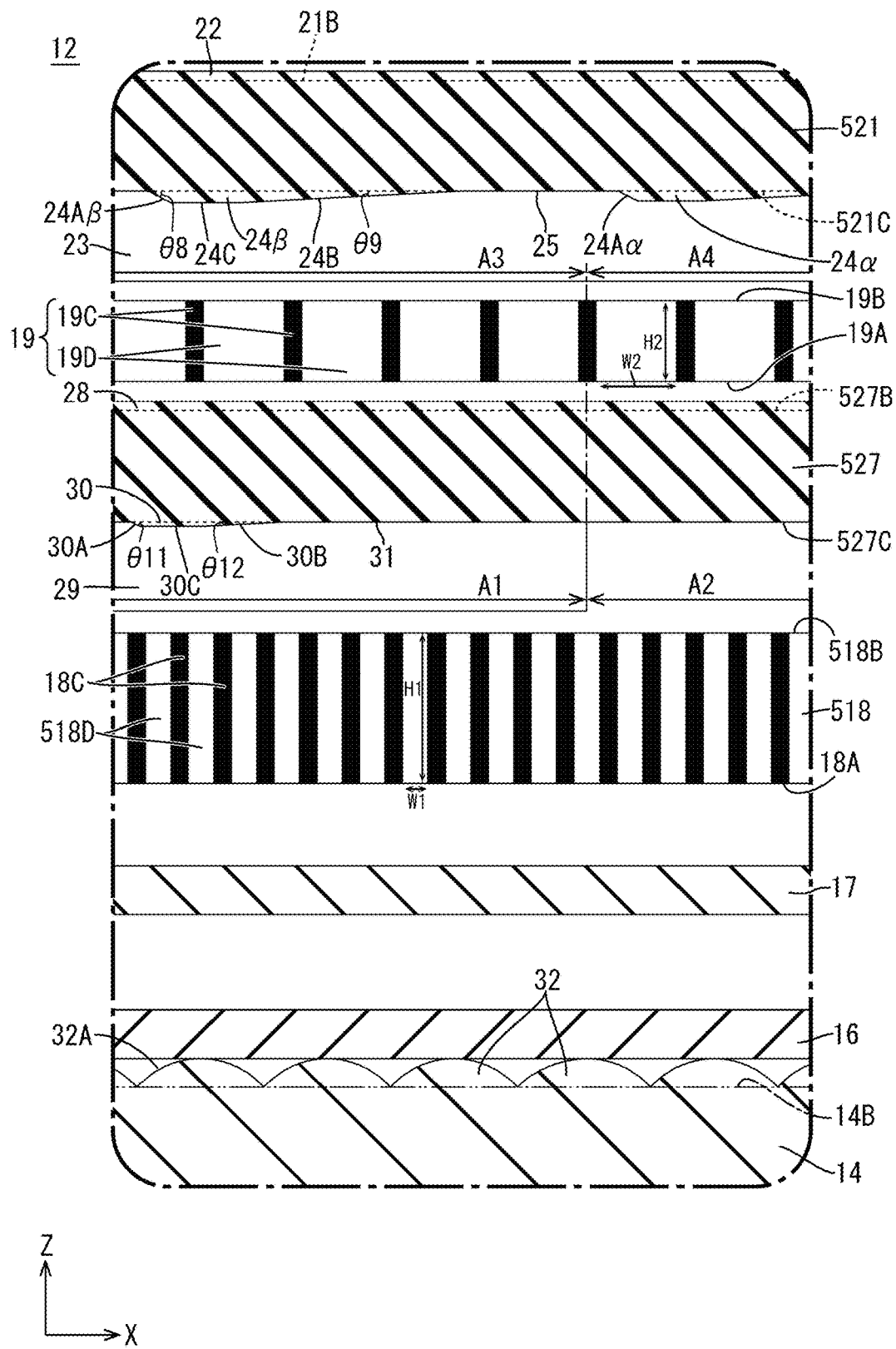
FIG. 31 is a cross-sectional view of the backlight device according to the sixth embodiment, taken at the same cutting position as that in FIG. 30.

As illustrated in FIG. 31, the second louver 19 includes second light blocking portions 19C that block the light and second light-transmitting portions 19D that transmit the light. The second light blocking portion 19C is formed, for example, of a light blocking resin material (light blocking material) that exhibits a black color and blocks light. The second light blocking portion 19C has a layer shape extending in the Y-axis direction and the Z-axis direction, and a plurality of the second light blocking portions 19C are disposed side by side at intervals in the X-axis direction. The second light-transmitting portion 19D is formed of a light-transmissive resin material (light-transmissive material) that is substantially transparent and transmits the light. The second light-transmitting portion 19D has a layer shape extending in the Y-axis direction and the Z-axis direction, and a plurality of the second light-transmitting portions 19D are arranged side by side at intervals in the X-axis direction. The plurality of second light blocking portions 19C and the plurality of second light-transmitting portions 19D are repeatedly and alternately arranged side by side in the X-axis direction. Thus, the second light-transmitting portion 19D is interposed between two of the second light blocking portions 19C that are adjacent to each other at the interval in the X-axis direction, and the second light blocking portion 19C is interposed between two of the second light-transmitting portions 19D that are adjacent to each other at the interval in the X-axis direction. Light incident on the second louver light incident main surface 19A of the second louver 19 is transmitted through the second light-transmitting portion 19D disposed between the two second light blocking portions 19C that are adjacent to each other in the X-axis direction, and is emitted from the second louver light emission main surface 19B. An emission angle, in the X-axis direction, of emission light from the second louver light emission main surface 19B is restricted by the two second light blocking portions 19C that are adjacent to each other in the X-axis direction. Note that emission light from the second louver light emission main surface 19B has an emission angle that is not restricted by the second louver 19 in the Y-axis direction. The emission angle range of the emission light from the second louver light emission main surface 19B in the X-axis direction is defined by two straight lines that diagonally connect each of end portions in the Z-axis direction of the two second light blocking portions 19C that sandwich the second light-transmitting portion 19D. The emission angle range, in the X-axis direction, of the transmitted light of the second light-transmitting portion 19D changes according to a ratio between a width W2 and a height H2 of the second light-transmitting portion 19D. Further, the second louver 19 includes a pair of sheet carriers that sandwich and carry the plurality of second light blocking portions 19C and the plurality of second light-transmitting portions 19D from the front side and the back side. The sheet carrier is formed of a light-transmissive resin material that is substantially transparent and transmits light. The sheet carrier extends over the entire second louver 19, and collectively carries the plurality of second light blocking portions 19C and the plurality of second light-transmitting portions 19D.

As illustrated in FIG. 31, in the second louver 19, a ratio acquired by dividing the width W2 of the second light-transmitting portion 19D by the height H2 is equal to "tan 45°". In other words, in the second light-transmitting portion 19D, the width W2 and the height H2 have the same value, and a cross-sectional shape taken along the Z-axis direction and the X-axis direction has a substantially square shape. In this way, a maximum absolute value of an angle formed by light transmitted through the second light-transmitting portion 19D with respect to the Z-axis direction is 45°. The ratio obtained by dividing the width W2 by the height H2 of the second light-transmitting portion 19D (tan 45°) is greater than a ratio obtained by dividing the width W1 by the height H1 of a first light-transmitting portion 518D (tan 10°) provided in a first louver 518. Assuming that the Z-axis direction is 0°, the emission angle range of the light transmitted through the second light-transmitting portion 19D and emitted from the second louver light emission main surface 19B is ±45°, which is wider than an emission angle range (±10°) of the light transmitted through the first light-transmitting portion 518D and emitted from a first louver light emission main surface 518B.

Here, for example, in a case in which the second region A2 of a first opposite main surface 527C of the first light guide plate 527 is scratched or the like, there is a concern that light propagating in the first light guide plate 527 may be emitted from a portion, of the first light guide plate-light emission main surface 527B, overlapping the second region A2, as a result of being scattered by the scratch or the like. Even in this case, since the second louver 19 is disposed on the front side of the first light guide plate-light emission main surface 527B, the emission angle range of the light emitted from the portion of the first light guide plate-light emission main surface 527B overlapping the second region A2 can be restricted within the range of ±45°. Thus, when the first LED 526 and the third LED 13 (see FIG. 2) are turned on and a second LED 520 is turned off, even if the light emitted from the first LED 526 and propagating through the first light guide plate 527 is emitted from the portion of the first opposite main surface 527C overlapping the second region A2, due to the scratch or the like occurring in the second region A2 of the first light guide plate-light emission main surface 527B, it is possible to substantially prevent the light from being emitted in angle ranges as the absolute value exceeding 450 (+45° to +90°, −45° to −90°).

Accordingly, when the first LED 526 and the third LED 13 (see FIG. 2) are turned on and the second LED 520 is turned off, a situation in which the display image of the second display portion AA2 located in front of the front passenger seat in the display region AA can be viewed from the driver's seat is less likely to occur, and thus the display performance in the "partial privacy mode" is improved. On the other hand, when the second LED 520 and the third LED 13 (see FIG. 2) are turned on and the first LED 526 is turned off, the light emitted from the second light guide plate 521 does not pass through the second louver 19, and thus the emission angle range is not restricted. In contrast to this, although the light emitted from the third backlight unit 512U3 is transmitted through the second light-transmitting portions 19D of the second louver 19 and emitted to the outside, since the emission angle range restricted by the second louver 19 is wider than the emission angle range restricted by the first louver 518, the light is barely absorbed by the second light blocking portions 19C, and a brightness reduction caused by the second louver 19 can be substantially avoided.

As described above, according to the present embodiment, the second louver (second sheet) 19 having the one main surface as the second louver light emission main surface (eighth main surface) 19B and the other main surface as the second louver light-incident main surface (ninth main surface) 19A facing the first light guide plate-light emission main surface 527B is provided, and the second louver 19 at least includes two of the second light blocking portions 19C arranged at an interval in the first direction to block the light and the second light-transmitting portion 19C disposed between the two second light blocking portions 19D to transmit the light. When the second region A2 of the first opposite main surface 527C of the first light guide plate 527 is scratched or the like, there is a concern that the light propagating through the first light guide plate 527 may be emitted from the first light guide plate-light emission main surface 527B due to the scratch or the like. Even in this case, since the second louver 19 is disposed such that the second louver light incident main surface 19A faces the first light guide plate-light emission main surface 527B, a part of the light emitted from the portion of the first light guide plate-light emission main surface 527B overlapping the second region A2 is absorbed by the second light blocking portions 19D in the process of being transmitted through the second light-transmitting portion 19C of the second louver 19. That is, even if the light is scattered by the scratch or the like that has occurred in the second region A2 of the first opposite main surface 527C, since the emission angle range is restricted by the second louver 19, it is possible to suppress the unintentional emission of light.

Other Embodiments

Figure 32:
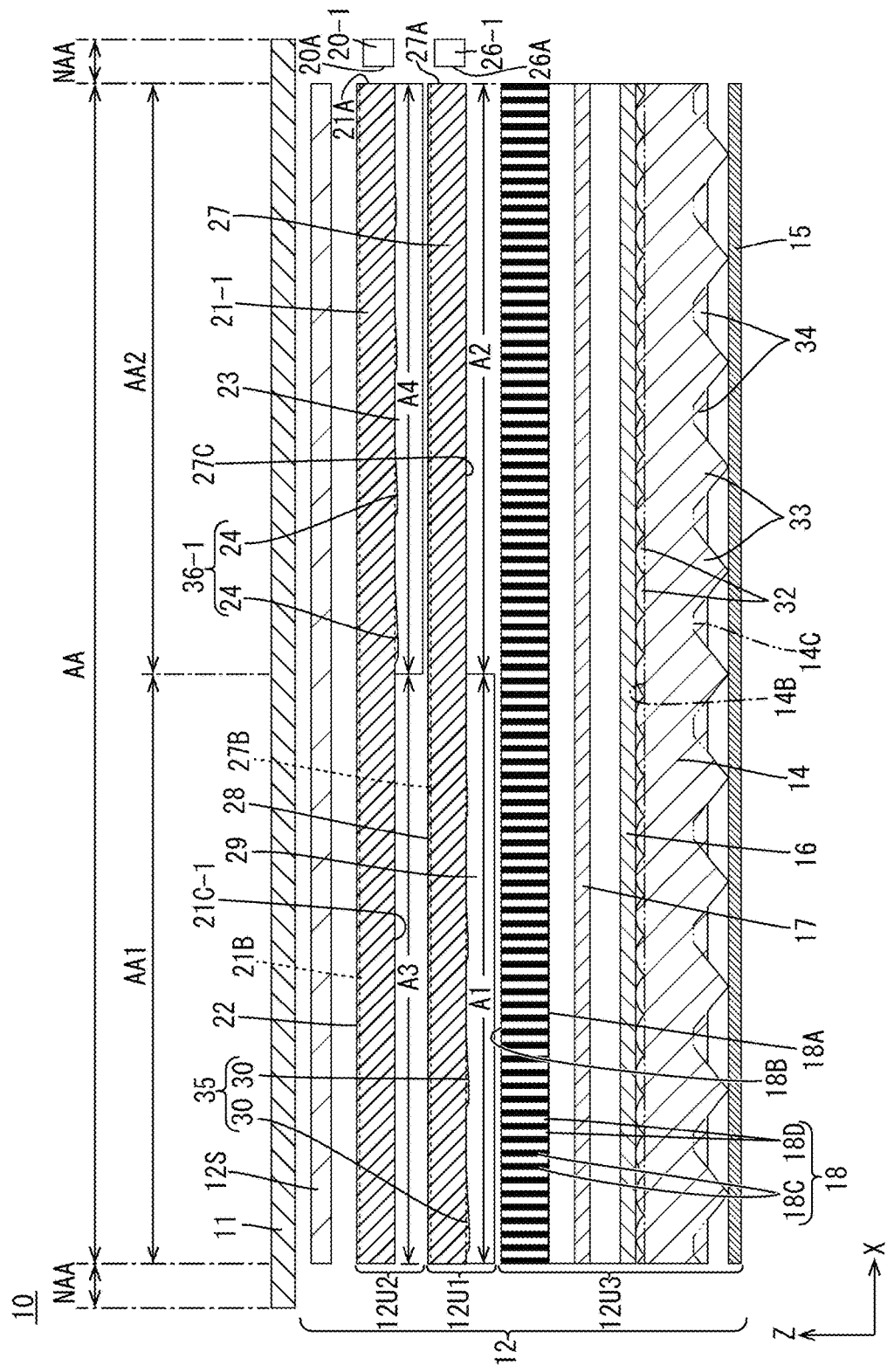
FIG. 32 is a cross-sectional view of the liquid crystal display device according to another embodiment, taken at the same cutting position as that in FIG. 1.

The techniques disclosed herein are not limited to the embodiments described above and illustrated in the drawings, and the following embodiments, for example, are also included within the technical scope.
- (1) A second light guide plate 21-1 may have a configuration illustrated in FIG. 32. In the second light guide plate 21-1 illustrated in FIG. 32, a second light reflection portion 36-1 is selectively provided in the fourth region A4 of a second opposite main surface 21C-1, and is selectively not formed in the third region A3. In such a configuration, when performing the display in the second display mode, the backlight control circuit 53 (see FIG. 12) may perform the control so as to turn on all of a first LED 26-1, a second LED 20-1, and the third LED 13 (see FIG. 3).
- (2) A specific configuration of the sixth light guide plate lens 24 constituting the second light reflection portion 36, 236, and 436 can be changed as appropriate. For example, the sixth light guide plate inclined surfaces 24Aα provided in the sixth light guide plate lenses 24α disposed in the fourth region A4 may include a plurality of types having different inclination angles with respect to the X-axis direction. Similarly, the sixth light guide plate inclined surfaces 24Aβ included in the sixth light guide plate lenses 24*p* disposed in the third region A3 may include a plurality of types having different inclination angles with respect to the X-axis direction.
- (3) When the configuration of the sixth light guide plate lens 24 is changed as described in (2) above, the light distribution relating to the light emitted from the second LED 20, 120, 220, 320, 420, and 520, propagated through the second light guide plate 21, 121, 221, 321, 421, and 521, and then raised and emitted by the second light reflection portion 36, 236, and 436 is different from the light distribution shown in FIG. 13 (left-right asymmetric light distribution), and may be, for example, a substantially left-right symmetric light distribution or may have an emission angle range different from −80° to +20°.
- (4) In addition to (2) described above, the inclination angle with respect to the X-axis direction may be different between the sixth light guide plate inclined surfaces 24Aα included in the sixth light guide plate lenses 24α disposed in the fourth region A4 and the sixth light guide plate inclined surface 24Aβ included in the sixth light guide plate lenses 24*p* disposed in the third region A3. Accordingly, the light distribution relating to the light emitted from the second LED 20, 120, 220,320, 420, and 520, propagated through the second light guide plate 21, 121, 221, 321, 421, and 521, then raised and emitted by the second light reflection portion 36, 236, and 436 may be different between the third region A3 and the fourth region A4. For example, while the light distribution relating to the light emitted from the fourth region A4 is as shown in FIG. 13, content of the light distribution relating to the light emitted from the third region A3 may be obtained by left-right inverting the light distribution shown in FIG. 13.
- (5) A specific configuration of the ninth light guide plate lens 30 constituting the first light reflection portion 35, 235, 435 can be changed as appropriate. For example, the ninth light guide plate inclined surfaces 30A provided in the ninth light guide plate lenses 30 may include a plurality of types having different inclination angles with respect to the X-axis direction.
- (6) When the configuration of the ninth light guide plate lens 30 is changed as described in (5) above, the light distribution of the light emitted from the first LED 26, 126, 226, 326, 426, 526, propagated through the first light guide plate 27, 127, 227, 327, 427, 527, then raised and emitted by the first light reflection portion 35, 235, 435, may be different from the light distribution shown in FIG. 13 (left-right asymmetric light distribution), and may be, for example, a substantially left-right symmetric light distribution or may have an emission angle range different from −80° to +20°.
- (7) The first light guide plate-light emission main surface 27B, 527B of the first light guide plate 27, 127, 227, 327, 427, 527 may have a flat shape in which the seventh light guide plate lenses 28, which are the lenticular lenses, are not formed. Similarly, the second light guide plate-light emission main surface 21B, 121B of the second light guide plate 21, 121, 221, 321, 421, 521 may have a flat shape in which the fourth light guide plate lenses 22, which are the lenticular lenses, are not formed. Further, the third light guide plate-light emission main surface 14B of the third light guide plate 14, 314 may have a flat shape in which the first light guide plate lenses 32, 332, which are the lenticular lenses, are not formed.

(8) For example, a third louver may be provided instead of the diffuser sheet 12S disposed on the frontmost side in the backlight device 12, 212. The third louver has a configuration obtained by rotating the above-described first louver 18, 118, 218, 318, 518 by 90° around the axis along the Z-axis direction, and has a configuration in which light blocking portions and light-transmitting portions are alternately and repeatedly arranged in the Y-axis direction. Since the third louver is disposed on the frontmost side in the backlight device 12, 212, it is possible to restrict the emission angle range in the Y-axis direction, and thus it is possible to prevent reflection on the windshield of the passenger vehicle.

(9) The area ratio between the first display portion AA1 (the first region A1, the third region A3) and the second display portion AA2 (the second region A2, the fourth region A4) is not limited to being 1:1, and can be changed to a ratio other than 1:1, as appropriate.

(10) In the configurations described in the first, second, fourth, fifth, and sixth embodiments, other types of optical sheet can be used instead of the first prism sheet 16, 316 and the second prism sheet 17, 317 included in the third backlight unit 12U3, 312U3, 512U3. Further, other types of optical sheet may be added to the third backlight unit 12U3, 312U3, 512U3.

(11) The configuration described in the second embodiment can be combined with the configurations described in any of the third, fourth, and fifth embodiments, as appropriate.

(12) The number, layering order, type, and the like of the optical members described in the third embodiment can be changed as appropriate.

(13) Three or more display modes may be set. For example, the backlight control circuit 53 may set a third display mode in which the third LED 13, 313 is turned on and the first LED 26, 126, 226, 326, 426, 526 and the second LED 20, 120, 220, 320, 420, 520 are turned off.

(14) Specific numerical values such as the contact angle θc1 of the fourth light guide plate lens 22, the contact angle θc2 of the seventh light guide plate lens 28, the apex angle of the second light guide plate lens 33, 333, the apex angle θ7 of the fifth light guide plate lens 23, the apex angle θ10 of the eighth light guide plate lens 29, and the like can be changed as appropriate.

(15) The thickness of the first light guide plate 27, 127, 227, 327, 427, 527 may be configured to be smaller the farther the distance away from the first LED 26, 126, 226, 326, 426, 526, and the first opposite main surface 27C, 227C, 427C, 527C may be configured to be inclined. Similarly, the thickness of the second light guide plate 21, 121, 221, 321, 421, and 521 may be configured to be smaller the farther the distance away from the second LED 20, 120, 220, 320, 420, 520, and the second opposite main surface 21C, 221C, 421C, 521C may be configured to be inclined. Further, the thickness of each of the third light guide plates 14, 314 may be configured to be smaller the farther the distance away from the third LEDs 13, 313, and the third opposite main surface 14C may be configured to be inclined.

(16) Specific numerical values, such as the inclination angle and the apex angle of each of the prism inclined surfaces 16B1, 16B2, 17B1, 17B2 of each of the prisms 16B, 17B, 316B, 317B provided in each of the prism sheets 16, 17, 316, 317 can be changed as appropriate. A specific material used in each of the base materials 16A and 17A of each of the prism sheets 16, 17, 316, 317 can be changed as appropriate. Similarly, a specific material used in each of the prisms 16B, 17B, 316B, 317B can also be changed as appropriate.

(17) A specific cross-sectional shape of each of the prisms 16B, 17B, 316B, 317B provided in each of the prism sheets 16, 17, 316, 317 can be changed as appropriate. In that case, for example, any of the prism inclined surfaces 16B1, 16B2, 17B1, 17B2 in each of the prisms 16B, 17B, 316B, 317B may have a bent shape so as to have a plurality of inclination angles.

(18) In the first louver 18, 118, 218, 318, 518, a specific numerical value of the ratio (tan 0) acquired by dividing the width W1 of the first light-transmitting portion 18D, 318D, 518D by the height H1 thereof can be changed as appropriate in addition to tan 10°, and can be, for example, tan 12.5°, tan 15°, tan 17.5°, and the like.

(19) Each of the LEDs 13, 20, 26, 120, 126, 220, 226, 313, 320, 326, 420, 426, 520, 526 may be a side emitting type or a top emitting type. Further, in addition to the LED, an organic light-emitting diode (OLED) or the like may also be used as the light source.

(20) In place of the first prism sheet 16, 316 and the second prism sheet 17, 317, a prism sheet provided with a prism on the main surface on the back side (light incident main surface) thereof can also be used.

(21) The disclosure can also be applied to the liquid crystal display devices 10 and 410 used for applications other than in the passenger vehicle.

(22) In the second louver 19 described in the sixth embodiment, a specific numerical value of the ratio (tan 0) obtained by dividing the width W2 of the second light-transmitting portion 19D by the height H2 can be changed as appropriate in addition to tan 450 and the like. In that case, the ratio obtained by dividing the width W2 of the second light-transmitting portion 19D by the height H2 is preferably greater than the ratio obtained by dividing the width W1 of each of the first light-transmitting portion 18D, 318D, 518D by the height H1, but is not limited thereto.

(23) The configuration described in the sixth embodiment (the second louver 19) can be also combined with the configurations described in the second to fifth embodiments as appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An illumination device comprising:
a first light source;
a first light guide plate, at least a part of an outer peripheral end surface of the first light guide plate being a first end surface facing the first light source and on which light is incident, one of main surfaces of the first light guide plate being a first main surface configured to emit light, and another one of the main surfaces of the first light guide plate being a second main surface;

a second light source;

a second light guide plate, at least a part of an outer peripheral end surface of the second light guide plate being a second end surface facing the second light source and on which light is incident, one of main surfaces of the second light guide plate being a third main surface configured to emit light, and another one of the main surfaces of the second light guide plate being a fourth main surface;

a third light source;

an optical member including a light incident surface facing the third light source and on which light is incident, and a fifth main surface configured to emit light; and a first sheet, one of main surfaces of the first sheet being a sixth main surface, and another one of the main surfaces of the first sheet being a seventh main surface facing the fifth main surface, wherein the main surfaces of the first light guide plate and the second light guide plate overlap each other and the first light guide plate and the second light guide plate are disposed on a side of the first sheet opposite the optical member, the first sheet includes, at least:
two first light blocking portions disposed with an interval therebetween in a first direction and configured to block light, the first direction comprising a direction from the first light source toward the first light guide plate, and
a first light-transmitting portion disposed between the two light blocking portions and configured to transmit light, a first light reflection portion is provided at the second main surface, the first light reflection portion reflecting light and promoting light emission from the first main surface, a second light reflection portion is provided at the fourth main surface, the second light reflection portion reflecting light and promoting light emission from the third main surface, when the second main surface is divided into two regions near a middle of the first light guide plate in the first direction, the two regions comprising a first region and a second region adjacent to the first region in the first direction, the first light reflection portion is selectively provided only in the first region in the second main surface, and when the fourth main surface is divided into two regions near a middle of the second light guide plate in the first direction, the two regions comprising a third region overlapping the first region, and a fourth region overlapping the second region, the second light reflection portion is provided at least in the fourth region in the fourth main surface.

2. The illumination device according to claim 1,
wherein the second light reflection portion is provided over the third region and the fourth region in the fourth main surface.

3. The illumination device according to claim 2,
wherein the first light reflection portion comprises a plurality of first lenses arranged side by side in the first direction in the second main surface,
the second light reflection portion comprises a plurality of second lenses arranged side by side in the first direction in the fourth main surface, and
a second lens, of the plurality of second lenses, disposed at least in the fourth region, comprises a first inclined surface with an inclination gradually upward from a side of the second light guide plate opposite the second light source toward another side of the second light guide plate near the second light source in the first direction.

4. The illumination device according to claim 3,
wherein another second lens, of the plurality of second lenses, disposed in the third region, comprises a second inclined surface with an inclination gradually upward from the side of the second light guide plate opposite the second light source toward the other side of the second light guide plate near the second light source in the first direction.

5. The illumination device according to claim 4,
wherein the first inclined surface and the second inclined surface have a same inclination angle with respect to the first direction.

6. The illumination device according to claim 3,
wherein a positional relationship of the first light source with respect to the first light guide plate in the first direction is the same as a positional relationship of the second light source with respect to the second light guide plate in the first direction, and
each of the plurality of first lenses includes a third inclined surface with an inclination gradually upward from a side of the first light guide plate opposite the first light source toward another side of the first light guide plate near the first light source in the first direction.

7. The illumination device according to claim 2, further comprising:
a light source control unit configured to control driving of the first light source, the second light source, and the third light source,
wherein, based on an input of a switching signal, the light source control unit switches between a first mode and a second mode, the first light source and the third light source being turned on and the second light source being turned off in the first mode, and the second light source and the third light source being turned on and the first light source being turned off in the second mode.

8. The illumination device according to claim 2,
wherein the second light guide plate is disposed, such that the first light guide plate is interposed between the second light guide plate and the first sheet.

9. The illumination device according to claim 2,
wherein the first light guide plate is disposed, such that the second light guide plate is interposed between the first light guide plate and the first sheet.

10. The illumination device according to claim 1,
wherein the optical member further comprises a third light guide plate, the light incident surface comprising at least a part of an outer peripheral end surface of the third light guide plate, and the third light guide plate being disposed with the light incident surface facing the third light source.

11. The illumination device according to claim 10, further comprising:
a light source control unit configured to control driving of the first light source, the second light source, and the third light source,
wherein the light incident surface further comprises a part of the outer peripheral end surface of the third light guide plate, the part extending in the first direction,
a plurality of third light sources, including the third light source, is arranged side by side in the first direction,
the plurality of third light sources includes:
a fourth light source disposed facing a portion of the third light guide plate overlapping the first region and the third region, and
a fifth light source disposed facing a portion of the third light guide plate overlapping the second region and the fourth region, and
the light source control unit causes a light emission amount per unit time of the fourth light source to be larger than a light emission amount per unit time of the fifth light source.

12. The illumination device according to claim 1, further comprising:
a light source control unit configured to control driving of the first light source, the second light source, and the third light source,
wherein a plurality of third light sources, including the third light source, is disposed in a planar manner overlapping the fifth main surface, and
the light incident surface of the optical member comprises a main surface on a side opposite the fifth main surface, and is disposed facing the plurality of third light sources.

13. An illumination device comprising:
a first light source;
a first light guide plate, at least a part of an outer peripheral end surface of the first light guide plate being a first end surface facing the first light source and on which light is incident, one of main surfaces of the first light guide plate being a first main surface configured to emit light, and another one of the main surfaces of the first light guide plate being a second main surface;
a second light source;
a second light guide plate, at least a part of an outer peripheral end surface of the second light guide plate being a second end surface facing the second light source and on which light is incident, one of main surfaces of the second light guide plate being a third main surface configured to emit light, and another one of the main surfaces of the second light guide plate being a fourth main surface;
a third light source;
an optical member including a light incident surface facing the third light source and on which light is incident, and a fifth main surface configured to emit light;
a first sheet, one of main surfaces of the first sheet being a sixth main surface and another one of the main surfaces of the first sheet being a seventh main surface facing the fifth main surface; and
a light source control unit configured to control driving of the first light source, the second light source, and the third light source,
wherein the main surfaces of the first light guide plate and the second light guide plate overlap each other and the first light guide plate and the second light guide plate are disposed on a side of the first sheet opposite the optical member,
the first sheet includes, at least:
two first light blocking portions disposed with an interval therebetween in a first direction and configured to block light, the first direction comprising a direction from the first light source toward the first light guide plate, and
a first light-transmitting portion disposed between the two light blocking portions and configured to transmit light,
a first light reflection portion is provided at the second main surface, the first light reflection portion reflecting light and promoting light emission from the first main surface,
a second light reflection portion is provided at the fourth main surface, the second light reflection portion reflecting light and promoting light emission from the third main surface,
when the second main surface is divided into a first region and a second region adjacent to the first region in the first direction, the first light reflection portion is selectively provided only in the first region in the second main surface,
when the fourth main surface is divided into a third region overlapping the first region and a fourth region overlapping the second region, the second light reflection portion is provided at least in the fourth region in the fourth main surface,
a plurality of third light sources, including the third light source, is disposed in a planar manner overlapping the fifth main surface,
the light incident surface of the optical member comprises a main surface on a side opposite the fifth main surface, and is disposed facing the plurality of third light sources,
the plurality of third light sources includes a fourth light source disposed overlapping the first region and the third region, and a fifth light source disposed overlapping the second region and the fourth region, and
the light source control unit causes a light emission amount per unit time of the fourth light source to be larger than a light emission amount per unit time of the fifth light source.

14. An illumination device comprising:
a first light source;
a first light guide plate, at least a part of an outer peripheral end surface of the first light guide plate being a first end surface facing the first light source and on which light is incident, one of main surfaces of the first light guide plate being a first main surface configured to emit light, and another one of the main surfaces of the first light guide plate being a second main surface;
a second light source;
a second light guide plate, at least a part of an outer peripheral end surface of the second light guide plate being a second end surface facing the second light source and on which light is incident, one of main surfaces of the second light guide plate being a third main surface configured to emit light, and another one of the main surfaces of the second light guide plate being a fourth main surface;

a third light source;

an optical member including a light incident surface facing the third light source and on which light is incident, and a fifth main surface configured to emit light;

a first sheet, one of main surfaces of the first sheet being a sixth main surface and another one of the main surfaces of the first sheet being a seventh main surface facing the fifth main surface; and a second sheet, one of main surfaces of the second sheet being an eighth main surface and another one of the main surfaces of the second sheet being a ninth main surface disposed facing the first main surface, wherein the main surfaces of the first light guide plate and the second light guide plate overlap each other and the first light guide plate and the second light guide plate are disposed on a side of the first sheet opposite the optical member, the first sheet includes, at least:
- two first light blocking portions disposed with an interval therebetween in a first direction and configured to block light, the first direction comprising a direction from the first light source toward the first light guide plate; and
- a first light-transmitting portion disposed between the two light blocking portions and configured to transmit light, a first light reflection portion is provided at the second main surface, the first light reflection portion reflecting light and promoting light emission from the first main surface, a second light reflection portion is provided at the fourth main surface, the second light reflection portion reflecting light and promoting light emission from the third main surface, when the second main surface is divided into a first region and a second region adjacent to the first region in the first direction, the first light reflection portion is selectively provided only in the first region in the second main surface, when the fourth main surface is divided into a third region overlapping the first region and a fourth region overlapping the second region, the second light reflection portion is provided at least in the fourth region in the fourth main surface, the second sheet includes, at least:
- two second light blocking portions disposed with an interval therebetween in the first direction and configured to block light; and
- a second light-transmitting portion disposed between the two second light blocking portions and configured to transmit light.

15. A display device, comprising:
the illumination device according to claim 1; and
a display panel configured to perform display using light from the illumination device.

* * * * *